(12) United States Patent
Vermeulen et al.

(10) Patent No.: US 11,485,083 B2
(45) Date of Patent: Nov. 1, 2022

(54) PREHEATING OF MATERIAL IN AN ADDITIVE MANUFACTURING APPARATUS

(71) Applicants: CSIR, Pretoria (ZA); Aerosud Innovation Centre (Pty) Ltd, Centurion (ZA)

(72) Inventors: Marius Vermeulen, Pretoria (ZA); Dieter Rainer Preussler, Pretoria (ZA)

(73) Assignees: CSIR, Pretoria (ZA); Aerosud Innovation Centre (Pty) Ltd, Centurion (ZA)

( * ) Notice: Subject to any disclaimer, the term of this patent is extended or adjusted under 35 U.S.C. 154(b) by 144 days.

(21) Appl. No.: 16/470,398

(22) PCT Filed: Dec. 15, 2017

(86) PCT No.: PCT/IB2017/057992
§ 371 (c)(1),
(2) Date: Jun. 17, 2019

(87) PCT Pub. No.: WO2018/109735
PCT Pub. Date: Jun. 21, 2018

(65) Prior Publication Data
US 2020/0108558 A1    Apr. 9, 2020

(30) Foreign Application Priority Data

Dec. 18, 2016  (ZA) ................................ 2016/08320
Dec. 18, 2016  (ZA) ................................ 2016/08321

(51) Int. Cl.
*B29C 64/264*    (2017.01)
*B29C 64/153*    (2017.01)
(Continued)

(52) U.S. Cl.
CPC .......... *B29C 64/314* (2017.08); *B29C 64/153* (2017.08); *B29C 64/209* (2017.08);
(Continued)

(58) Field of Classification Search
CPC ..... B29C 64/153; B29C 64/295; B29C 64/20; B29C 64/264; B29C 64/30; B29C 64/35;
(Continued)

(56) References Cited

U.S. PATENT DOCUMENTS 4,575,608 A * 3/1986 Wictorin .............. B23K 1/0053
219/85.12
10,252,333 B2 * 4/2019 McMurtry .............. B22F 10/20
(Continued)

FOREIGN PATENT DOCUMENTS

CN    106041080    10/2016
DE    102014204580    9/2015
(Continued)

OTHER PUBLICATIONS

Aeroswift "Infrared Preheating Test Report" (Oct. 25, 2016) (Year: 2016).*
(Continued)

*Primary Examiner* — Joseph S Del Sole
*Assistant Examiner* — Ariella Machness
(74) *Attorney, Agent, or Firm* — Parker Highlander PLLC

(57) ABSTRACT

An additive manufacturing apparatus is disclosed. The apparatus includes a build platform, a scanning unit and a preheating arrangement. Material is operatively deposited on the build platform to form a material bed, with a surface of the material bed defining a material area. The scanning unit is configured to consolidate deposited material in a scan area on the surface of the material bed, wherein the scan area forms part of and is substantially smaller than the material area. The preheating arrangement is configured to focus energy onto the surface of the material bed substantially in the scan area and not in the remainder of the material area. A method of preheating material in an additive manufacturing apparatus, a method of forming an object by additive
(Continued)

manufacturing and a preheating arrangement for an additive manufacturing apparatus are also disclosed.

12 Claims, 37 Drawing Sheets

(51) Int. Cl.

| | | |
|---|---|---|
| B29C 64/232 | (2017.01) | |
| B29C 64/245 | (2017.01) | |
| B29C 64/295 | (2017.01) | |
| B29C 64/236 | (2017.01) | |
| B33Y 30/00 | (2015.01) | |
| B33Y 40/10 | (2020.01) | |
| B29C 64/314 | (2017.01) | |
| B29C 64/209 | (2017.01) | |
| B33Y 10/00 | (2015.01) | |

(52) U.S. Cl.
CPC .......... *B29C 64/232* (2017.08); *B29C 64/236* (2017.08); *B29C 64/245* (2017.08); *B29C 64/264* (2017.08); *B29C 64/295* (2017.08); *B33Y 10/00* (2014.12); *B33Y 30/00* (2014.12); *B33Y 40/10* (2020.01)

(58) Field of Classification Search
CPC .......... B22F 12/13; B22F 12/17; B22F 12/10; B33Y 40/10
See application file for complete search history.

(56) References Cited

U.S. PATENT DOCUMENTS

| | | | | |
|---|---|---|---|---|
| 2016/0368052 | A1* | 12/2016 | Jakimov | ............... B29C 64/214 |
| 2017/0021418 | A1* | 1/2017 | Ng | ............... B33Y 40/00 |
| 2018/0104742 | A1* | 4/2018 | Kottilingam | ............... B33Y 50/02 |
| 2018/0186077 | A1* | 7/2018 | Grunberger | ............... B22F 10/362 |
| 2018/0222114 | A1* | 8/2018 | Ng | ............... B22F 10/20 |

FOREIGN PATENT DOCUMENTS

| | | | | |
|---|---|---|---|---|
| EP | | 2915611 | 9/2015 | |
| EP | | 3323597 B1 * | 10/2019 | ............. B22F 10/20 |
| WO | WO 1995/011101 | | 4/1995 | |
| WO | WO 2014/199150 | | 12/2014 | |
| WO | WO 2016/201309 | | 12/2016 | |

OTHER PUBLICATIONS

Roberts "Aeroswift pre-heating report" (Mar. 6, 2014) (Year: 2014).*
Mertens et al., "Application of base plate preheating during selective laser melting," *ScienceDirect*, 10th CIRP Conference on Photonic Technologies [LANE 2018].
McWilliams et al., "Design of a High Temperature Process Chamber for the Selective Laser Sintering Process," Dept. of Mech. Eng., Univ. of Texas (1992), pp. 111-116.
Malý et al., "Effect of Process Parameters and High-Temperature Preheating on Residual Stress and Relative Density of Ti6A14V Processed by Selective Laser Melting," Materials 2019, 12, 930; doi:10.3390/ma12060930.
Vrancken et al., "Preheating of Selective Laser Melted Ti6A14V: Microstructure and Mechanical Properties," Proceedings of the 13th World Conference on Titanium (2016).
Roberts et al., "Aeroswift pre-heating report," NLC Laser Sources Group Mar. 6, 2014.
"Aeroswift Infrared Preheating Test Report—Determining the Optimum Intensities(Power) Required for Uniform Temperature Profile" Oct. 25, 2015.
Ramulifho, "Infrared Preheating Test Report—Reflector Sheets Temperature Reduction Tests," Jan. 9, 2017.
Weikai et al., "Far Infrared Radiation Heating Technology", Shanghai Science and Technology Press 1110905 (partial translation).
Zhou et al., "Product Development," Southeast University Press, Nanjing University of Aeronautics and Astronautics (partial translation).
Wang et al., "Rapid Prototyping Theory and Technology," Aviation Industry Press (partial translation).
Liu et al., "Effect of high-temperature preheating on the selective laser melting of yttria-stabilized zirconia ceramic," *Journal of Materials Processing Technology*, 222:61-74, 2015.
PCT International Preliminary Report on Patentability issued in International Application No. PCT/IB2017/057992, completed May 7, 2019.
PCT International Search Report and Written Opinion issued in International Application No. PCT/IB2017/057992, dated Aug. 27, 2018.
Office Action and Search Report issued in Chinese Application No. 2017800780541, dated Nov. 16, 2021 (English translation).

* cited by examiner

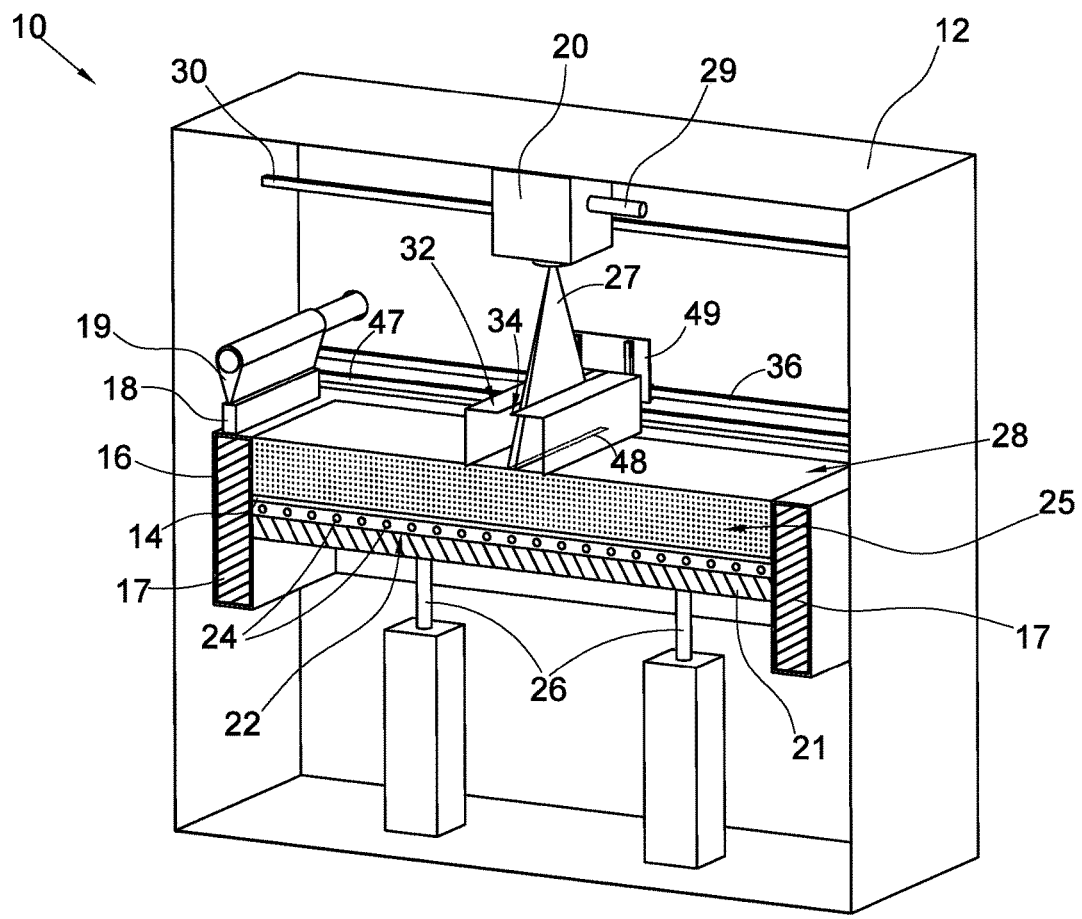
Fig.1
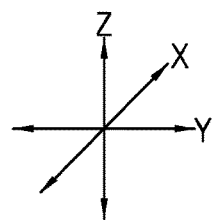

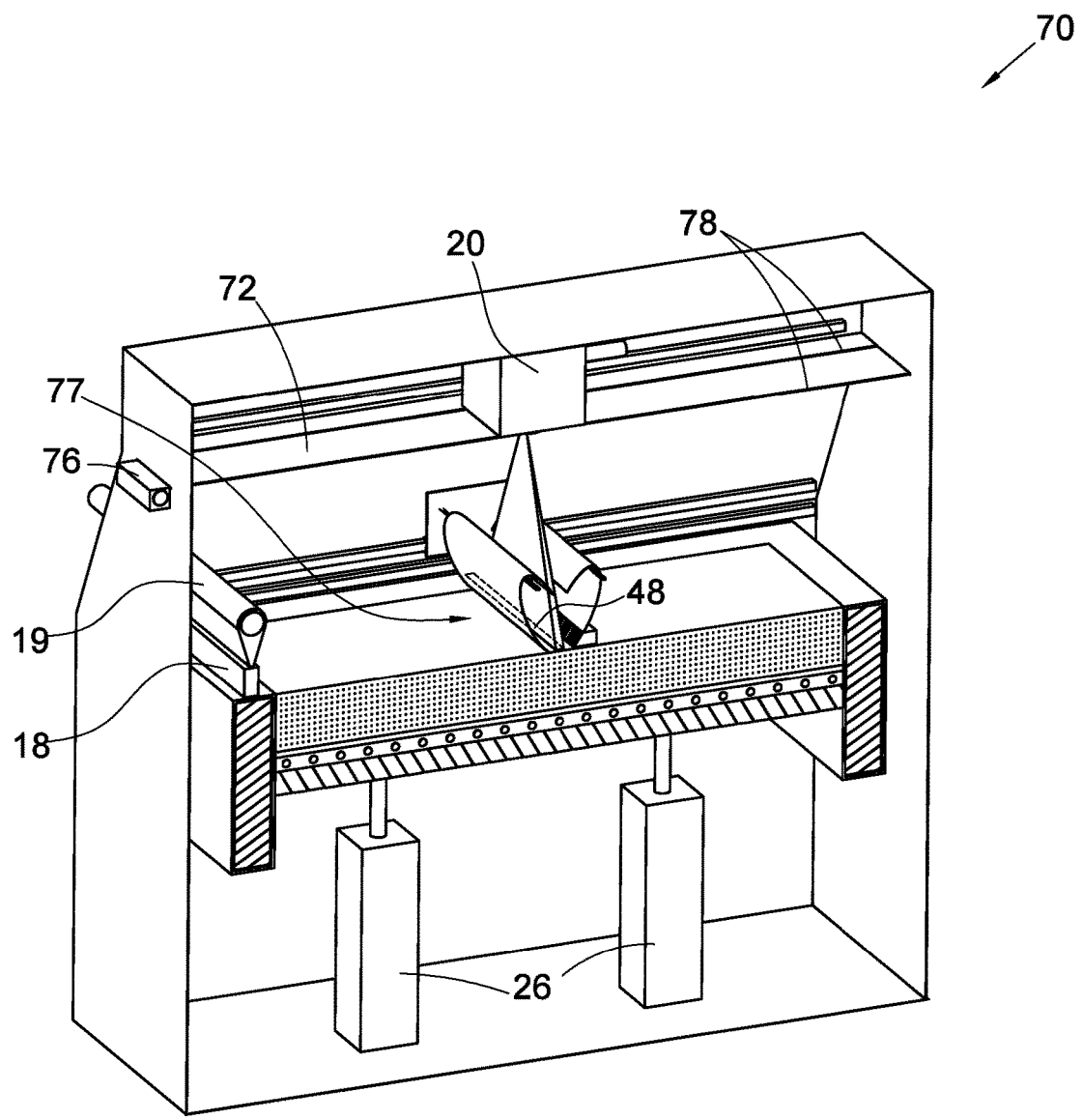
Fig.7
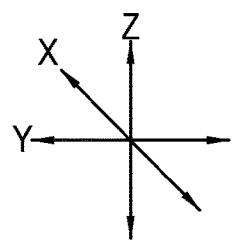

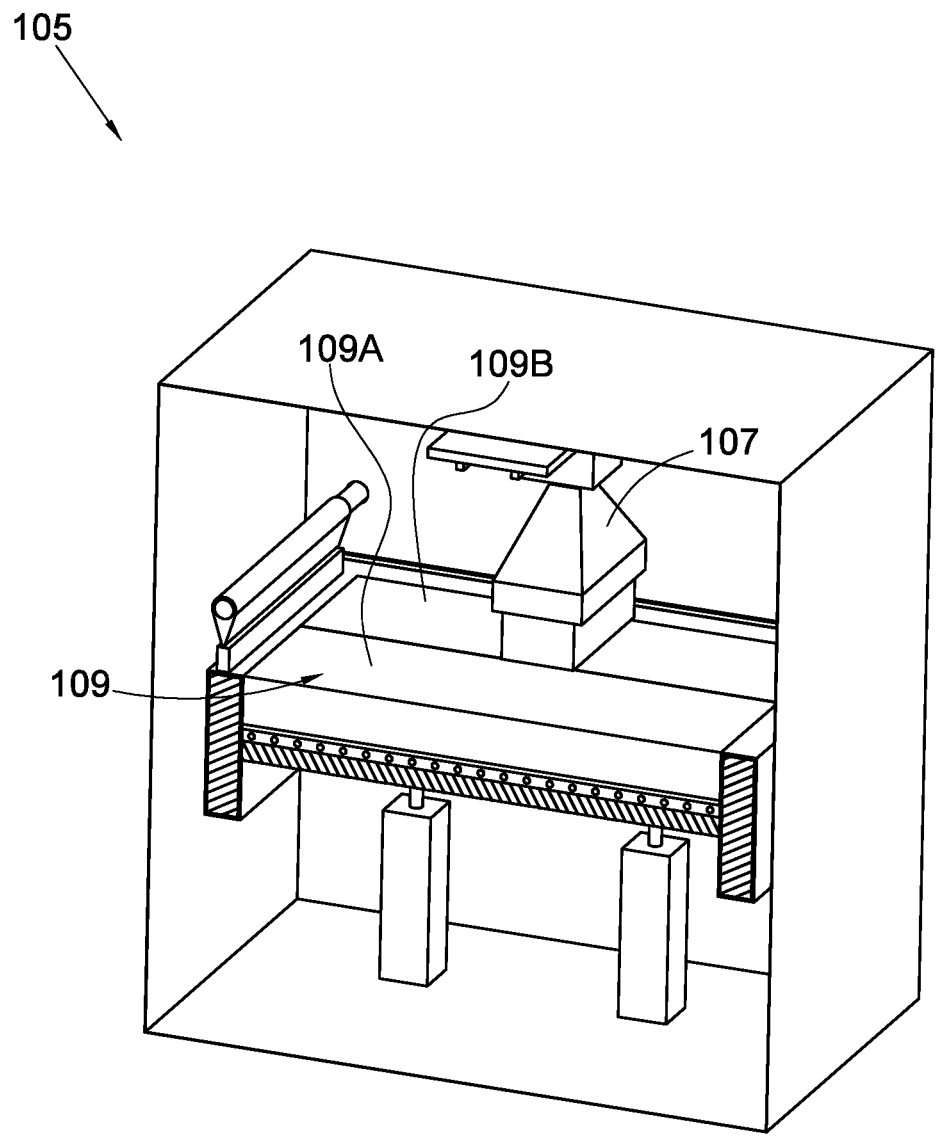
Fig. 15
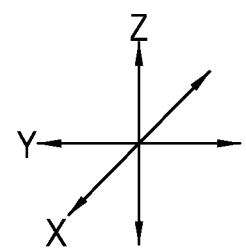

PREHEATING OF MATERIAL IN AN ADDITIVE MANUFACTURING APPARATUS

This application is a national phase application under 35 U.S.C. § 371 of International Application No. PCT/IB2017/057992, filed Dec. 15, 2017, which claims benefit of South African Application No. 2016/08320, filed Dec. 18, 2016 and South African Application No. 2016/08321, filed Dec. 18, 2016, the entire contents of each of which are hereby incorporated by reference.

FIELD OF THE INVENTION

This invention relates, broadly, to additive manufacturing. More particularly, the invention relates to an additive manufacturing apparatus and a method of preheating material in an additive manufacturing apparatus. The invention also relates to a method of forming an object by additive manufacturing and to a preheating arrangement for an additive manufacturing apparatus.

BACKGROUND OF THE INVENTION

Additive manufacturing (AM) refers to various processes used to synthesise a three-dimensional object (hereafter simply referred to as an "object" or "part"). Certain AM techniques are sometimes referred to as "3D printing".

In AM, parts are typically manufactured by digitally slicing a three-dimensional computer-aided design (CAD) model into two-dimensional layers or images. These layers are then manufactured by curing, consolidating, melting or otherwise forming these layers from a raw material, typically in the form of a powder or fluid. For the sake of convenience, the terms "consolidating" or simply "forming" will hereinafter be used to refer to the forming of such layers, irrespective of the specific manner in which the layers are formed.

In AM, parts can be produced from various raw materials, such as metals, polymers, ceramics, resins and gypsum. Further, various techniques are used to consolidate layers, including lasers, electron beams, binders and thermal modules.

A number of AM processes employ a laser or electron beam to consolidate material in a material bed in layers ultimately to form a desired part. In laser-based processes, the laser is directed by a scanning unit, based on the geometry of a CAD model, to ensure that the desired layers are consolidated in the correct manner. The material bed is supported on a build platform which is incrementally lowered as each new layer of the object is consolidated. A fresh layer of material is then added to the material bed before the next layer is scanned to consolidate the powder and fuse it onto the previous layer.

AM may provide a number of advantages over traditional manufacturing methods. These advantages include the ability to manufacture highly complex parts which allows for weight reduction, parts with integrated moving components, improved cooling, integration of more functionality into parts and part count reduction. The process also ensures relatively low material wastage due to the reusability of raw material and the obviation of the need for tooling.

Preheating strategies are commonly employed in AM to elevate the temperature of raw material before consolidating the raw material into a final form. Preheating may be used in an attempt to ensure that material is more easily processed and/or processed at a higher rate, or to remove moisture from the material prior to consolidation. The presence of moisture may lead to porosity and/or other defects in the object.

Further, when producing AM parts using energy beams, residual stresses may form in the material due to solidification shrinkage of the weld pool and large thermal gradients. In certain materials, these residual stresses are relatively high and, when producing larger parts, can cause the parts to distort and/or crack. Material can be preheated to prevent, reduce or relieve such stresses.

It has been found that, broadly, three approaches exist in respect of preheating in AM systems.

The first approach is typically referred to as "bulk preheating". In bulk preheating, the temperature of the material bed on the build platform is elevated by positioning heating sources at the outer extremities of, or in close proximity to, the outer extremities of the material bed. Heat transfer takes place by means of conduction through the material bed and, in instances where heating sources are positioned below the build platform, also through layers that have already been consolidated.

A number of disadvantages associated with bulk preheating may be identified. This approach requires relatively high energy input, high quality insulation and substantially continuous control of heating sources. Active control is required to establish and maintain desired preheating properties. In light of the lack of conformity in the material bed in use (some regions are consolidated and some are in powder form), it is difficult to maintain a constant temperature in the bulk material.

It has been found that the positioning of heating sources may be problematic. Due to thermal losses and poor heat conduction of powders, the temperature in the material bed is higher close to the heating source than at positions further away from the heating source. When heating sources are positioned below and/or at the sides of the material bed, the bottom and/or sides of the material bed may have higher temperatures than the material bed surface where pre-heating is actually required.

If the temperature of the heating source is kept constant, the temperature at the material bed surface will gradually decrease as the volume of the material bed increases. To keep the temperature at the material bed surface constant, the temperature at the heat source must be gradually increased. It has been found that, when using bulk preheating techniques, at least some material in the material bed may be heated above its ideal preheating temperature, to ensure that the surface temperature stays at the ideal temperature. This may have an adverse effect on certain materials. For instance, if an excessively high temperature is maintained over a prolonged period, sintering of unconsolidated powder in a material bed may occur, preventing the powder from subsequently being recycled. Such excessive temperatures may also cause oxide growth on certain metals, such as titanium or aluminium.

The second common preheating approach is known as "surface preheating". In surface preheating, energy is supplied to the surface of the material bed, typically by way of electromagnetic radiation. Surface preheating systems commonly include resistive heating elements or unfocussed infrared (IR) technology.

The energy supplied to the material bed surface is absorbed on the surface and converted to heat. At least a portion of the remainder of the material bed is then heated through conduction. It has been found that, when compared to bulk preheating, surface preheating generally provides a more energy efficient way of increasing the temperature of the material bed surface.

However, existing surface preheating systems also present a number of disadvantages. Again, in light of the lack of conformity in the material bed, during operation, temperature gradients are likely to form in the material bed, particularly between consolidated regions and powder regions. Active control is required to establish and maintain desired preheating temperatures. Since the entire surface of the material bed is heated, a relatively large heating capacity is required to reach required temperatures.

Further, high energy losses may occur due to convection and radiation losses to the environment, which in turn leads to high energy costs. High energy losses generate undesired heat in an AM apparatus which may be detrimental to components of the apparatus. As mentioned above, maintaining the temperature of raw material at a high level for long periods of time may also be detrimental to the material properties of certain materials.

It has also been found that that it may be difficult to maintain a constant temperature over the entire surface of the material bed, as heating sources may be required to be arranged in such a manner that they do not interfere with the energy beam (delivered by the scanning unit) required to consolidate material.

The third method of preheating is where the powder feedstock is preheated immediately before or immediately after being deposited. The powder is either heated inside a powder deposition device or a strip of the deposited powder is heated as the powder is deposited from the powder deposition device.

The advantage of this third method is that less energy is typically required as the material is only being heated as and when required. A disadvantage thereof is that the powder is typically deposited in very thin layers and that the temperature of the heated powder tends to drop rapidly after being heated and possibly even before it can be consolidated.

In addition to the above, it has been found that vapour and spatter removal may be difficult when using existing approaches. Both vapour and spatter can be produced as a result of the interaction of the energy beam with the powder bed material. Large particles known as "spatter" interfere with the deposition of layers of powder and cause irregularities in layer thickness. Smaller particles known as "vapour" remain airborne for longer periods and may prevent energy transfer to the material bed through scattering and absorption of radiation. If vapour accumulates to a significant extent, it may lead to fires or even explosions. Removal of spatter and vapour is therefore important and a need has been identified to improve the efficiency thereof.

The present invention may ameliorate some of these problems, at least to some extent.

SUMMARY OF THE INVENTION

According to a first aspect of the invention, there is provided an additive manufacturing apparatus which includes:
  a build platform on which material is operatively deposited to form a material bed, a surface of the material bed defining a material area;
  a scanning unit configured to consolidate deposited material in a scan area on the surface of the material bed, wherein the scan area forms part of and is substantially smaller than the material area; and
  a preheating arrangement which is configured to focus electromagnetic energy substantially onto the scan area and not in the remainder of the material area.

The preheating arrangement may be configured to focus energy onto the surface of the material bed in a preheating zone which substantially coincides with the scan area.

The build platform, on the one hand, and the scanning unit and the preheating arrangement, on the other hand, may be displaceable relative to each other in a direction which is parallel to the surface of the material bed.

The scanning unit and the preheating arrangement may be displaceable relative to each other to permit the preheating zone of the preheating arrangement substantially to coincide with the scan area.

The scan area may be substantially in the form of a two-dimensional strip. The strip may have a length which is larger than its width. The strip may have a length which extends for the entire width of the build platform along an X-axis of the apparatus. The width of the strip along a Y-axis of the apparatus may be at least twice a spot size of the energy beam. The width of the strip along the Y-axis may be between 0.1 mm and 100 mm. The scan area may also be oblique with respect to the X-axis or Y-axis, e.g. to provide an angled scan line for cross-hatching.

The scanning unit may be a two-dimensional scanning unit. The scanning unit may provide or direct an energy beam, such as a laser beam, for consolidating material.

The apparatus may further include a moving arrangement whereby the build platform and the scanning unit are movable relative to one another, e.g. in the Y axis. In one embodiment, the scanning unit and the preheating arrangement are fixed relative to one another and the build platform is displaceable relative to the scanning unit and the preheating arrangement in a direction which is parallel to the surface of the material bed. In another embodiment of the invention, the scanning unit and preheating arrangement are displaceable together relative to the build platform. In this way, the scan area is movable across the material area. The moving arrangement may thus permit the scan area to be moved along the Y-axis of the apparatus.

In some embodiments, the scanning unit and the preheating arrangement may also be movable relative to the build platform along the X-axis.

Alternatively, the scanning unit may be movable along the X-axis while the preheating arrangement is fixed, but enlarged, along the X-axis and movable only along the Y-axis.

The preheating arrangement may include an electromagnetic radiation energy source.

In some embodiments, the preheating arrangement may be provided by an array or multiple arrays of diode lasers configured to irradiate the scan area. The lasers may be arranged along the X-axis of the apparatus.

Beam shaping optics may be used to provide a substantially uniform distribution of energy over the scan area.

In other embodiments, the preheating arrangement may be provided by at least one lamp and a reflector arrangement, configured to focus radiation from the lamp onto the scan area, in use. The at least one lamp may be an infrared lamp. The at least one lamp may be one or more sets of lamps.

The preheating arrangement may include two infrared lamps, the lamps being mounted on opposing sides of the scan area such that the energy beam from the scanning unit passes between the lamps. The reflector arrangement may be provided by one or more mirrors. The one or more mirrors may have any suitable geometry. In some embodiments, the one or more mirrors may have an elliptical apex region, when viewed in a Y-Z plane of the apparatus, which serves to focus radiation from the lamp onto the scan area.

The reflector arrangement may also include one or more flat, upright side reflectors configured to utilise radiation emitted from the lamps along a longitudinal axis thereof.

The preheating arrangement may be configured to provide and focus radiation onto a focus zone along the X-axis of the apparatus. The focus zone may be a strip which extends along a centre of a width of the scan area. The preheating arrangement, for example its lamp(s) or mirror(s), may be adjustable to permit a focus zone or zones to be movable with respect of the scan area.

The preheating arrangement may define an opening through which the energy beam is directed onto the material bed. The length of the opening along the X-axis may be at least the length of the scan area. The width of the opening along the Y-axis may be at least twice the width of the scan area to allow for scanning of the full strip while moving the scanning unit along the Y-axis.

The apparatus may further include at least one material deposition arrangement configured to deposit layers of powder material onto the build platform to form the material bed. The apparatus may also include at least one material feeding mechanism configured to refill the at least one material deposition arrangement with powder material, in use.

The preheating arrangement may be operatively upwardly displaceable along the Z-axis and/or relative to the build platform to provide clearance for the material deposition arrangement to pass between the preheating arrangement and the material bed when depositing material.

The additive manufacturing apparatus may include at least one extraction arrangement having an extraction port for the extraction of vapour and/or spatter produced in use. The extraction port may be located on one or both (i.e. opposite) sides of the preheating arrangement so as to extract vapour and/or spatter from the scan area. In one embodiment, one or more extraction ports are provided or located in the reflector arrangements and the apparatus may include flow control means configured to regulate the direction of flow of gasses between the extraction ports.

In some embodiments, the apparatus may include an extraction port located on one side of the scan area, taken along the Y-axis of the apparatus, and a nozzle on the other side of the scan area for purging gas into the region of the scan area for egression through the extraction port.

The extraction arrangement may be attached to or integral with the preheating arrangement and may be operatively upwardly displaceable along the Z-axis of the apparatus to provide clearance for the material deposition arrangement to pass between the extraction arrangement and the material bed in order to deposit material.

The extraction arrangement may include an extraction member on one or both sides thereof, wherein the extraction member includes an extraction port and a nozzle, the extraction port and nozzle being configured to be located on one or both, i.e. opposite sides of the scan area during operation.

Where the extraction arrangement includes an extraction member on opposite sides thereof, the extraction members may be operated simultaneously or individually. The extraction members may be adjusted so as to reverse a direction of extraction (extraction direction) in use.

The apparatus may further include at least one temperature sensor for measuring a surface temperature of a focus zone provided by the preheating arrangement at or near the surface of the material bed. A heating level of the preheating arrangement may be continuously or periodically adjusted, in use, based on temperatures measured by the temperature sensor.

The apparatus may include a plurality of preheating arrangements, e.g. arrangements which are spaced apart along the X-axis of the apparatus. Adjacent preheating arrangements may be slightly offset relative to each other along the Y-axis. The preheating arrangements may be movable together or independently of one another relative to the build platform along the Y-axis.

The apparatus may include a platform displacement arrangement, whereby the build platform is vertically displaceable.

According to another aspect of the invention, there is provided an additive manufacturing apparatus which includes:
  a build platform on which material is operatively deposited to form a material bed, a surface of the material bed defining a material area;
  a scanning unit configured to consolidate deposited material in a scan area on the surface of the material bed, wherein the scan area forms part of and is substantially smaller than the material area; and
  a preheating arrangement which is configured to focus energy onto the material surface of the material bed in a preheating zone, the build platform and the preheating arrangement being relatively displaceable to permit the scan area and the preheating zone to coincide.

According to another aspect of the invention, there is provided a method of preheating material in an additive manufacturing apparatus, the method including the steps of:
  depositing material on a build platform to form a material bed, a surface of the material bed defining a material area;
  providing a scanning unit configured to consolidate deposited material in a scan area on the surface of the material bed, wherein the scan area forms part of and is substantially smaller than the material area; and
  preheating material contained in the scan area using a preheating arrangement which is configured to focus energy substantially onto the scan area and not in the remainder of the material area.

According to another aspect of the invention, there is provided a method of preheating material in an additive manufacturing apparatus, the method including the steps of:
  depositing material on a build platform to form a material bed, a surface of the material bed defining a material area;
  providing a scanning unit configured to consolidate deposited material in a scan area on the surface of the material bed, wherein the scan area forms part of and is substantially smaller than the material area; and
  displacing a preheating arrangement and the build platform relative to each other, the preheating arrangement being configured to focus energy onto the surface of the material bed in a preheating zone, wherein the preheating arrangement and the build platform are relatively displaced such that the scan area and the preheating zone coincide.

The method may include the steps of:
  dividing the material area into a plurality of two-dimensional strips, each strip having an area generally equal to that of the scan area; and
  using the preheating arrangement to preheat the material area one two-dimensional strip at a time while the preheating arrangement and build platform are moving relative to each other.

The method may include, after preheating a particular strip, consolidating material contained in the strip before preheating a next strip.

The method may also include substantially continuous consolidation and preheating of material while displacing the preheating arrangement and the build platform relative to each other, e.g. along the Y-axis.

The method may include moving the build platform on the one hand and the scanning unit and the preheating arrangement on the other hand, relative to one another to permit an energy beam from the scanning unit to reach the scan area and thus to reach material to be consolidated.

According to another aspect of the invention, there is provided a method of forming an object by additive manufacturing, the method being conducted by an additive manufacturing apparatus as described above and including the steps of:
  successively depositing layers of material on the build platform to form the material bed; and
  consolidating one or more portions of the deposited layer of material using the scanning unit, each consolidated portion corresponding to a particular cross-section or two-dimensional slice of the object,
  wherein, in order to consolidate at least some of the portions, a particular layer is divided into smaller two-dimensional strips and the layer is preheated and consolidated one two-dimensional strip at a time using the preheating arrangement and scanning unit, respectively.

The steps of depositing and consolidating may be performed at least partially concurrently.

The consolidating step may be initiated as soon as a portion of the build platform and/or material bed is coated with material and may be initiated while material is being deposited.

In some embodiments, in order to consolidate at least some of the layers, the build platform on the one hand and the scanning unit and the preheating arrangement on the other hand are displaced relative to each other in a direction which is parallel to the surface of the material bed.

The scanning unit and the build platform may be moving relative to one another whilst the portion of the object in a two-dimensional strip is being scanned, thereby permitting continuous scanning.

The rate of relative movement between the scanning unit and the build platform may be varied depending on the time it takes to scan any particular two-dimensional strip.

The method may include, after depositing a particular layer of material and consolidating the deposited layer, incrementally moving the build platform along the Z-axis, away from the scanning unit, before depositing a further layer of material for consolidation.

According to another aspect of the invention, there is provided a preheating arrangement for an additive manufacturing apparatus, the additive manufacturing apparatus including a build platform on which material is operatively deposited to form a material bed, a surface of the material bed defining a material area, and the additive manufacturing apparatus further including a scanning unit configured to consolidate deposited material in a scan area on the surface of the material bed, wherein the scan area forms part of and is substantially smaller than the material area, wherein the preheating arrangement includes at least one preheating element and at least one reflector or focusing arrangement configured to focus energy from the preheating element substantially onto the scan area and not the remainder of the material area.

According to another aspect of the invention, there is provided a preheating arrangement for an additive manufacturing apparatus, the additive manufacturing apparatus including a build platform on which material is operatively deposited to form a material bed, a surface of the material bed defining a material area, and the additive manufacturing apparatus further including a scanning unit configured to consolidate deposited material in a scan area on the surface of the material bed, wherein the scan area forms part of and is substantially smaller than the material area, wherein the preheating arrangement includes at least one preheating element and at least one reflector or focusing arrangement configured to focus energy from the preheating element onto the material surface of the material bed in a preheating zone, the build platform and the preheating arrangement being relatively displaceable to permit the scan area and the preheating zone to coincide.

The at least one preheating element may be at least one lamp or at least one laser diode.

BRIEF DESCRIPTION OF THE DRAWINGS

The invention will now be further described, by way of example, with reference to the accompanying drawings.

In the drawings:

FIG. 1 is a three-dimensional view of a section of a first embodiment of an additive manufacturing apparatus according to the invention;

FIG. 7 is a three-dimensional view of a section of a fifth embodiment of an additive manufacturing apparatus according to the invention;

FIGS. 14-15 are three-dimensional views of a section of a ninth embodiment of an additive manufacturing apparatus according to the invention;

DETAILED DESCRIPTION OF EXAMPLE EMBODIMENTS

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 2:
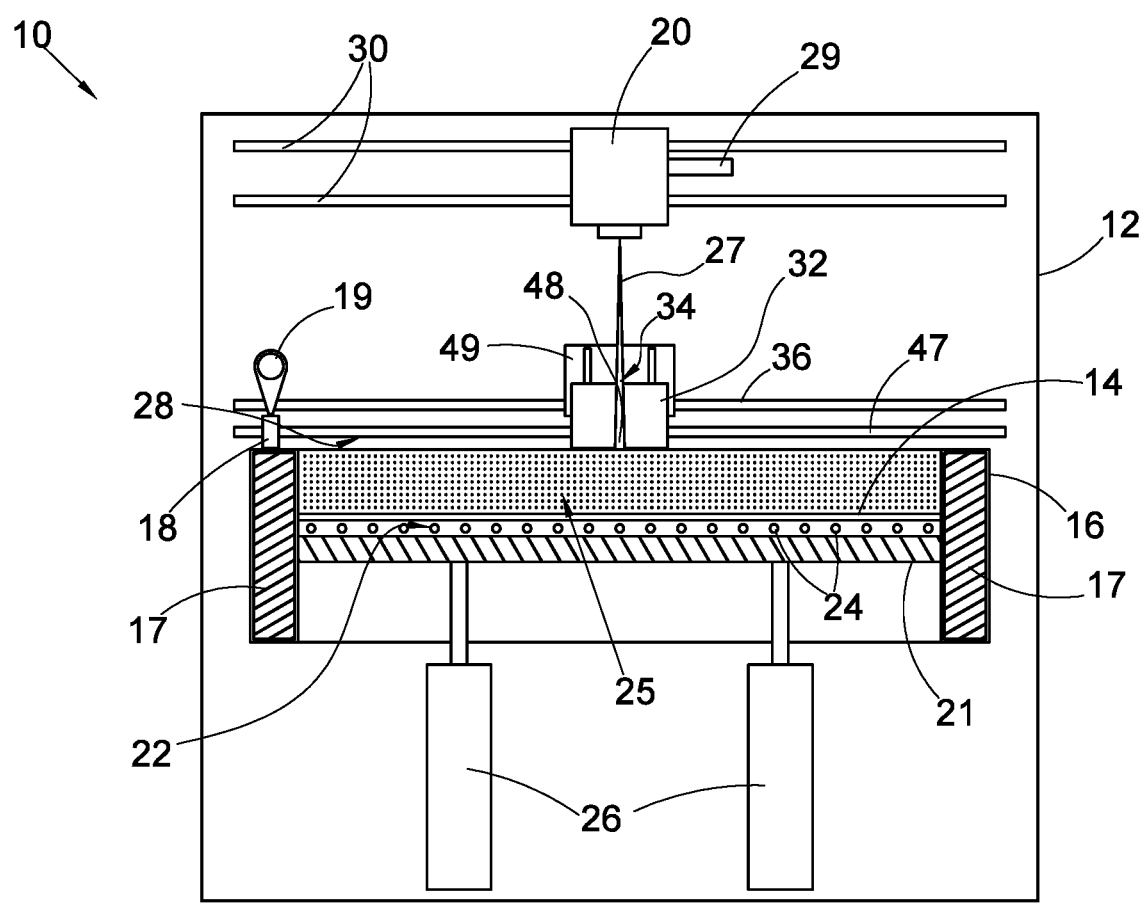
FIG. 2 is a front sectional view of the additive manufacturing apparatus of FIG. 1.

A first embodiment of an additive manufacturing (hereinafter interchangeably referred to as "AM" and "additive manufacturing") apparatus 10 is shown in FIGS. 1 and 2. FIG. 1 also shows a coordinate system (axes X-Y-Z) with reference to which the structure and function of the apparatus 10 is described below.

The apparatus 10 includes a housing 12 which houses a build platform 14, a material container 16, a material deposition arrangement 18, a material feeding mechanism 19, and a two-dimensional scanning unit 20 spaced above the build platform 14 along the Z-axis of the apparatus.

The housing 12 is a sealed enclosure and is used to provide a controlled processing environment. In this embodiment, the environment contains an inert gas. It will be understood that various environments may be employed, such as a vacuum chamber, an environment containing an inert gas, such as argon, helium or nitrogen or any other gas environment that may be beneficial to the process and/or material being processed.

The build platform 14 is generally planar and provides a working area 28 extending in a generally horizontal X-Y plane defined by the X-axis and the Y-axis of the apparatus 10. The build platform 14 is located on top of a complementally shaped pre-heating arrangement in the form of a heating unit 22. The heating unit 22 includes a plurality of spaced apart heating elements 24. The heating elements may be resistive or inductive heating elements. The heating elements 24 are arranged so as to form a grid in the X-Y plane.

The build platform 14 and the heating unit 22 are vertically displaceable along the Z-axis by a pair of linear build platform actuators 26 located below the heating unit 22. The build platform actuators 26 are spaced apart along the Y-axis of the apparatus 10.

The material deposition arrangement 18 is configured to travel across the working area 28 to deposit layers of powder material onto the build platform 14 to form a material bed 25, in use. The material feeding mechanism 19 is configured to refill the material deposition arrangement 18 with powder material between layers. The thickness of the deposited layer is typically of the order of 30 um to 1000 um. The material container 16 extends around the build platform 14 in the X-Y plane. The material container 16 has sidewalls 17 that are insulated by a thermal insulation material.

A layer 21 of thermal insulation material is also provided on a bottom side of the heating unit 22.

The apparatus 10 further includes a moving arrangement which includes a pair of parallel, vertically spaced apart scanner rails 30 which extend along the Y-axis and to which the scanning unit 20 is movably mounted.

The scanning unit 20 includes a galvanometer scanner and is configured to steer an energy beam in the form of a laser beam for consolidating powder material deposited in the working area 28 into a solid object, as will become apparent from what follows. A beam path 27 of the laser beam is shown in FIG. 1 and FIG. 2.

The scanning unit 20 is coupled to an energy source in the form of a laser (not shown) at an energy source coupling 29 and is configured to employ continuous scanning while in motion. In use, the position of the scanning unit 20, relative to the material bed 25, is constantly measured with a linear encoder (not shown) while the scanning unit 20 is in motion. The positional data is fed to a control system (illustrated in FIG. 3) of the scanning unit 20 and the control system controls/corrects a scan pattern based on the positional information to ensure that the laser beam is steered to consolidate the material accurately. This allows the scanning unit 20 to scan the required scan patterns while in motion. These aspects will be described in greater detail below.

The scanning unit 20 is configured to provide an energy beam which has a so-called "reduced scan area". In other words, the scanning unit 20, when in a certain position along the Y-axis, is capable of scanning a two-dimensional scanning area which is substantially smaller than the working area 28 in the X-Y plane, and therefore also substantially smaller than the material bed 25. As clearly illustrated in FIGS. 1 and 2, the scanning area is in the form of a relatively narrow strip 48 which extends for the entire width of the build platform 14 along the X-axis. In this exemplary embodiment, the strip 48 has a length of 600 mm and a width of 20 mm.

The apparatus 10 further includes an enclosure 32 located between the scanning unit 20 and the working area 28. The enclosure 32 is formed by a rectangular box-like element with an open bottom and a rectangular opening 34 at its top through which the energy beam is directed onto the working area 28 and material bed 25, in use. The enclosure 32 is mounted to a pair of parallel, horizontally spaced apart enclosure rails 36 which extend along the Y-axis (one of the rails is not visible in the drawings, as they show sectional views).

The moving arrangement further includes linear actuators (not shown). The linear actuators are configured to move the scanning unit 20 and the enclosure 32 simultaneously along the scanner rails 30 and enclosure rails 36, respectively, in such a manner that the scanning unit 20 and enclosure 32 remain aligned, or in register, to ensure that the beam path 27 always coincides with the opening 34 in the enclosure. This aligned position is clearly shown in FIG. 2.

In this example the length of the opening 34 is the same as the length of the scan strip (600 mm) to ensure that the laser beam can be directed onto the material bed 25. The width of the opening 34 should be at least double the width of the scan strip to ensure that the strip can be completely scanned while the scanning unit 20 is in motion without the enclosure 32 interfering with the beam path 27. In this example the width of the opening 34 is 50 mm.

Figure 3:
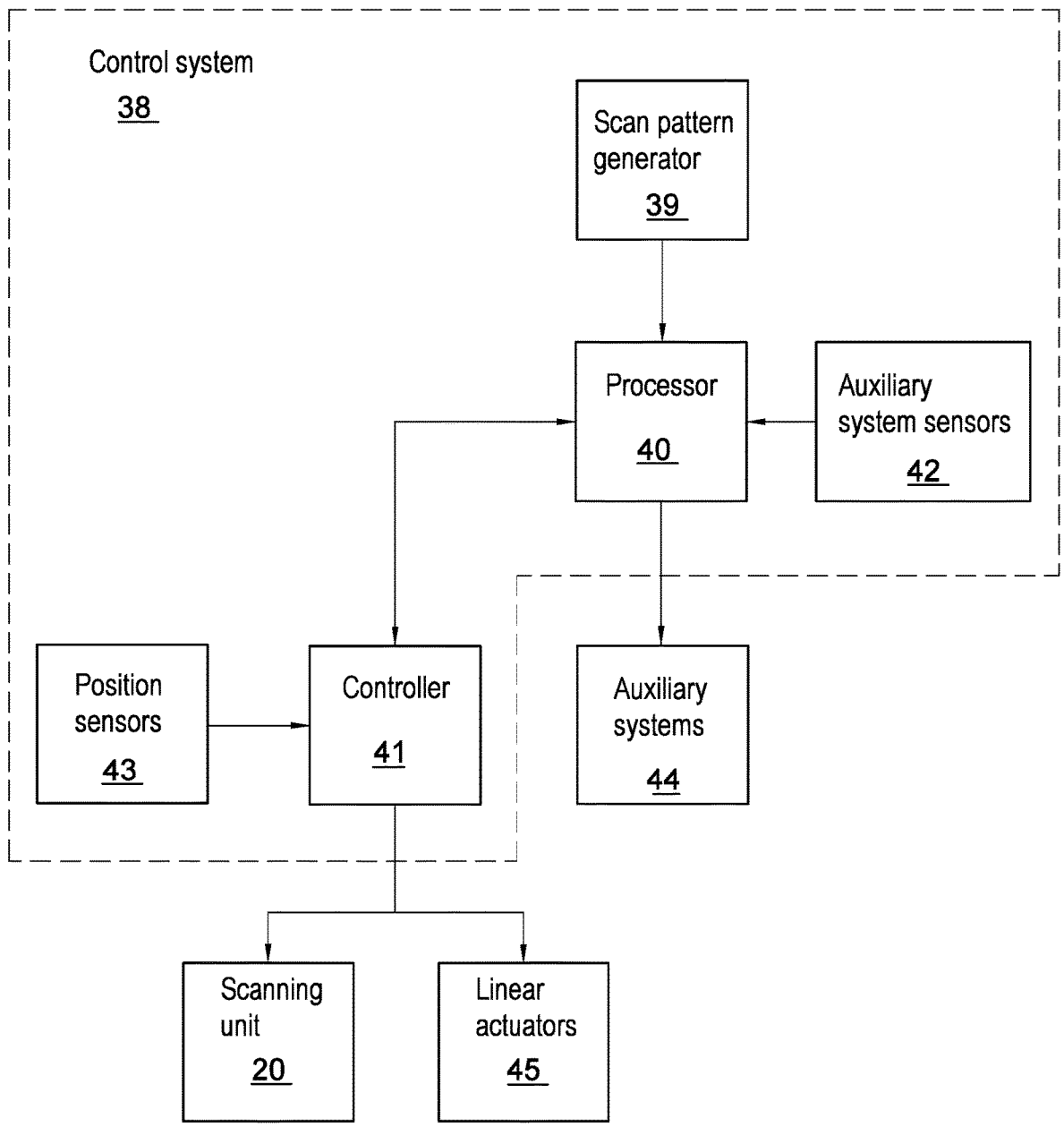
FIG. 3 is a block diagram illustrating functional components of a control system of the additive manufacturing apparatus of FIG. 1.

The apparatus 10 includes a control system 38, which is not shown in FIGS. 1 and 2. However, functional components of the control system 38 are illustrated in FIG. 3.

The control system 38 includes a scan pattern generator 39, a processor 40, a controller 41, auxiliary system sensors 42 and positional sensors 43. FIG. 3 also illustrates the scanning unit 20, auxiliary systems 44 and linear actuators 45 which are coupled to the control system 38.

The scan pattern generator 39 is configured to generate scan patterns to be scanned for each layer and strip associated with CAD data of a part to be scanned. Scan patterns and strategies will be described in greater detail with reference to FIGS. 20 to 25 below.

The processor 40 is configured to: receive scan pattern data from the scan pattern generator 39, send the scan pattern data to the controller 41, receive feedback from the controller 41, control the auxiliary systems 44, receive feedback from the auxiliary system sensors 42, and process feedback from the controller 41 and auxiliary system sensors 42 into control instructions.

The controller 41 is configured to: control the scanning unit 20 and the linear actuators 45 of the apparatus 10, receive positional feedback from the positional sensors 43, process the positional feedback into motion instructions and scanning instructions, and provide feedback to the processor 40.

The scanning unit 20 is in turn configured to receive scanning instructions from the controller 41 and to steer the energy beam onto the material bed 25 to scan contours and hatch lines, in use.

The linear actuators 45 are configured to receive motion instructions from the controller 41 and to move the scanning unit 20 and the enclosure 32 while the scanning unit 20 is scanning.

The auxiliary system sensors 42 are configured to provide feedback on the status of the auxiliary systems 44 of the apparatus 10 to the processor 40. Depending on the implementation, the auxiliary systems 44 can include one or more of: preheating systems, material deposition arrangements, extraction systems, build platform actuation arrangements, process monitoring and control systems, layer quality monitoring systems and atmospheric control units.

The positional sensors 43 include position encoders capable of determining the position of the scanning unit 20 relative to the build platform 14. The positional sensors 43 are configured to transmit positional feedback to the controller 41.

The scanner rails 30 and linear actuators 45, which are controlled by the control system 38, permit the scanning unit 20 and the enclosure 32 to be moved relative to the build platform 14 along the Y-axis by movement of the scanning unit 20 along the scanner rails 30 and the enclosure 32 along the enclosure rails 36, while the build platform 14 remains stationary along the Y-axis.

In use, the heating unit 22 heats material deposited in the working area 28 to a temperature which is below its melting point. This has the advantage of potentially increasing production rate since less input energy is required from the energy source to melt the material. Additionally, it has the advantage of reducing residual stresses in the material being formed. For example, stress relieving of certain titanium alloys occurs between 480° C. and 650° C., while the alloy only melts between 1604° C. and 1660° C. Thus, if a preheat in excess of 480° C. is applied to the material bed 25, the thermal stresses that develop during the rapid solidification process, will be relieved. Preheating may further produce more ductile microstructures and decrease the crack sensitivity of the material by lowering yield stress of said material.

The apparatus 10 then forms an object by additive manufacturing. Successive layers of material are deposited in the working area 28 to form the material bed 25, and portions of each deposited layer are consolidated and fused to the preceding consolidated layer using the energy beam directed by the scanning unit 20. Each consolidated portion corresponds to a particular cross-section or two-dimensional slice of the object to be formed, and the energy beam is directed at specific areas on the material bed 25 according to the geometry of the CAD model in question.

As mentioned above, the scanning unit 20 has a reduced scan area and is not capable of scanning the entire length of the build platform 14 from a particular position along the Y-axis. Accordingly, to consolidate at least some of the layers, individual layers (being two-dimensional slices of the object taken from its CAD geometry) are divided into narrower two-dimensional strips. These narrower two-dimensional strips are then scanned, one two-dimensional strip at a time, in order to complete scanning of the layer.

To scan the individual two-dimensional strips, the scanning unit 20 is moved continuously in the Y-axis. The control system 38 uses the positional sensors 43 to sense when the scanning unit 20 and enclosure 32 are in the correct position to allow for the first two-dimensional strip to be scanned through the opening 34 in the enclosure 32 and starts scanning. The speed of the scanning unit 20 is calculated based on the scan time of each scan strip, taking into account the contours and hatch lines to be scanned, to ensure that the complete strip can be scanned before the scanning unit 20 and enclosure 32 passes the area where the strip is to be scanned. When the scanning unit has completed scanning of the scan strip, the control system 38 again uses positional feedback from the positional sensor to trigger the scanning of the subsequent scan strip when the scanning unit 20 and enclosure 32 are in position. This process is repeated until the entire layer is scanned. To allow the scanning unit to scan while in motion, the scanning unit continuously uses the positional sensor feedback to update the position of the scanner in order to correct the position of the scan lines.

After depositing a particular layer of material in the working area and consolidating a portion of the particular deposited layer in a strip-by-strip manner, the build platform 14 is incrementally moved, along the Z-axis and away from the scanning unit 20, using the linear build platform actuators 26, before depositing a further layer of material in the working area 28 for consolidation in the manner described above. It will be appreciated that the movement of the build platform along the Z-axis will correspond to the thickness of the layer of material being deposited such that an upper surface of a material bed formed by the material deposited on the build platform will remain at a constant distance from the scanning unit 20.

The direction in which material is deposited and in which each layer is scanned may alternate between layers. As an example, the first layer of material may be deposited from left to right (as seen in FIGS. 1 and 2). As soon as a portion of the layer has been deposited, the scanning unit 20 and enclosure 32 may follow the material deposition arrangement 18 along the Y-axis from left to right and the scanning process can start, while the material deposition arrangement 18 is still depositing powder. When the complete layer has been scanned, the material deposition arrangement 18 can move from right to left along the Y-axis to deposit material in the opposite direction. Again, as soon as a portion of the layer has been deposited, the scanning unit 20 and enclosure 32 may follow the material deposition arrangement 18 and scan the layer from right to left. This process may continue until all layers have been processed.

Since the direction of scanning is varied, and the scanning unit 20 and enclosure 32 always follow the material deposition arrangement 18, the material deposition arrangement 18 and enclosure 32 need to pass each other. To permit this, the material deposition arrangement 18 and enclosure 32 are mounted on different linear rails and are actuated by different mechanisms. The material deposition arrangement 18 is mounted to a rail 47 below the enclosure rail 36 and the enclosure 32 is further coupled to a vertical displacement mechanism 49 configured to permit upward displacement of the enclosure 32 along the Z-axis to provide clearance for the material deposition arrangement 18 to pass between the enclosure 32 and the material bed 25 when depositing material across the working area 28.

The scanning unit 20 is capable of scanning a contour or periphery of the object being formed which falls within the particular two-dimensional strip being scanned at a point in time, as well as scanning the portion of the object which falls within the periphery, or vice versa.

Figure 4:
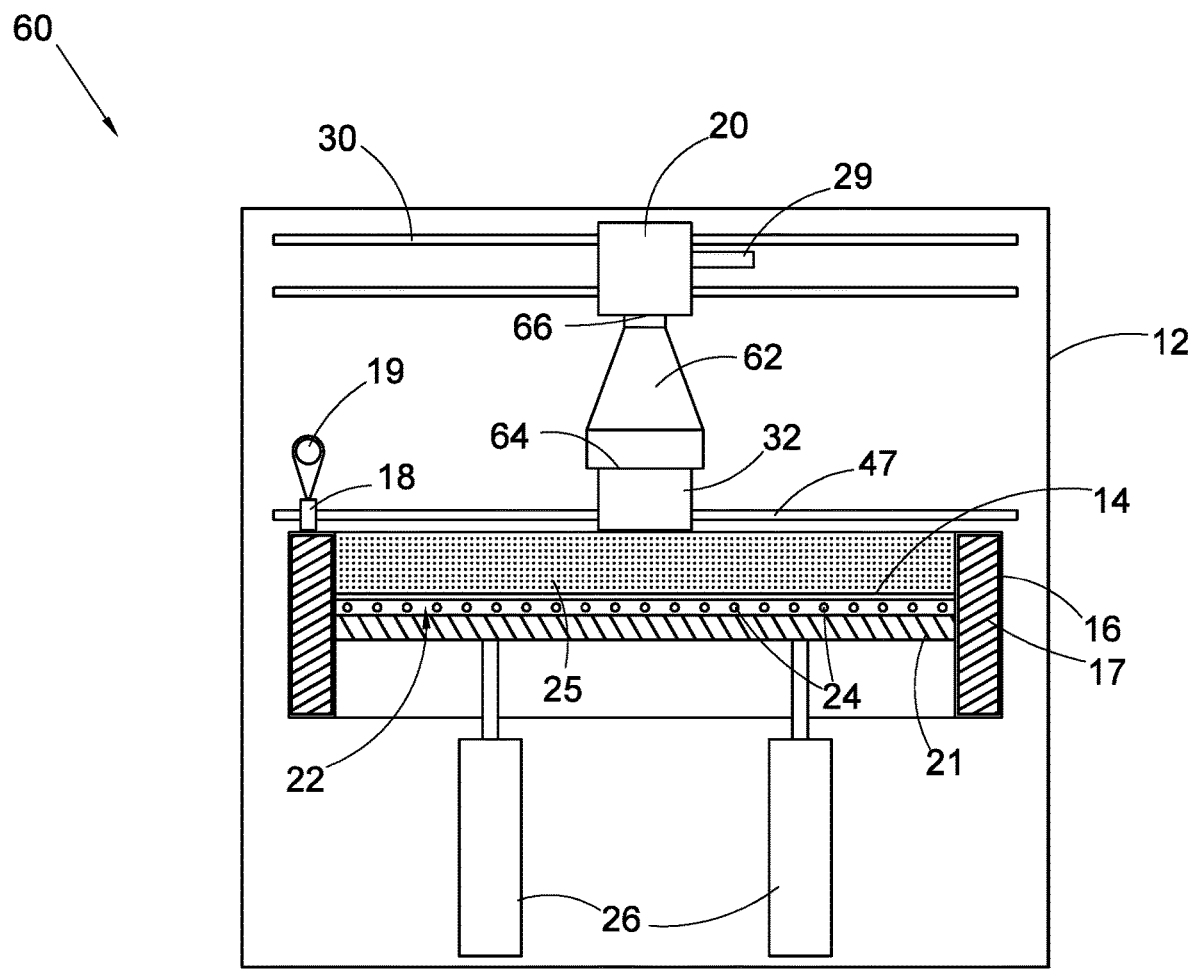
FIG. 4 is a front sectional view of a second embodiment of an additive manufacturing apparatus according to the invention.

A second embodiment of an AM apparatus 60 is shown in FIG. 4. The AM apparatus 60 is substantially similar to the apparatus 10 of FIGS. 1 and 2, and like reference numerals are used to refer to like components, regions and elements.

The apparatus 60 differs from the apparatus 10 of FIGS. 1 and 2 in that it includes a beam cover 62 arranged between the scanning unit 20 and the build platform 14. At a first end 64 thereof, the beam cover 62 is integrally formed with the enclosure 32, while it is attached to a beam exit region of the scanning unit 20 at a second end 66 thereof.

The beam cover 62 is configured substantially to isolate the energy beam provided by the scanning unit 20, as well as the reduced scan area described above, from an external environment (e.g. dust and other particulate material).

The apparatus 60 further differs from the apparatus 10 of FIGS. 1 and 2 in that the enclosure 32 is not moved along the Y-axis by way of enclosure rails. Instead, as the enclosure 32 and the beam cover 62 are integrally formed and the beam cover 62 is attached to the scanning unit 20, movement of the scanning unit 20 along the scanner rails 30 causes simultaneous movement of the beam cover 62 and the enclosure 32 along the Y-axis, thereby ensuring that the beam path 27 always coincides with the opening 34 in the enclosure 32.

To ensure that the material deposition arrangement 18 and the enclosure 32 do not clash when changing the scanning direction between layers, the enclosure may be actuated in the Z-axis to allow the material deposition arrangement 18 to pass underneath the enclosure 32. The beam cover 62 may accommodate this movement by allowing a sliding arrangement that permits the enclosure 32 to move inside the beam cover 62, or by use of a flexible beam cover that can deform when the enclosure 32 is actuated in the Z-axis.

Figure 5:
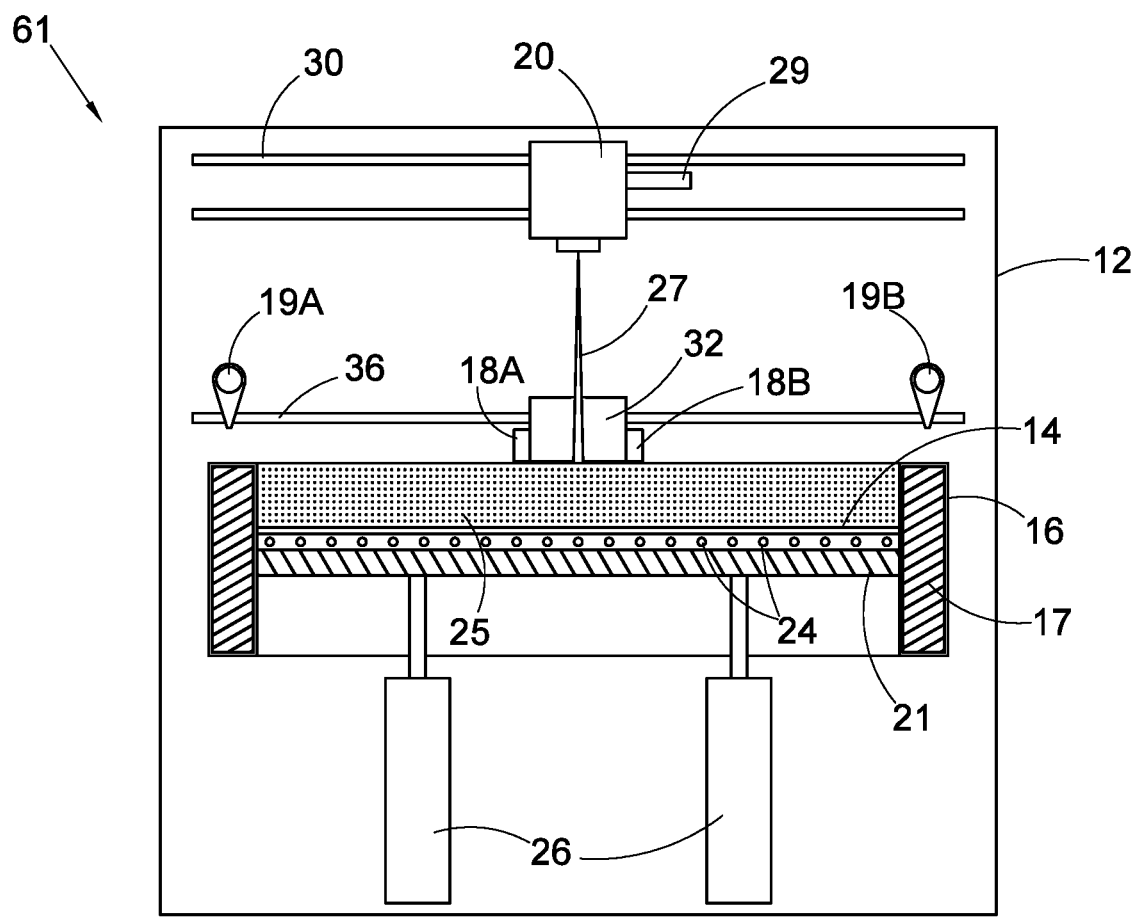
FIG. 5 is a front sectional view of a third embodiment of an additive manufacturing apparatus according to the invention.

A third embodiment of an AM apparatus 61 is shown in FIG. 5. The AM apparatus 61 is substantially similar to the apparatus 10 of FIGS. 1 and 2, and like reference numerals are used to refer to like components, regions and elements.

In this embodiment, two material deposition arrangements 18A and 18B are used and the deposition arrangements 18A and 18B are mounted onto opposite sides of the enclosure 32. Two material feeding mechanisms 19A and 19B are used which are on opposites sides of the build platform 14. The material deposition arrangements 18A and 18B thus deposit material as the scanning unit 20 and enclosure 32 is moved across the material bed 25. In this configuration, material deposition and material consolidation happens in parallel. When the scanning unit 20 is translated from left to right, the material deposition arrangement 18B on the right will deposit material. When the scanning unit 20 is translated from the right to the left, the deposition arrangement 18A on the left will deposit material. The material deposition arrangement 18A on the left is refilled with material by the material feeding mechanism 19A on the left, and the material deposition arrangement 18B on the right is refilled with material by the material feeding mechanism 19B on the right. The enclosure 32 may be mounted to its own dedicated guide rail (not shown) for Y-axis movement or it may be attached to the scanning unit 20 as described above.

Figure 6:
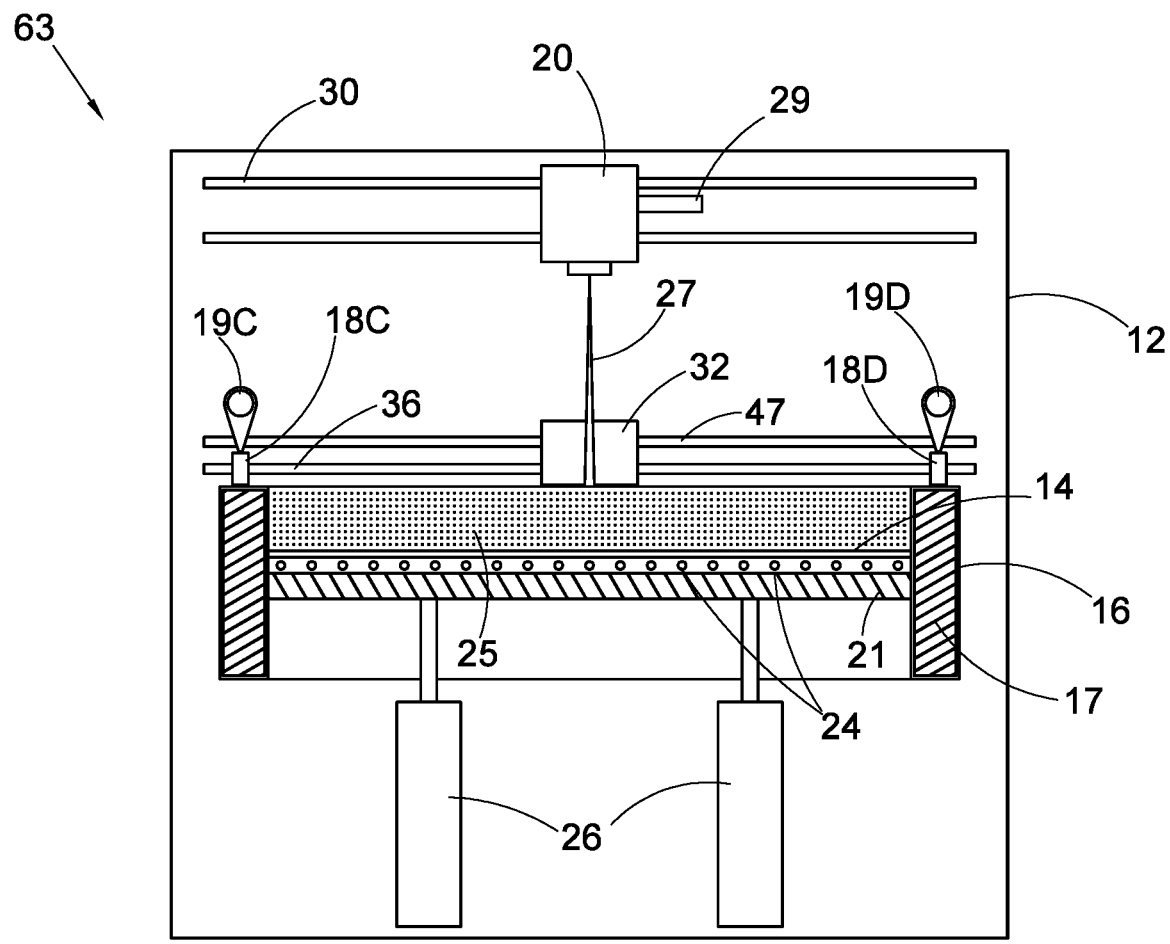
FIG. 6 is a front sectional view of a fourth embodiment of an additive manufacturing apparatus according to the invention.

A fourth embodiment of an AM apparatus 63 is shown in FIG. 6. The AM apparatus 60 is substantially similar to the apparatus 10 of FIGS. 1 and 2, and like reference numerals are used to refer to like components, regions and elements.

In this embodiment, two rail mounted deposition arrangements 18C and 18D are used which are mounted on opposite sides of the enclosure 32. Two material feeding mechanisms 19C and 19D are used which are on opposites sides of the build platform 14. In this configuration, the material deposition arrangement 18C on the left will be used to deposit material when the scanning unit 20 is translated from right to left and will be refilled with material by the material feeding mechanism 19C on the left. The material deposition arrangement 18D on the right will deposit material when the scanning unit 20 is translated from left to right and will be refilled with material by the material feeding mechanism 19D on the right.

In this embodiment, the enclosure 32 is not actuated along the Z-axis, since it is not necessary for the material deposition arrangements 18C and 18D to pass the enclosure along the Y-axis.

Figure 8:
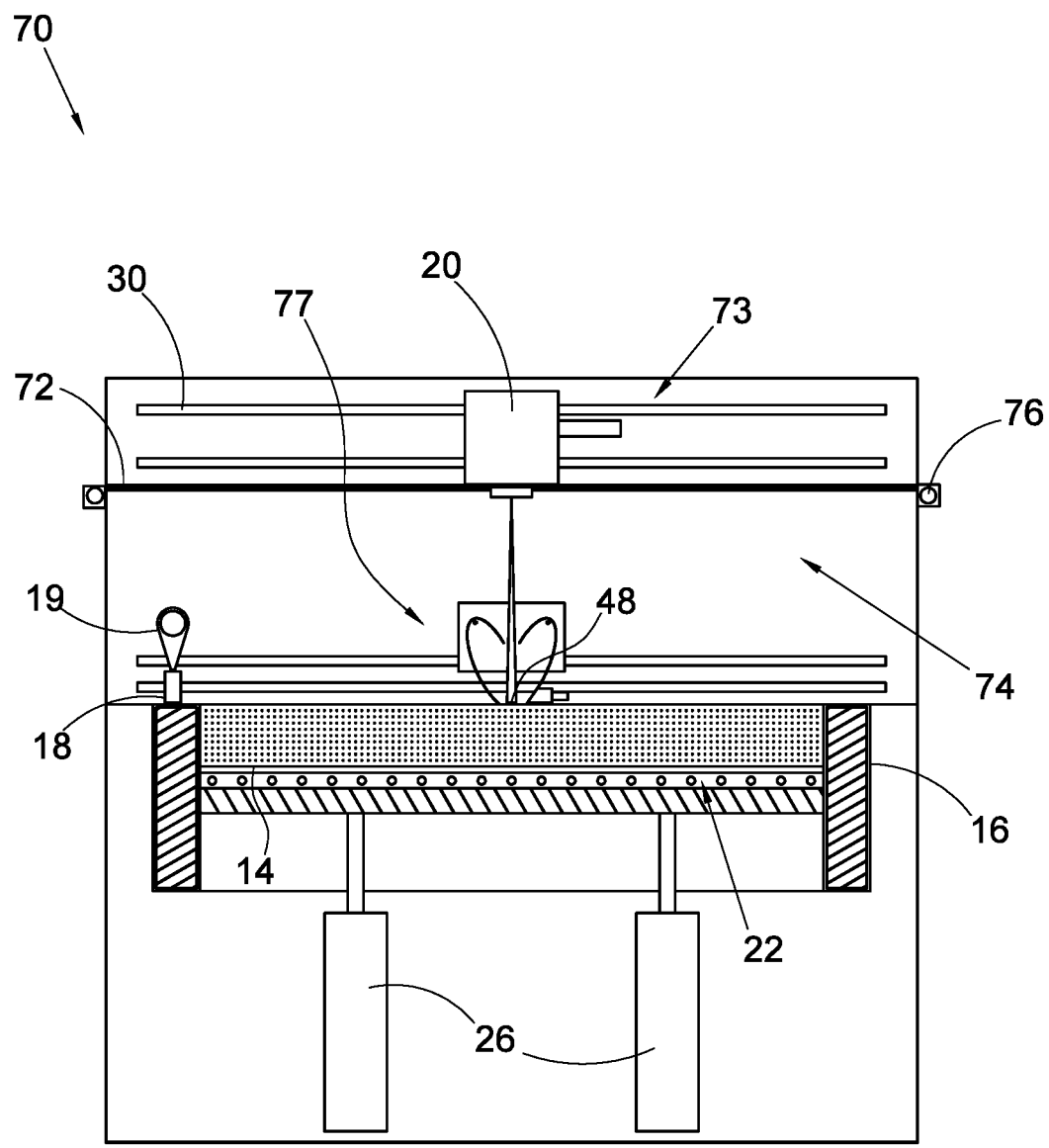
FIG. 8 is a front sectional view of the additive manufacturing apparatus of FIG. 7.

A fifth embodiment of an AM apparatus 70 is shown in FIGS. 7 and 8. The AM apparatus 70 is substantially similar to the apparatus 10 of FIGS. 1 and 2, and like reference numerals are again used to refer to like components, regions and elements.

The apparatus 70 differs from the apparatus 10 of FIGS. 1 and 2 in that it includes a cover plate 72 disposed directly below the scanning unit 20 along the Z-axis. The cover plate 72 is generally planar and extends parallel to the material bed 25.

The cover plate 72 separates a body of the scanning unit 20, and thus an optical chamber 73, from a process chamber 74 in which objects are operatively formed.

It has been found that the functioning of optical systems is adversely affected and damage may occur at elevated temperatures and in the presence or air borne contaminants, both of which may be present in the process chamber 74. The cover plate 72 is configured to separate the optical chamber 73 from the process chamber 74 while ensuring that the beam exit region of the scanning unit 20 remains open to allow scanning of material. The cover plate 72 consists of two separate thin sheets of material to the left and right of the scanning unit 20 that are connected to each other at the scanning unit 20. Each sheet of material is coiled into a cover plate mechanism 76 when the scanning unit moves towards the cover plate mechanism 76 and uncoiled from the mechanism 76 when the scanning unit 20 moves away from the cover plate mechanism 76. Coiling and uncoiling can be achieved using coil springs, or by using motors to actively coil or uncoil the sheets.

Edge portions of the cover plate 72 run inside longitudinal cover plate guides 78 with seals along the Y-axis to ensure separation between the process chamber 74 and the optical chamber 73. The seals also ensure that the cover plate 72 is maintained in a horizontal position during operation.

The apparatus 70 of FIGS. 7 and 8 also differs from the apparatus 10 of FIGS. 1 and 2 in that, instead of the enclosure 32 of the apparatus 10, it includes a heating and extraction arrangement 77 proximate to the strip 48. The heating and extraction arrangement 77 permits localised heating of the material in the area being scanned which obviates the need for or supplements the heating unit 22, thereby reducing energy requirements and/or reducing the thermal gradients in the material in the Z-direction. Reducing the thermal gradient will allow microstructure control and reduce thermally induced residual stress. Heating arrangements according to embodiments of the invention are described in greater detail below.

The heating and extraction arrangement 77 is movable along the Y-axis together with the scanning unit 20 in the same manner as the enclosure 32 of FIGS. 1 and 2 (i.e. by way of a horizontal guide rail).

Figure 9:
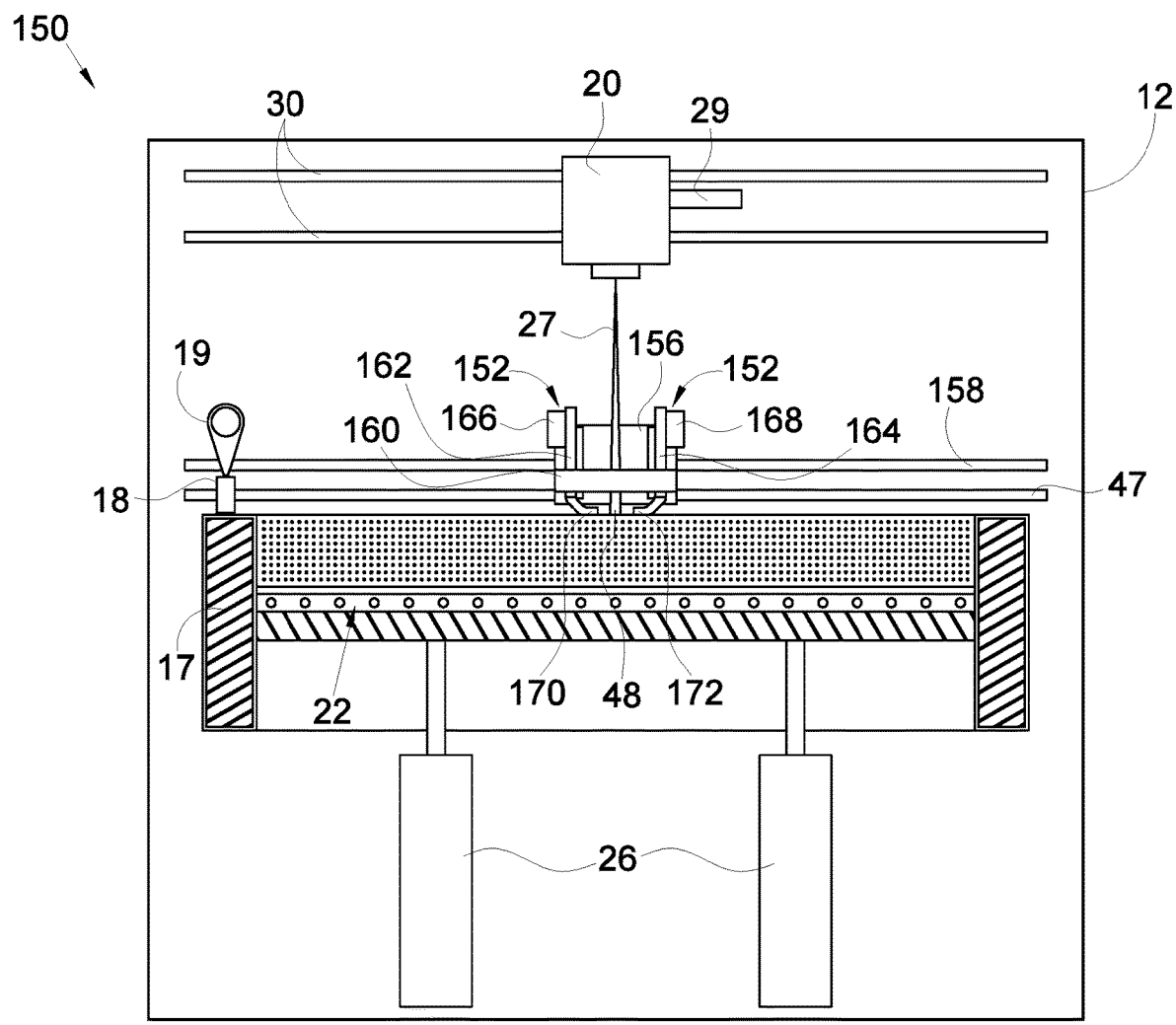
FIG. 9 is a front sectional view of a sixth embodiment of an additive manufacturing apparatus according to the invention.
Figure 10:
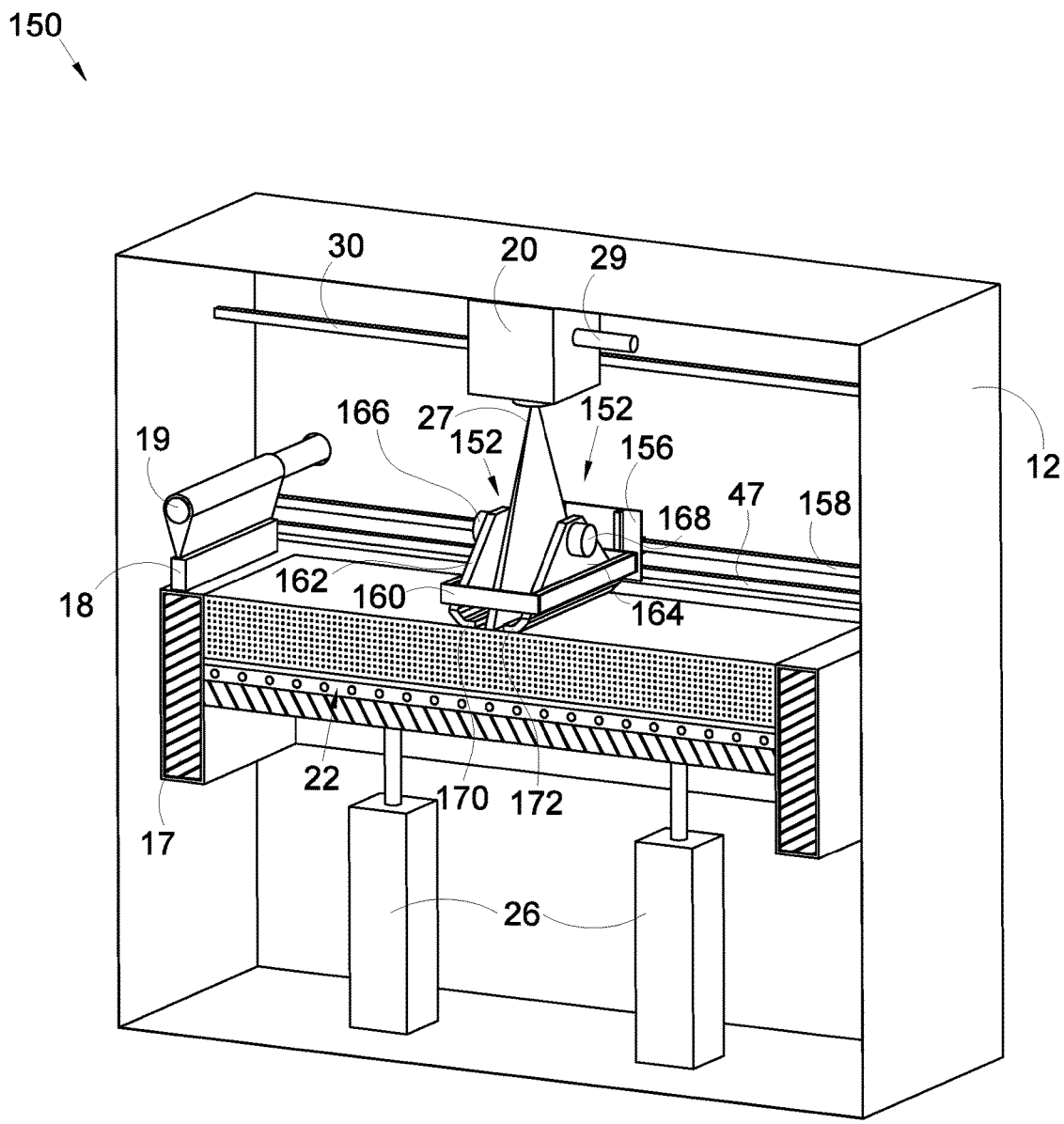
FIG. 10 is a three-dimensional view of the additive manufacturing apparatus of FIG. 9.

A sixth embodiment of an AM apparatus 150 is shown in FIGS. 9 and 10. The AM apparatus 150 is substantially similar to the apparatus 10 of FIGS. 1 and 2, and like reference numerals are again used to refer to like components, regions and elements.

The apparatus 150 differs from the apparatus 10 of FIGS. 1 and 2 in that it does not include the enclosure 32. Instead, the apparatus 150 includes an extraction arrangement 152 for extracting vapour, spatter and the like from the scan area (i.e. the region in the strip 48 being scanned).

The extraction arrangement 152 includes a frame member 160 which is rectangular in top view and which is configured to extend about the strip 48, or scan area, as is best shown in FIG. 10. Two upwardly extending extraction members 162, 164 are attached to the frame member 160 on opposite sides of the strip 48 or scan area. Each extraction member 162, 164 defines, at its bottom end, an elongated extraction opening or nozzle 170, 172 located directly adjacent the strip 48 or area, and, at its top end, a round extraction port 166, 168. The extraction ports 166, 168 are connected to an extraction pump (not shown) via a flexible hose (not shown), in use. The extraction members 162, 164 are configured to extract vapour and/or spatter from the scan area, away from the beam path. The extraction members 162, 164 may operate simultaneously or only one extraction member 162, 164 may operate at a certain point in time.

Typically, when the extracting arrangement 152 is being moved, it is desirable to extract vapour/spatter in a direction of extraction away from its leading side. To achieve this continuously, the direction of extraction can be reversed in accordance with changes in the direction of movement of the scanning unit 20 and the extraction arrangement 152. In other words, when moving the scanning unit 20 in one direction, extraction member 162 may be operational, while extraction member 164 may be inactive. When moving the scanning unit in another direction (in this case the opposite direction), the extraction member 164 may be operational while the extraction member 162 is inactive. Extraction takes place through the nozzle 170, 172 and vapour/spatter is expelled through the port 166, 168. This may ensure that the direction of extraction is away from the scan area, in use.

The extraction arrangement 152 thus provides a gas extraction system on both sides of the strip 48 or scan area, with gas flow being evenly distributed from the round port 166, 168 to the elongated extraction nozzle 170, 172 at the scan area, and which enables extraction to be effected away from the strip 48 so as not to interfere with the beam path.

The extraction arrangement 152 is movable relative to the build platform 14 in the Y-direction and in the Z-direction by way of a moving arrangement which includes two pairs of guide rails. Specifically, the frame member 160 of the extraction arrangement 152 is mounted to a pair of Y-axis guide rails 158 and to a set of Z-axis guide rails 156, as shown in FIGS. 9 and 10. In this way, the extraction arrangement 152 can be moved in the horizontal or Y-direction to ensure that the extraction arrangement 152 remains in register with the scanning unit 20. Furthermore, the extraction arrangement 152 can be moved upwardly and downwardly in the Z-direction in an independent manner to ensure that movement of the material deposition arrangement 18 is not impeded during use, as described above. The extraction arrangement 152 is operatively moved by linear actuators (not shown).

Figure 12:
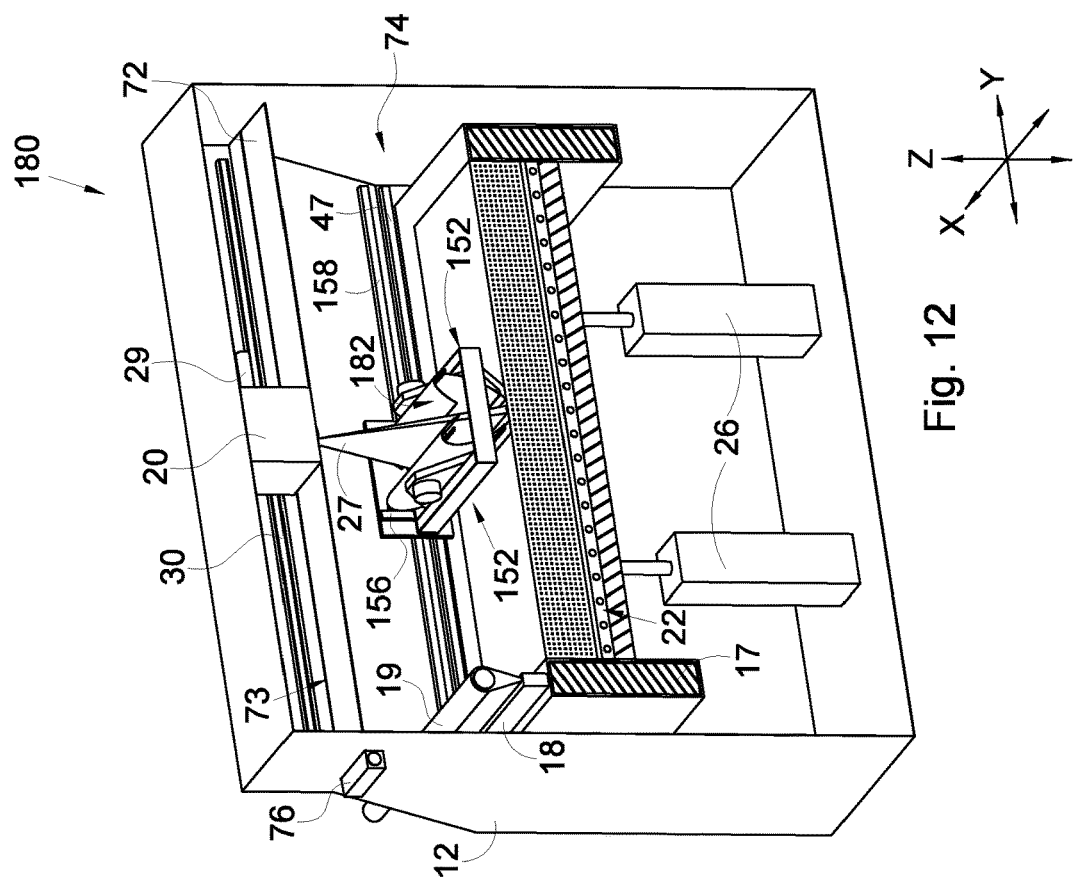
FIG. 12 is a three-dimensional view of the additive manufacturing apparatus of FIG. 11.
Figure 11:
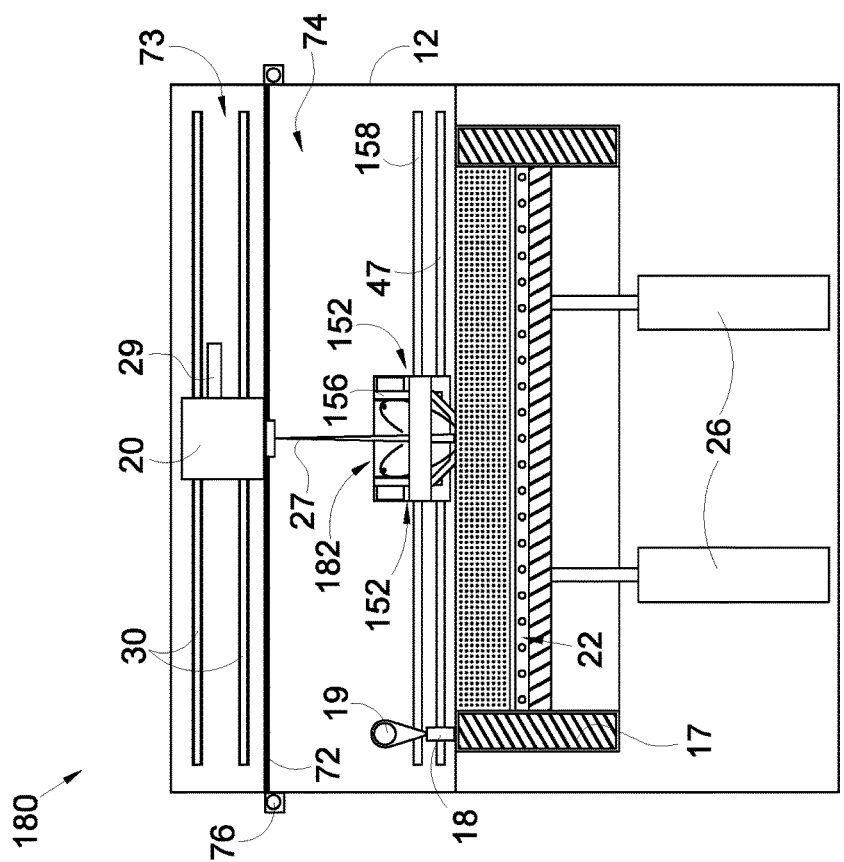
FIG. 11 is a front sectional view of a seventh embodiment of an additive manufacturing apparatus according to the invention.

A seventh embodiment of an AM apparatus 180 is shown in FIGS. 11 and 12. The AM apparatus 180 is substantially similar to the apparatus 10 of FIGS. 1 and 2, and like reference numerals are again used to refer to like components, regions and elements.

The apparatus 180 differs from the apparatus 10 of FIGS. 1 and 2 in that it does not include the enclosure 32. Instead, the apparatus 150 includes the extraction arrangement 152 as described with reference to FIGS. 9 and 10. The apparatus 180 further includes an infrared heating arrangement 182 secured to internal surfaces of the extraction arrangement 152, permitting localised heating of the material in the area being scanned which obviates the need for or supplements the heating unit 22, thereby reducing energy requirements and/or reducing the thermal gradients in the material in the Z-direction. The heating arrangement 182 is secured to as to move along the Y-axis and Z-axis along with the extraction arrangement 152. The features of heating arrangements such as the heating arrangement 182 will be described in greater detail below.

The apparatus 180 further includes the cover plate 72 as described with reference to FIGS. 7 and 8 which separates a body of the scanning unit 20, and thus an optical chamber 73, from a process chamber 74 in which objects are operatively formed.

Figure 13:
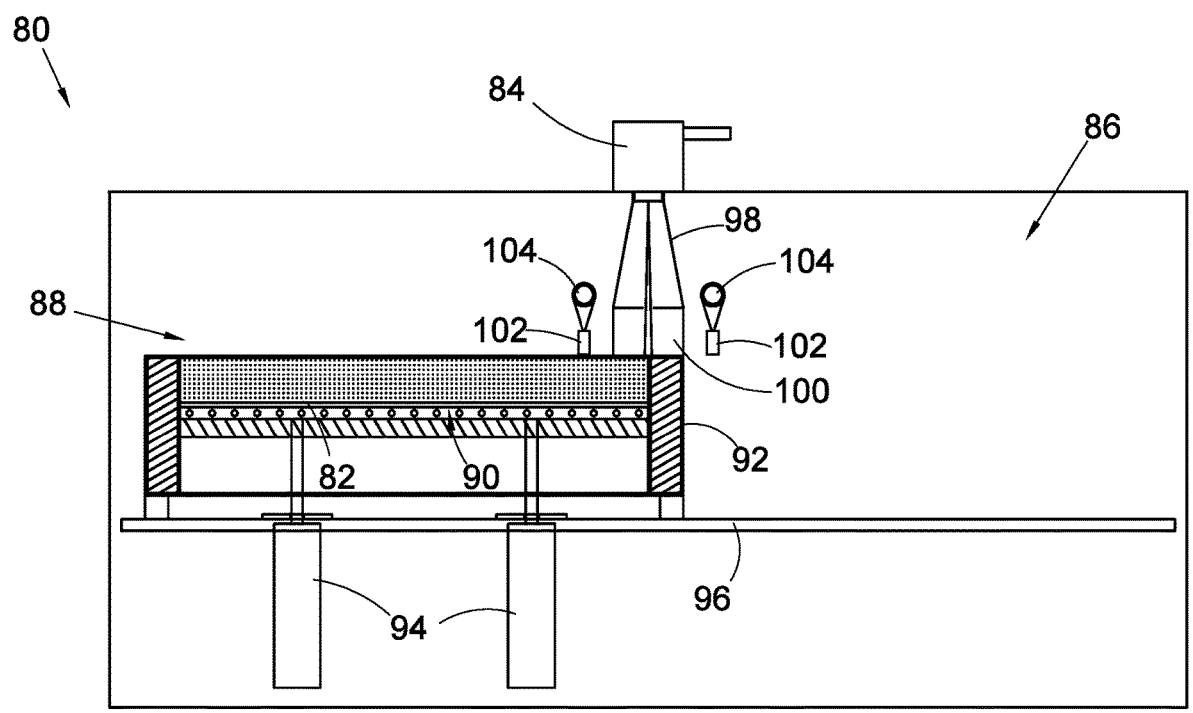
FIG. 13 is a front sectional view of an eighth embodiment of an additive manufacturing apparatus according to the invention.

An eighth embodiment of an AM apparatus 80 is shown in FIG. 13. In this embodiment, the build platform 82 and the scanning unit 84 are configured to be moved relative to each other along the Y-axis by movement of the build platform 82 and other components in the process chamber 86, while the scanning unit 84 remains stationary along the Y-axis.

In other words, the scanning unit 84 is fixedly mounted while the build platform 82 is movable along the Y-axis to permit each layer of material deposited in the working area 88 to be scanned in a strip-by-strip manner, as described above.

In this embodiment, the build platform 82, the heating unit 90, the material container 92 and the build platform actuators 94 are mounted to a build platform rail 96 for operative movement along the Y-axis. The scanning unit 84, beam cover 98, enclosure 100, material deposition arrangements 102 and material feeding mechanism 104 are fixedly mounted to walls of the process chamber 86.

In this embodiment, two material deposition arrangements 102 and two material feeding mechanisms 104 are used. The material deposition arrangement 102 on the left deposits material while the build platform 82 moves towards the right and the material deposition arrangement 102 on the right deposits material while the build platform 82 moves toward the left. The scanning unit 84 is capable of scanning the material while the material deposition arrangements 102 deposit material.

It has been found that it may be advantageous to fix the relatively sensitive optical system (i.e. the scanning unit 84) in position, while more robust components (such as the build platform) are permitted operatively to move relative to the optical system.

Figure 14:
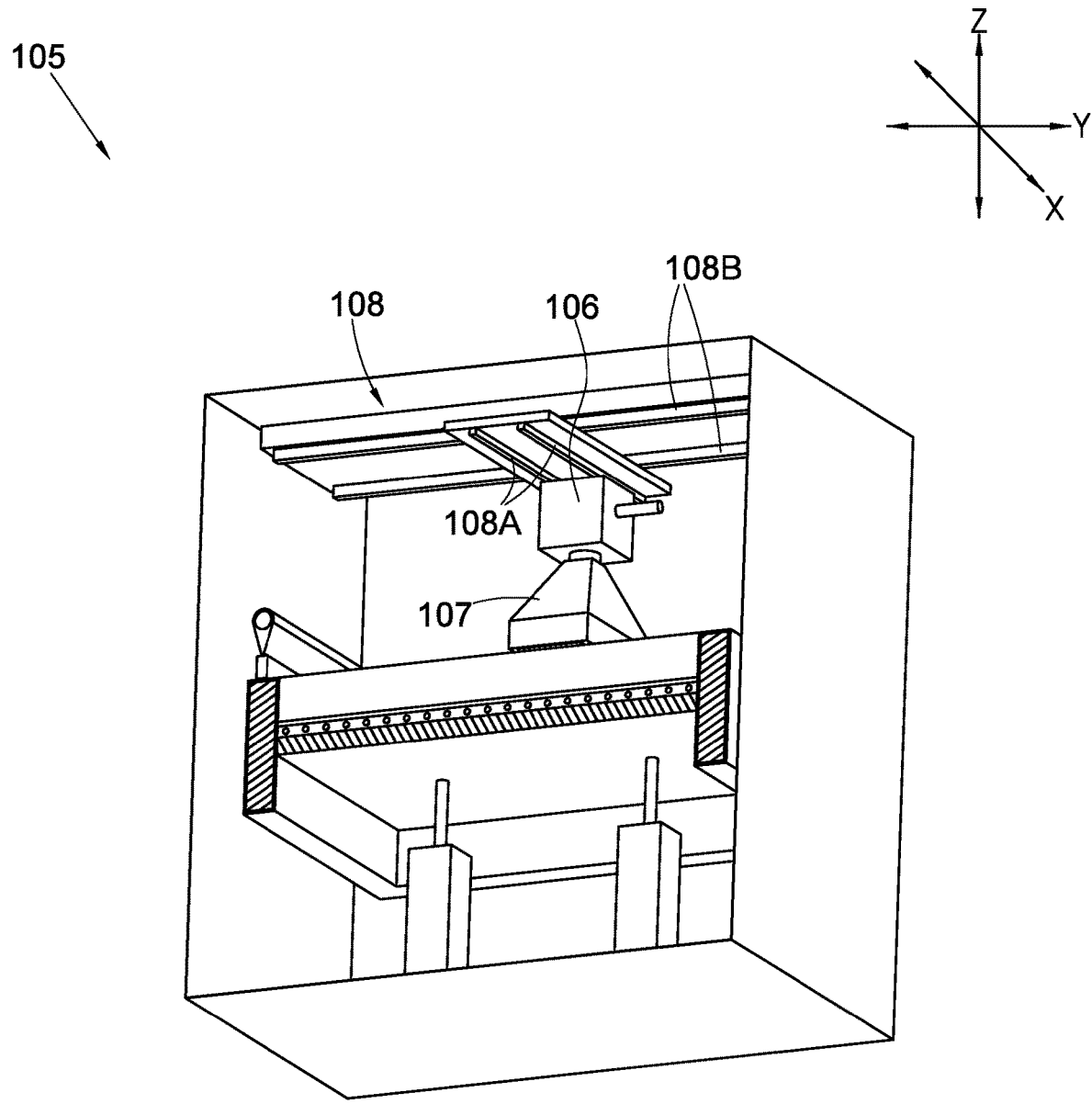

A ninth embodiment of an AM apparatus 105 is shown in FIGS. 14 and 15. In this embodiment, the scanning unit 106 and enclosure/beam cover 107 are mounted on a two-axis gantry system 108. The gantry system 108 provides a pair of X-axis rails 108A and a pair of Y-axis rails 108B that permit the scanning unit 106 to be moved along the X-axis and the Y-axis. This differs from the embodiments described above in that the scanning unit 106 is not only movable along the Y-axis relative to the build platform 109.

It should be appreciated that, alternatively, it may also be possible to move the build platform 109 along both the X-axis and Y-axis while mounting the scanning unit, enclosure and material deposition arrangement in a fixed position in order to provide an apparatus with similar capabilities.

This configuration allows the build platform 109 to be enlarged along the X-axis, as best shown in FIG. 15. Different sections 109A and 109B of the build platform 109 can be scanned by translating the scanning unit 106 along the X-axis.

Figure 16:
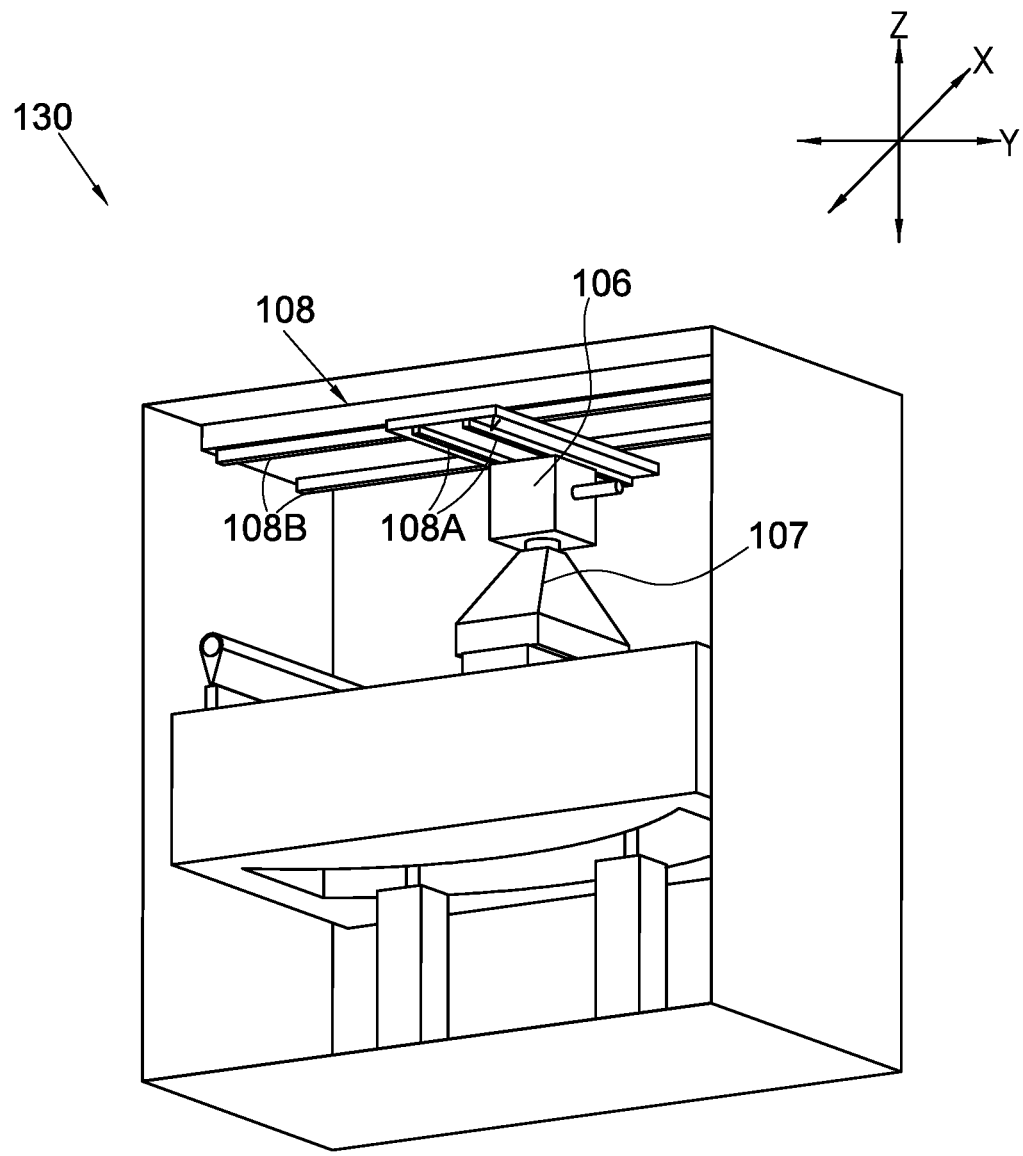
FIGS. 16-17 are three-dimensional views of a section of a tenth embodiment of an additive manufacturing apparatus according to the invention.
Figure 17:
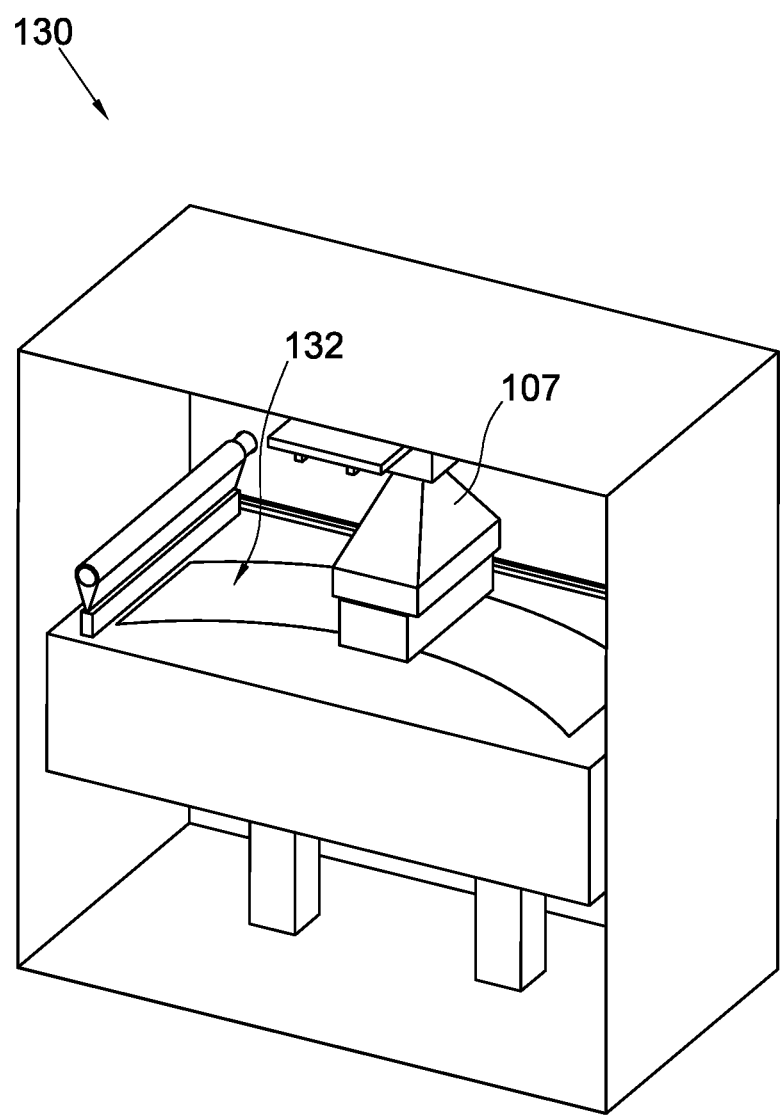

A tenth embodiment of an AM apparatus 130 is shown in FIGS. 16 and 17. The AM apparatus 130 is substantially similar to the apparatus 105 of FIGS. 14 and 15, and like reference numerals are used to refer to like components, regions and elements. However, in this embodiment, the build platform 132 is not rectangular in the X-Y plane, as in the embodiment of FIGS. 14 and 15. Instead, the build platform 132 is arcuate in the X-Y plane. It will be understood that this shape is primarily shown as an example and that a number of custom configurations may be used. It is believed that such a custom configuration has advantages where an apparatus is always or mostly required to produce a specific type of shape. For example, in the aerospace industry, the ribs in the hull of an aircraft are typically fairly long, narrow parts with a common radius (defined by the diameter of the aircraft hull). For these parts, a rectangular build platform would have to be relatively large to accommodate the shape of these parts and may thus not be an ideal solution, while a gantry-mounted scanning unit would be able to produce these type of parts more efficiently where synchronous movement between the X-axis and Y-axis axis allows for scanning over a build platform with a custom shape.

Figure 19:
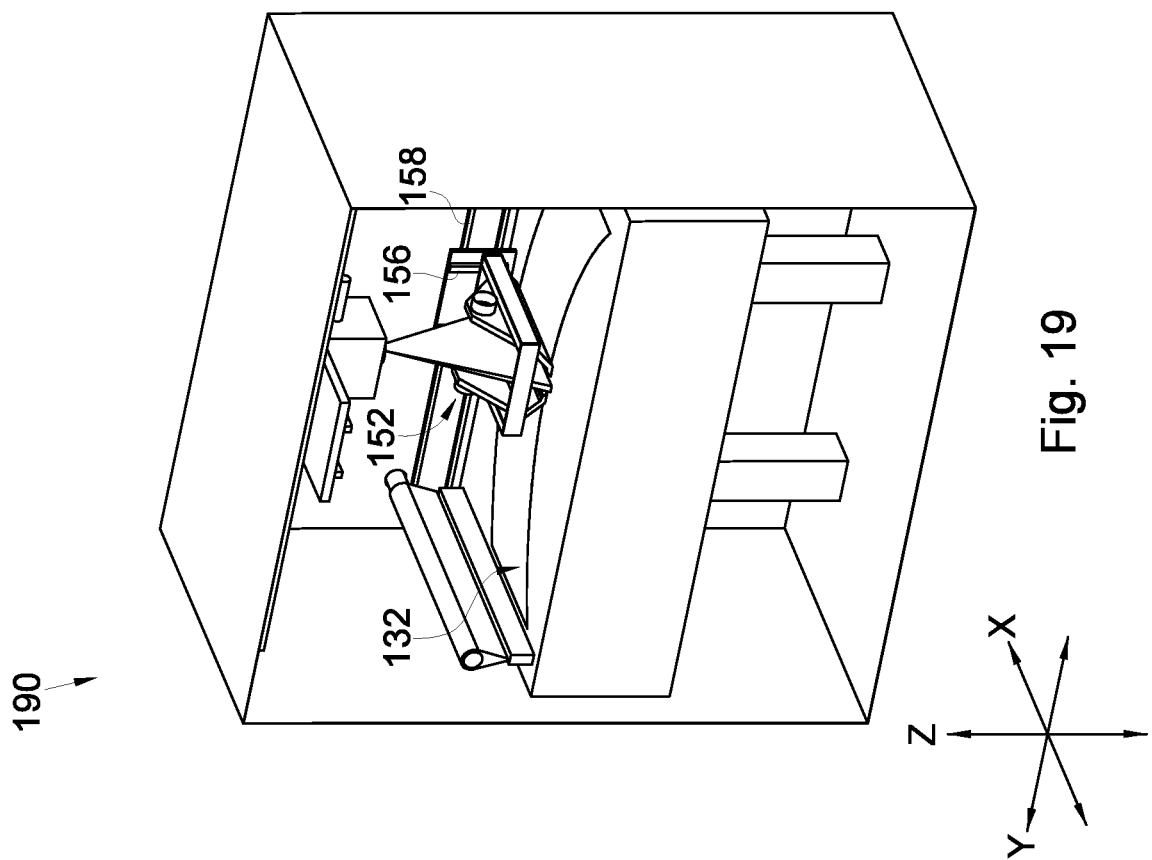
FIGS. 18-19 are three-dimensional views of a section of an eleventh embodiment of an additive manufacturing apparatus according to the invention.
Figure 18:
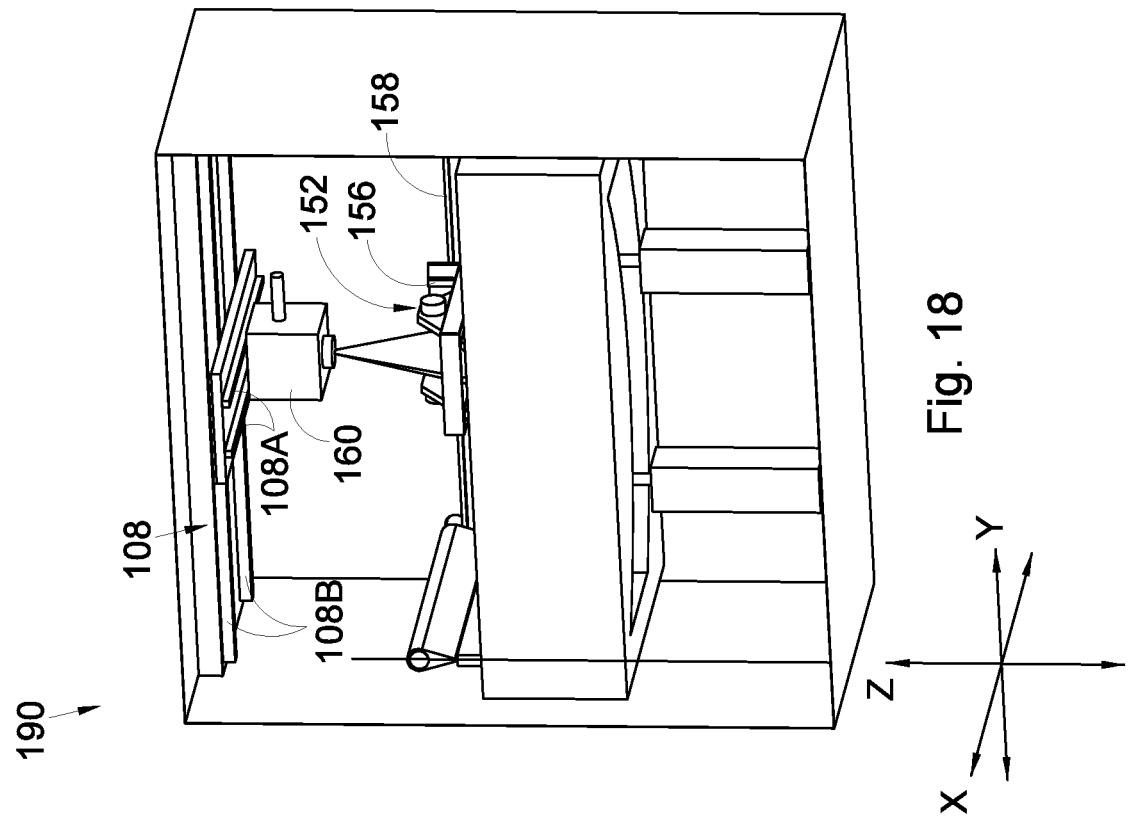

FIGS. 18 and 19 show an eleventh embodiment of an AM apparatus 190. The apparatus 190 is substantially similar to the apparatus 130 of FIGS. 16 and 17, and like reference numerals are used to refer to like components, regions and elements, but the apparatus 190 differs in that it is devoid of the enclosure/beam cover 107 and instead incorporates the independently movable extraction arrangement 152 as described with reference to FIGS. 9 and 10.

FIGS. 20 to 25 illustrate scanning strategies that may be employed when using an AM apparatus according to the invention.

A scanning strategy typically consists of line segments (with start and end coordinates) used to scan contours (edges of a part) and hatch lines (for filling the areas inside these contours).

Figure 20:
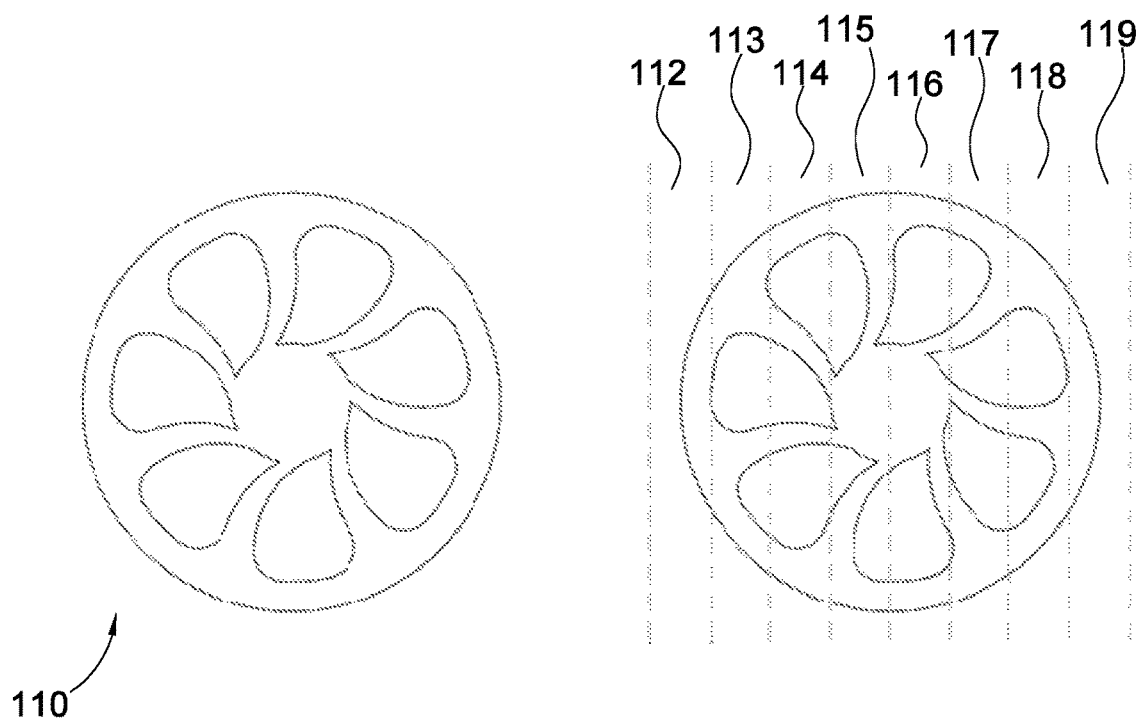
FIGS. 20-25 illustrate scanning strategies that may be employed when using an additive manufacturing apparatus according to the invention.

FIG. 20 illustrates the manner in which a two-dimensional slice 110 of a part, obtained from its CAD geometry, can be divided into smaller two-dimensional strips 112-119. It should be understood that the dimensions of the strips 112-119 may be fixed or variable.

The slice 110 of the part is scanned by scanning each strip 112-119 separately, while the scanning unit and building platform, and other components such as the enclosure or beam cover, are moved relative to each other. Heating systems and extraction systems may move together/simultaneously with the scanning unit and/or building platform.

Figure 21:
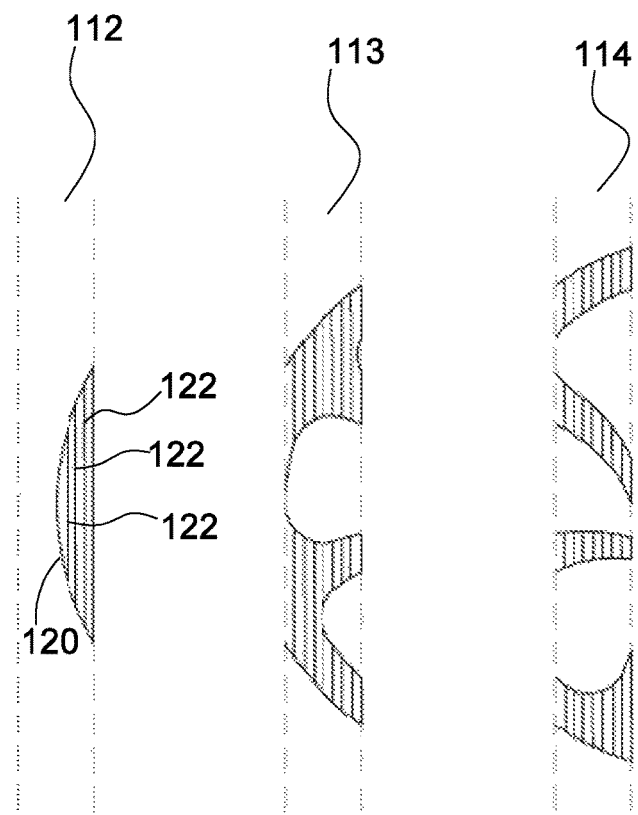

FIG. 21 illustrates an exemplary scan pattern for each strip 112-114. The contours 120 and hatch lines 122 for each strip are completed before the next strip is scanned, as illustrated in strip 112 of FIG. 21.

A position sensing device (e.g. a positional encoder) may be used to ensure that a strip is not scanned before all relevant hardware components (e.g. scanning unit, enclosure, heating and extraction systems) are in the correct position, thereby ensuring that the scanning unit only scans in the reduced area formed by the enclosure and/or other mechanical components.

Figure 22:
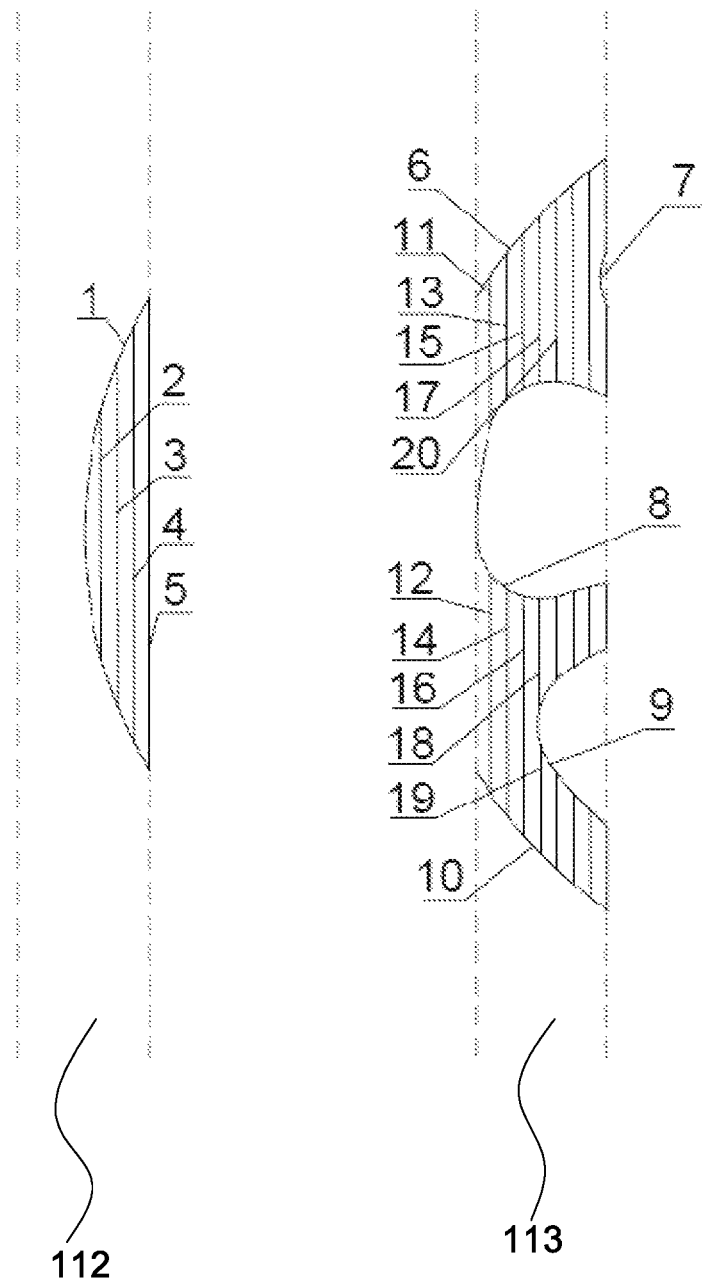

An exemplary scan sequence is shown in FIG. 22, with reference to strips 112 and 113. As illustrated in FIG. 22, contours of each strip are scanned first, followed by hatch lines for that strip. The next strip is only scanned when the previous strip is completed. It should be noted that contours may be scanned before, after, or before and after hatch lines.

Figure 23:
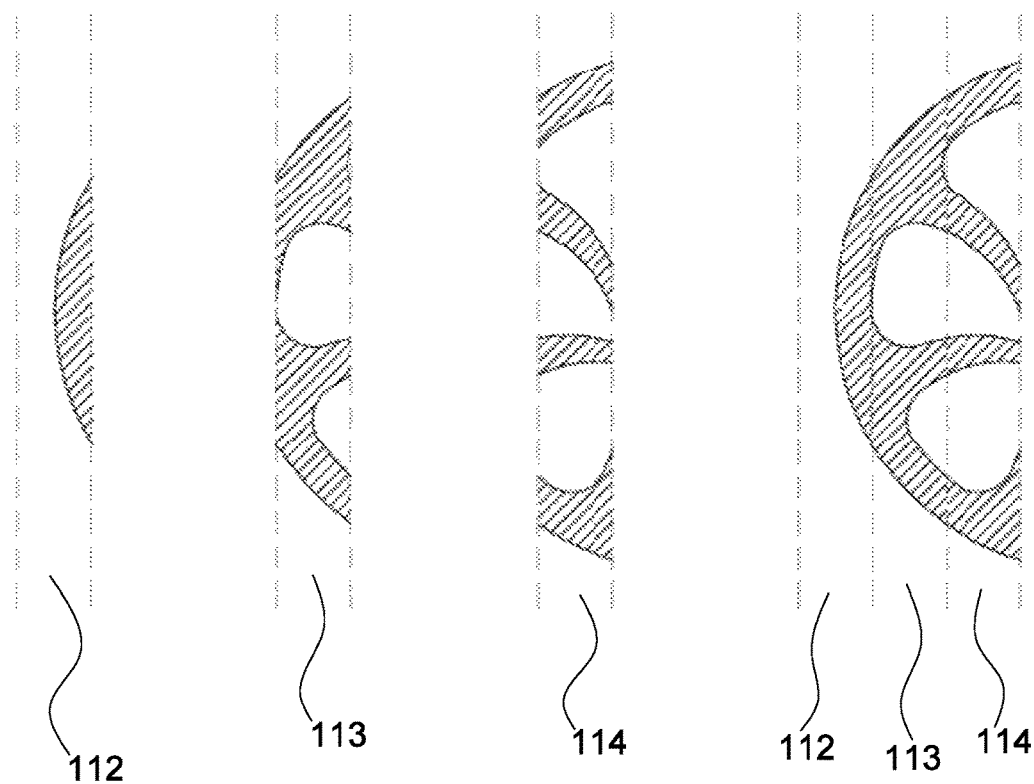
Figure 24:
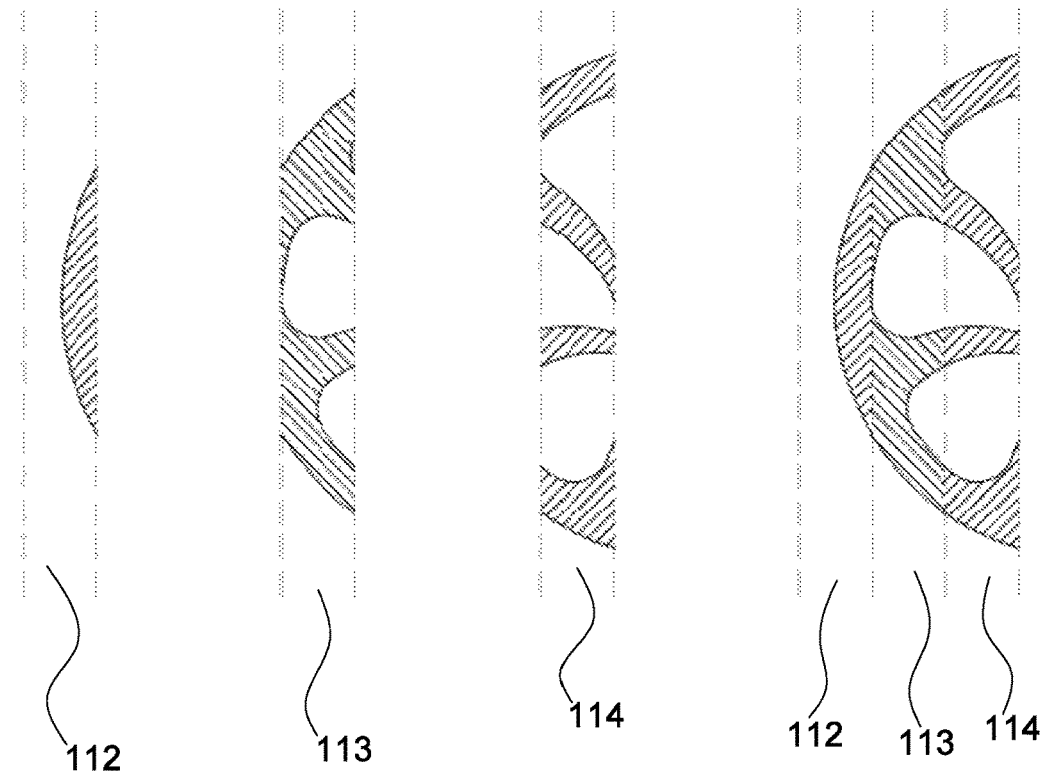
Figure 25:
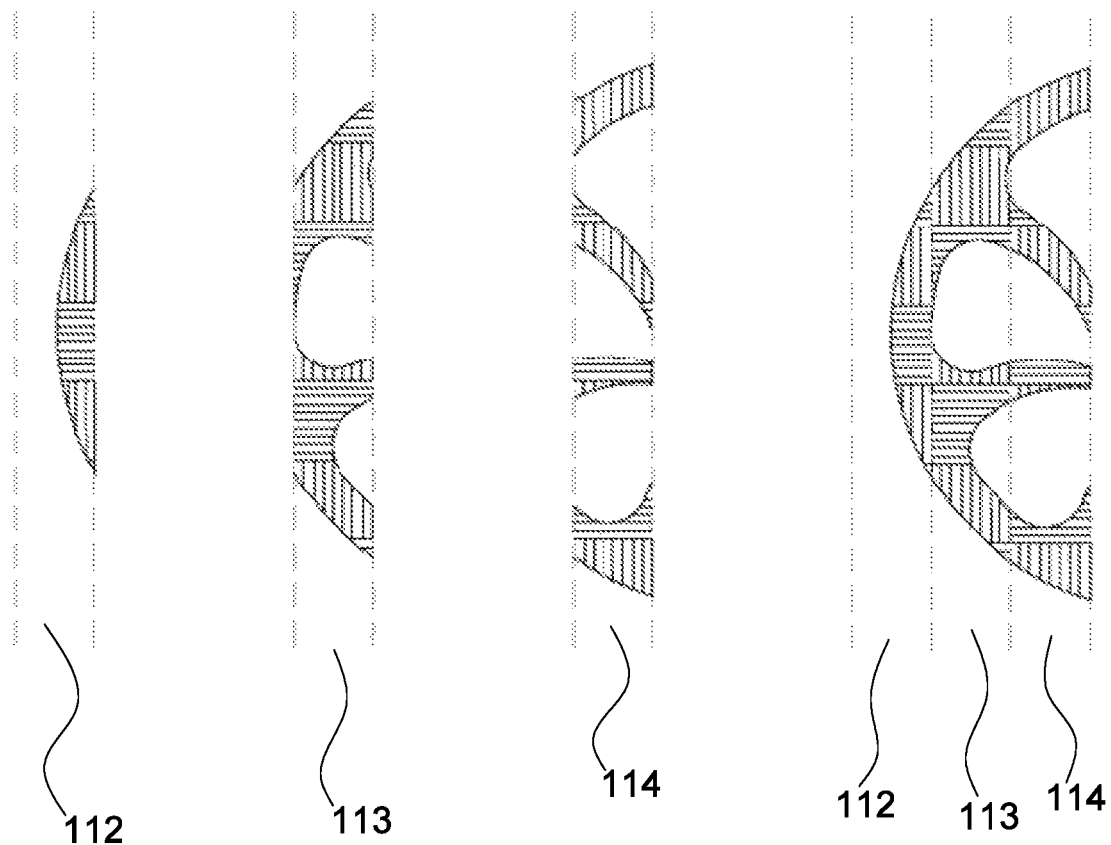

Hatch lines may be scanned at various angles in the X-Y plane. Hatch lines in all of the strips may be substantially parallel, as shown in FIG. 23, hatch lines of different strips may run at different angles, as shown in FIG. 24, and/or the angles of hatch lines may be varied within the same strip, as shown in FIG. 25. Hatch lines in overlapping areas in subsequent layers may also be at different angles.

Figure 26:
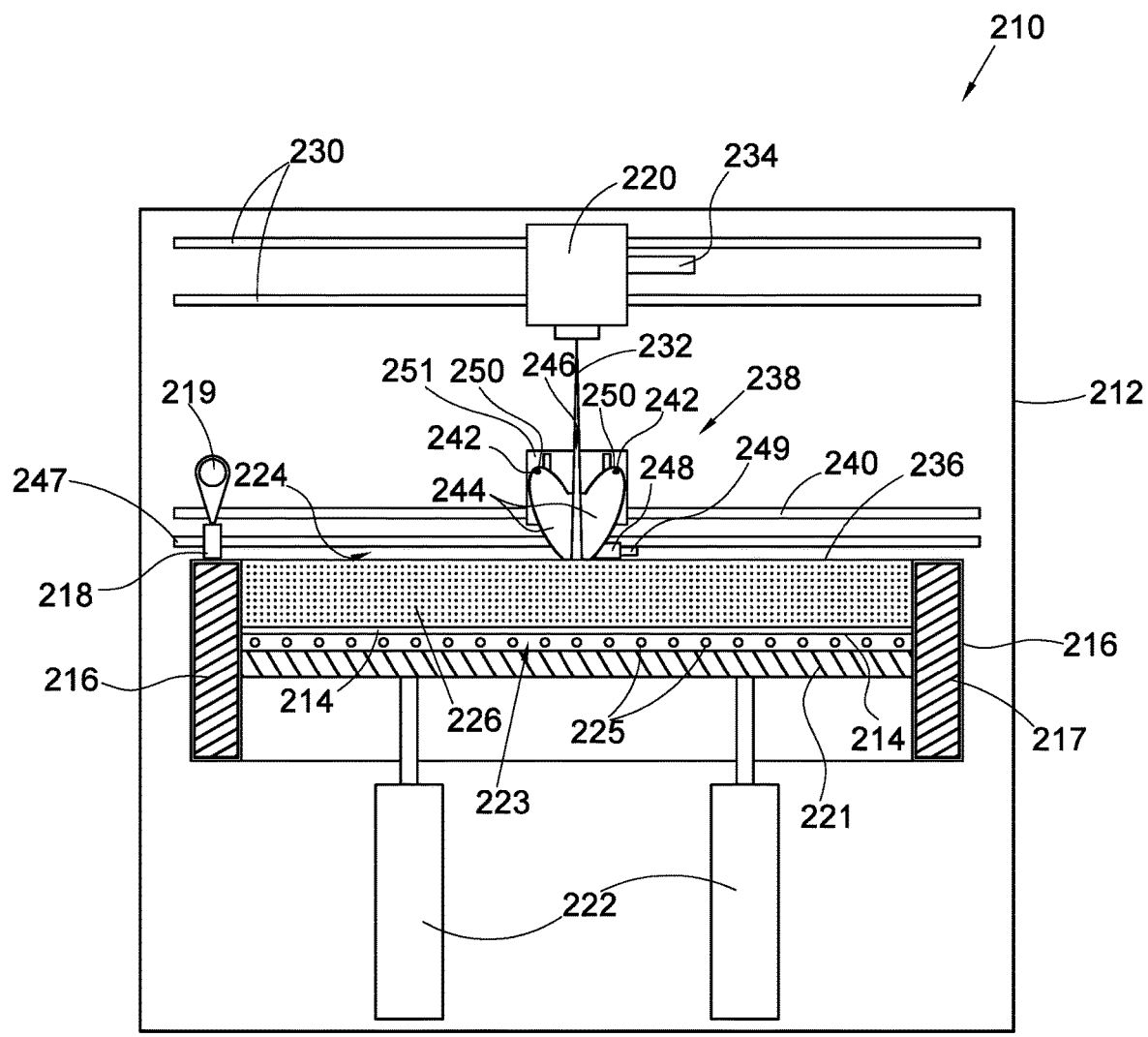
FIG. 26 shows a front sectional view of a twelfth embodiment of an additive manufacturing apparatus according to the invention.

A twelfth embodiment of an additive manufacturing (AM) apparatus 210 is shown in FIG. 26. The apparatus 210 is substantially similar to the apparatus 70 described with reference to FIGS. 7 and 8, but the apparatus 210 is described in greater detail below specifically to highlight certain aspects regarding heating arrangements according to embodiments of the invention.

The apparatus 210 includes a housing 212 which houses a build platform 214, a material container 216, a material deposition arrangement 218, a material feeding mechanism 219 and a two-dimensional scanning unit 220 spaced above the build platform 214 along a Z-axis of the apparatus 210.

The housing 212 is a sealed enclosure and may be used to provide a controlled processing environment as described above.

The build platform 114 is generally planar and is vertically displaceable along the Z-axis by a platform displacement arrangement in the form of a pair of linear build platform actuators 222 located below the build platform 214. The build platform actuators 222 are spaced apart along a Y-axis of the apparatus 210.

The material deposition arrangement 218 is configured to travel across a working area 224 defined above the build platform 214 and to deposit layers of powder material onto the build platform 214 to form a material bed 226, in use. The material feeding mechanism 219 is configured to refill the material deposition arrangement 218 with powder material between layers. The thickness of each deposited layer is typically in the order of 30 um to 1000 um. The material container 216 extends around the build platform 214 in the X-Y plane. The material container 216 has sidewalls 217 that are insulated by a thermal insulation material.

A layer 221 of thermal insulation material is also provided below the build platform 214. Furthermore, an auxiliary heating unit 223 is located between the build platform 214 and the layer 221. The auxiliary heating unit 223 includes a plurality of spaced apart heating elements 225. The heating elements 225 may be resistive or inductive heating elements. The heating elements 225 are arranged so as to form a grid in the X-Y plane.

The apparatus 210 further includes a moving arrangement which includes a pair of parallel, vertically spaced apart scanner rails 230 which extend along the Y-axis and to which the scanning unit 220 is movably mounted.

The scanning unit 220 includes a galvanometer scanner and is configured to steer an energy beam in the form of a laser beam for consolidating powder material deposited in the working area 224 into a solid object, as will become apparent from what follows. A beam path 232 of the laser beam is shown in FIG. 26.

The scanning unit 220 is coupled to an energy source in the form of a fibre delivered laser (not shown) at an energy source coupling 234 and is configured to employ continuous scanning while in motion. In use, the position of the scanning unit 220 relative to the material bed 225 is constantly measured with a linear encoder (not shown) while in motion. The positional data is fed to a control system (shown in FIG. 27) of the scanning unit 220 and the control system controls/corrects a scan pattern based on the positional information to ensure that the laser beam is steered to consolidate the material accurately. This allows the scanning unit 220 to scan the required scan patterns while in motion. These aspects will be described in greater detail below.

The scanning unit 220 is configured to provide an energy beam for scanning a so-called "reduced scan area". Such a scan area ("S") is best shown in FIGS. 33, 34, 37, 39 and 40. The scanning unit 220, when in a certain position along the Y-axis, is thus capable of scanning a two-dimensional scan area which forms part of and is substantially smaller than the working area 224 in the X-Y plane and thus also substantially smaller than a material area defined by a surface 236 of the material bed 226. In particular, the scan area may extend the entire width of the surface 236 of the material bed 226 in the X direction, while it is substantially narrower than the length of the material bed 226 in the Y direction, thereby forming an area with a relatively high aspect ratio. Such a material area ("M") is also best shown FIGS. 33, 34, 37, 39 and 40, and these aspects will be described in greater detail below.

The apparatus 210 further includes a preheating arrangement 238 located between the scanning unit 220 and the build platform 214. The preheating arrangement 238 includes two sets of infrared lamps 242 and a reflector arrangement 244 configured to focus radiation from the lamps 242 onto a preheating zone which, in this embodiment, coincides with the scan area of the scanning unit 220.

The lamps 242 are mounted on opposing sides of the scan area such that the energy beam 232 from the scanning unit 220 passes between the lamps 242 and the reflector arrangement 244 during operation. The reflector arrangement 244 is provided by two mirrors, one on each side of the scan area. Each mirror, when viewed in the Y-Z plane, has an elliptical apex region 250 below which one of the lamps 242 is positioned.

The reflector arrangement 244 is shaped so as to define a central opening 246 to permit the energy beam 232 of the scanning unit 220 operatively to pass through the preheating arrangement 238 between the mirrors and onto the material bed 226.

The preheating arrangement 238 includes an integral extraction arrangement in the form of an extraction port 248 and a gas outlet 249 located in a lower side of one of the mirrors for the extraction of vapour and spatter produced during operation. The components and functioning of the preheating arrangement 238 will be described in greater detail below.

The preheating arrangement 238 is mounted to a pair of parallel, horizontally spaced apart heating guide rails 240 which extend along the Y-axis (one of the rails is not visible in FIG. 26, as it shows a sectional view).

The moving arrangement further includes a linear actuator (not shown). The linear actuator is configured simultaneously to move the scanning unit 220 and the heating arrangement 238 along the scanner rails 230 and heating guide rails 240, respectively, in such a manner that the scanning unit 220 and the preheating arrangement 238 remain vertically in register and the energy beam 232 is able to pass through the central opening 246 in the heating arrangement 238.

In this example the length of the opening 246 is the same as the length of the scan strip (600 mm) to ensure that the laser beam can be directed onto the material bed 226. It has been found that it is preferably for the width of the opening 246 to be at least double the width of the scan strip to ensure that the strip can be completely scanned while the scanning unit 220 is in motion without the preheating arrangement 238 interfering with the beam path 232. In this example the width of the opening 246 is 50 mm.

Since the direction of scanning can be alternated, and the scanning unit 220 and preheating arrangement 238 follow the material deposition arrangement 218, the material deposition arrangement 218 and preheating arrangement 238 typically need to pass each other. To permit this, the material deposition arrangement 218 and preheating arrangement 238 are mounted on different linear rails and are actuated by different mechanisms. The material deposition arrangement 218 is mounted to a rail 247 below the rail 240 of the preheating arrangement 238 and the preheating arrangement 238 is further coupled to a vertical displacement mechanism 251 configured to permit upward displacement of the preheating arrangement 238 along the Z-axis to provide clearance for the material deposition arrangement 218 to pass between the preheating arrangement 238 and the material bed 226 when depositing material across the working area 224.

It should be understood that, in other embodiments, the scanning unit 220 and the preheating arrangement 238 may be movable relative to each other along the Y-axis. In such cases, in use, the scanning unit 220 and preheating arrangement 238 may at appropriate times be aligned such that the scan area coincides with the preheating zone of the preheating arrangement 238.

Figure 27:
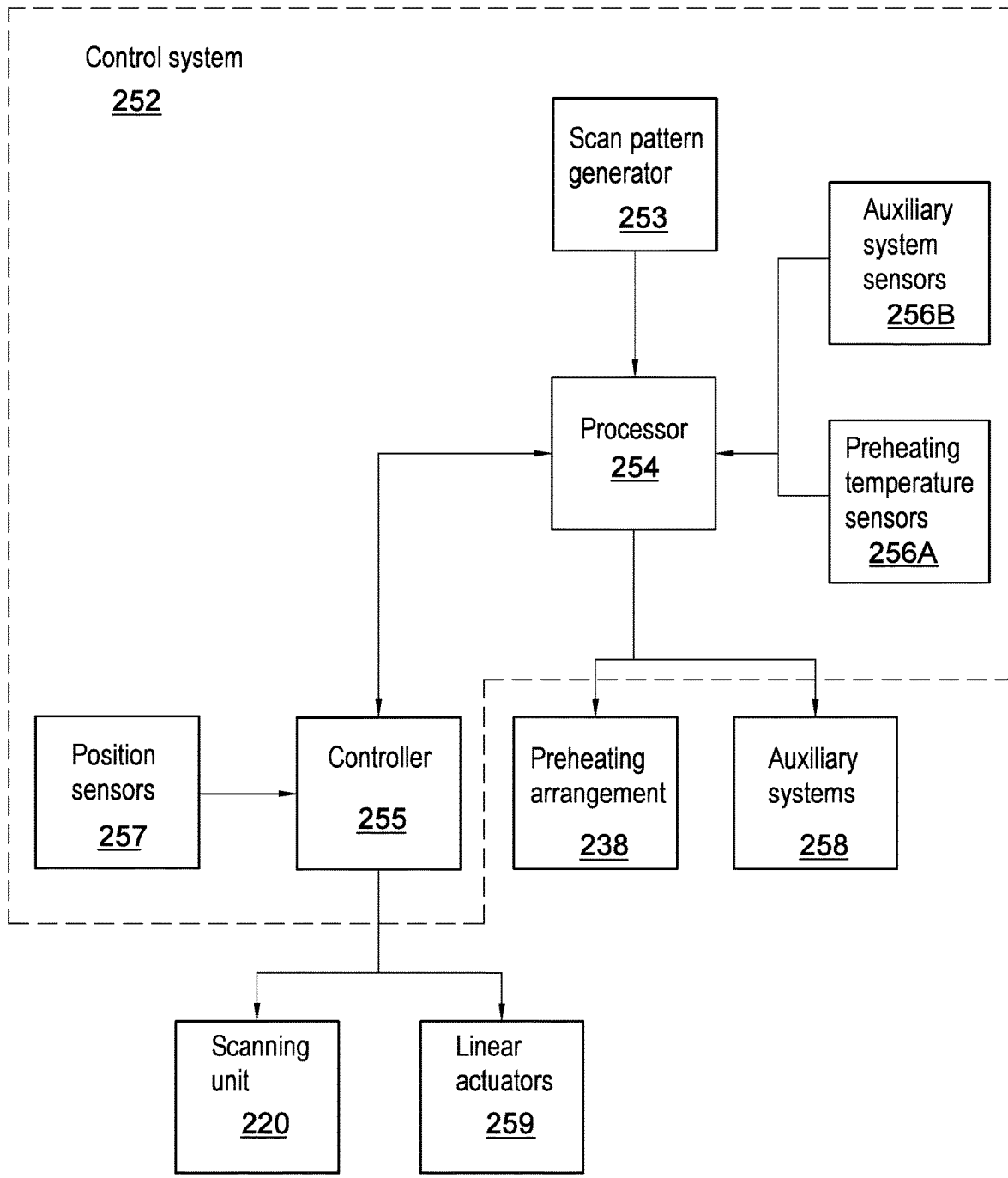
FIG. 27 is a block diagram illustrating functional components of a control system of the additive manufacturing apparatus of FIG. 26.

The apparatus 210 further includes a control system 252. Functional components of the control system 252 are illustrated in FIG. 27.

The control system 252 includes a scan pattern generator 253, a processor 254, a controller 255, a preheating temperature sensor 256A, auxiliary system sensors 256B and position sensors 257. FIG. 27 also illustrates the scanning unit 220, the preheating arrangement 238, auxiliary systems 258, and linear actuators 259 which are all communicatively coupled to the control system 252.

The scan pattern generator 253 is configured to generate scan patterns to be scanner for each layer and strip based on or associated with CAD data of a part to be scanned.

The processor 254 is configured to: receive scan pattern data from the scan pattern generator 253, send the scan pattern data to the controller 255, receive feedback from the controller 255, control the auxiliary systems 258 and the preheating arrangement 238, receive feedback from the preheating temperature sensor 256A and auxiliary system sensors 256B, and process feedback from the controller 255, the preheating temperature sensor 256A and auxiliary system sensors 256B into control instructions.

The controller 255 is configured to: control the scanning unit 220 and the linear actuators 259 of the apparatus 210, receive positional feedback from the position sensors 257, process the positional feedback into movement instructions and scanning instructions, and provide feedback to the processor 254.

The scanning unit 220 is in turn configured to receive scan instructions from the controller 255 and to control/steer/direct the energy beam onto the material bed 226 to scan contours and hatch lines, in use.

The linear actuators 259 are configured to receive movement instructions from the controller 255 and to move the scanning unit 220 and the preheating arrangement 238 while the scanning unit 220 is scanning.

The preheating temperature sensor 256A is configured to measure the temperate of the surface 236 of the material bed 226 and provide feedback to the processor 254.

The auxiliary system sensors 256B are configured to provide feedback on the status of the auxiliary systems 258 of the apparatus 210 to the processor 254. Depending on the implementation, the auxiliary systems 258 can include one or more of: material deposition arrangements, extraction systems, build platform actuation arrangements, process monitoring and control systems, layer quality monitoring systems and atmospheric control units.

The position sensors 257 include position encoders capable of determining the position of the scanning unit 220 relative to the build platform 214. The position sensors 257 are configured to transmit positional feedback to the controller 255.

The moving arrangement described above permits the scanning unit 220 and the preheating arrangement 238 to be moved while the build platform 214 remains stationary along the Y-axis. In this way, the preheating zone of the preheating arrangement 238 and the scan area of the scanning unit 220 can be moved synchronously across the material area defined by the surface 236.

In use, the material deposition arrangement 218 is used to deposit layers of material on the build platform 214 to form the material bed 226. After each layer is deposited or while a layer is being deposited, portions of the deposited layer are preheated using the preheating arrangement 238 and scanned using the scanning unit 220. The integral extraction arrangement extracts vapour and spatter from the scan area on a continuous basis. It should be understood that each consolidated portion corresponds to a particular cross-section or two-dimensional slice of the object to be formed.

The apparatus 210 is configured such that the entire material area cannot be scanned with the scanning unit 220 or preheated with preheating arrangement 238 at once or at the same time (i.e. the entire area cannot be scanned and heated simultaneously). Instead, the apparatus 210 is configured to divide the material area into a plurality of two-dimensional strips, each strip having an area equal to that of the scan area. The preheating arrangement 238 is thus moved across the material area to preheat the material area continuously, and is configured to focus energy onto the scan area and not the remainder of the material area. The scanning unit 220 is used to consolidate material contained in the strip continuously while the preheating arrangement 238 and scanning unit 220 are moved along the Y-axis. The preheating arrangement 223 can be used to preheat the complete material bed 226 to a certain temperature and allow for the preheating arrangement 238 to further increase the temperature across the scan area. In some cases the preheating arrangement 238 obviates the need for the preheating arrangement 223.

The preheating arrangement 238 heats material deposited in the scan area to a temperature which is below its melting point. This has the advantage of potentially increasing production rate since less input energy is required from the energy source to melt the material. Additionally, and more importantly, it has the advantage of reducing residual stresses in the material being formed. For example, stress relieving of certain titanium alloys occurs between 480° C.

and 650° C., while the alloy only melts between 1604° C. and 1660° C. Thus, if a preheat in excess of 480° C. is applied to the material bed 226, the thermal stresses that develop during the rapid solidification process, will be relieved.

After depositing a particular layer of material and consolidating the deposited layer in a strip by strip fashion, the build platform 214 is incrementally lowered along the Z-axis before depositing a further layer of material for consolidation. It will be appreciated that the movement of the build platform 214 along the Z-axis will correspond to the thickness of the layer of material being deposited such that the surface 236 of the material bed 226 remains at a constant distance from the scanning unit 220 and the preheating arrangement 238.

The scanning unit 220 is capable of scanning a contour or periphery of the object being formed which falls within the particular two-dimensional strip being scanned at a point in time, and subsequently scanning the portion of the object which falls within the periphery, as already described in detail above.

The scanning unit 220 may scan along an oblique path with respect to the X-axis or Y-axis. In alternative embodiments, the preheating arrangement 238 may be angularly displaceable in the X-Y plane. For instance, the preheating arrangement 238 may be pivoted by 45 degrees between consecutive layers so as to change the direction in which the scan area extends along the X-Y plane. In this way, hatch lines of different layers can be scanned at different angles (i.e. "cross-hatching"). This may improve the uniformity and/or other material properties of the part.

Various heating arrangement configurations that may be employed in embodiments of the invention are illustrated in FIGS. 28 to 38.

Figure 28:
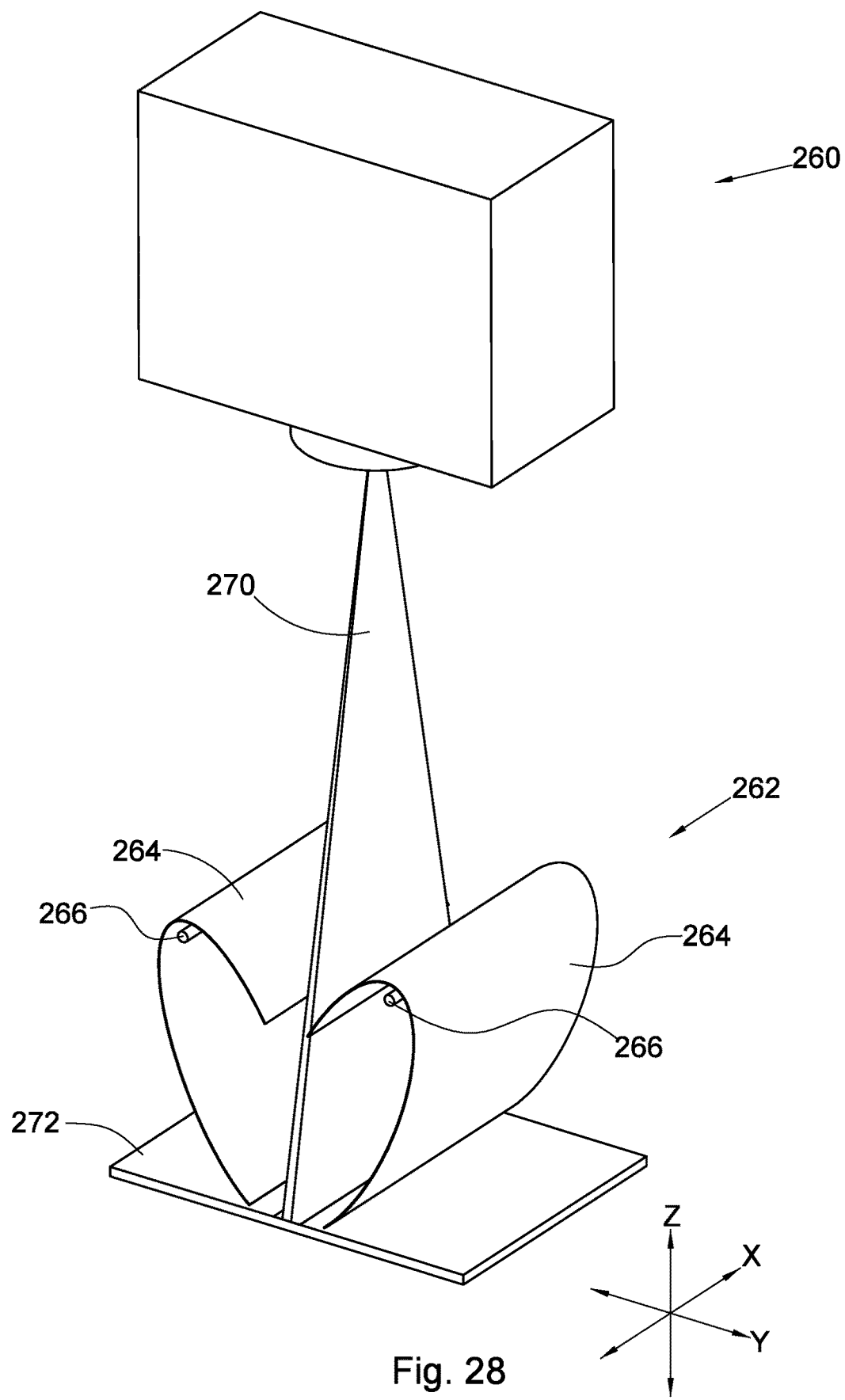
FIG. 28 is a three-dimensional conceptual illustration of an example of a preheating arrangement and a scanning unit of an additive manufacturing apparatus according to the invention.
Figure 29:
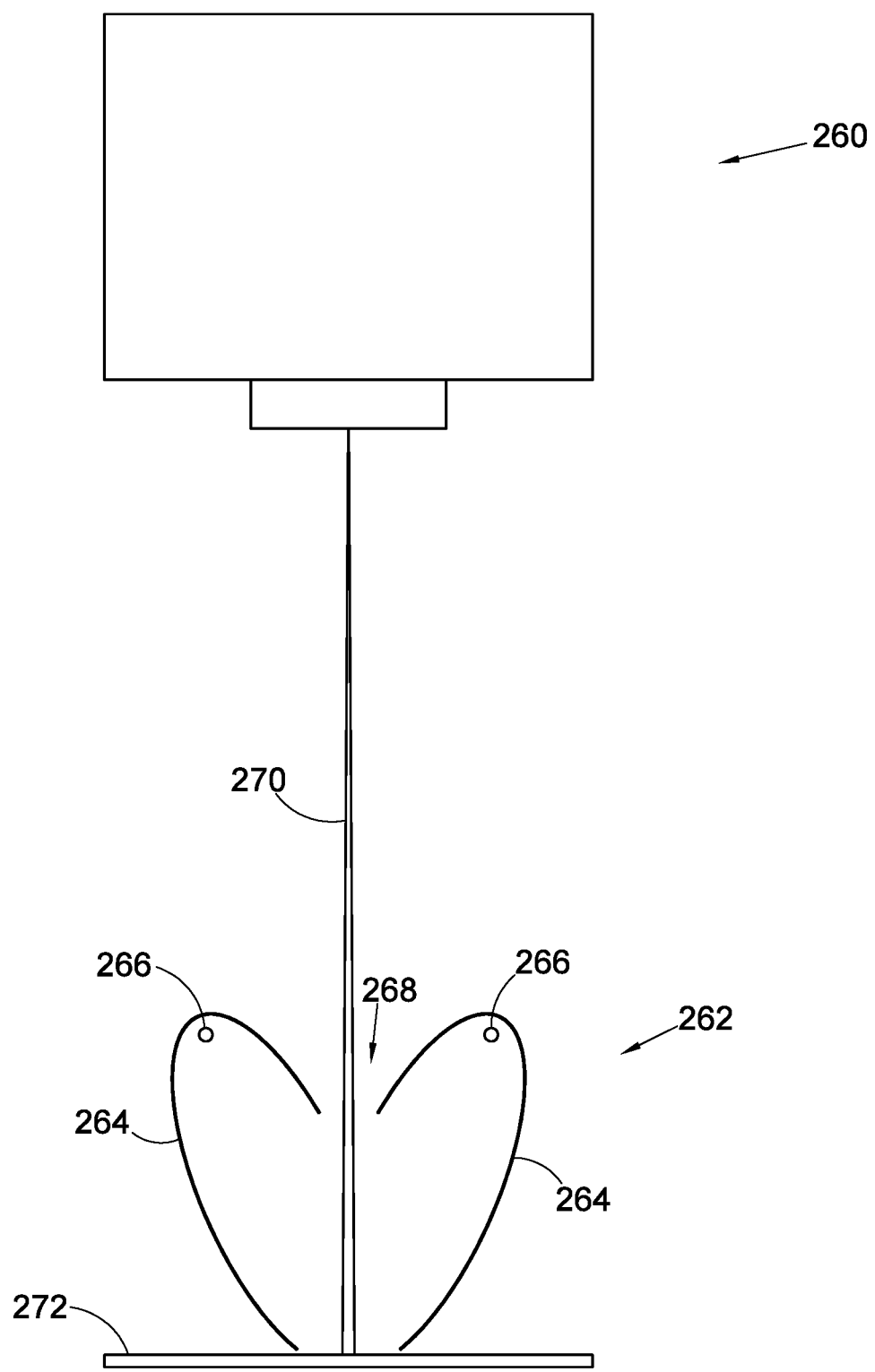
FIG. 29 is a front view of the preheating arrangement and scanning unit of FIG. 28.
Figure 30:
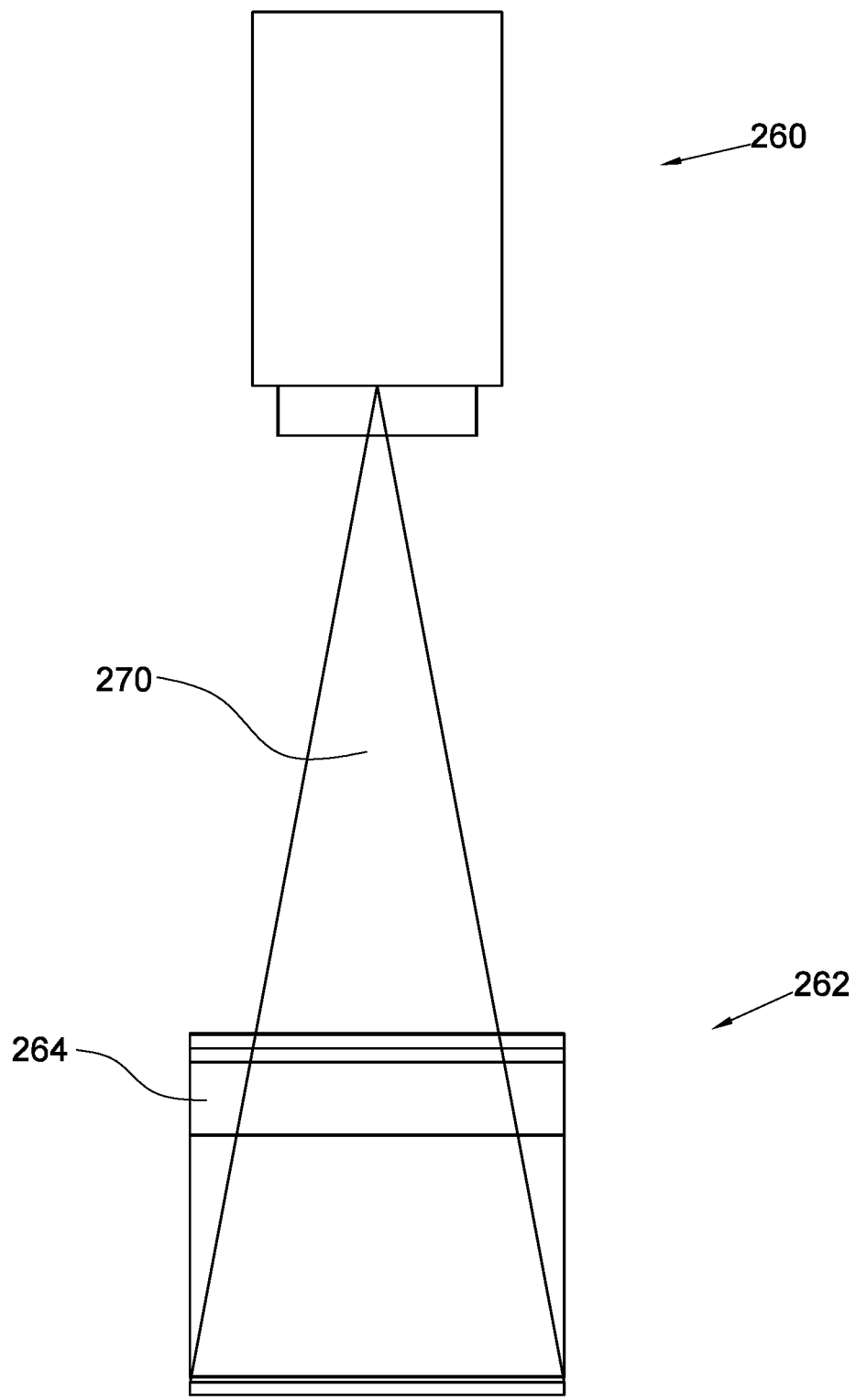
FIG. 30 is a side view of the preheating arrangement and scanning unit of FIG. 28.

FIGS. 28 to 30 illustrate a scanning unit 260 and preheating arrangement 262 substantially similar to those described with reference to FIG. 26. The preheating arrangement 262 includes two generally elliptical mirrors 264 and two sets of infrared lamps 266, and defines a central opening 268 to permit an energy beam 270 of the scanning unit 260 to pass through the preheating arrangement 262 and onto a surface 272 of a material bed (not shown), as described above.

Figure 31:
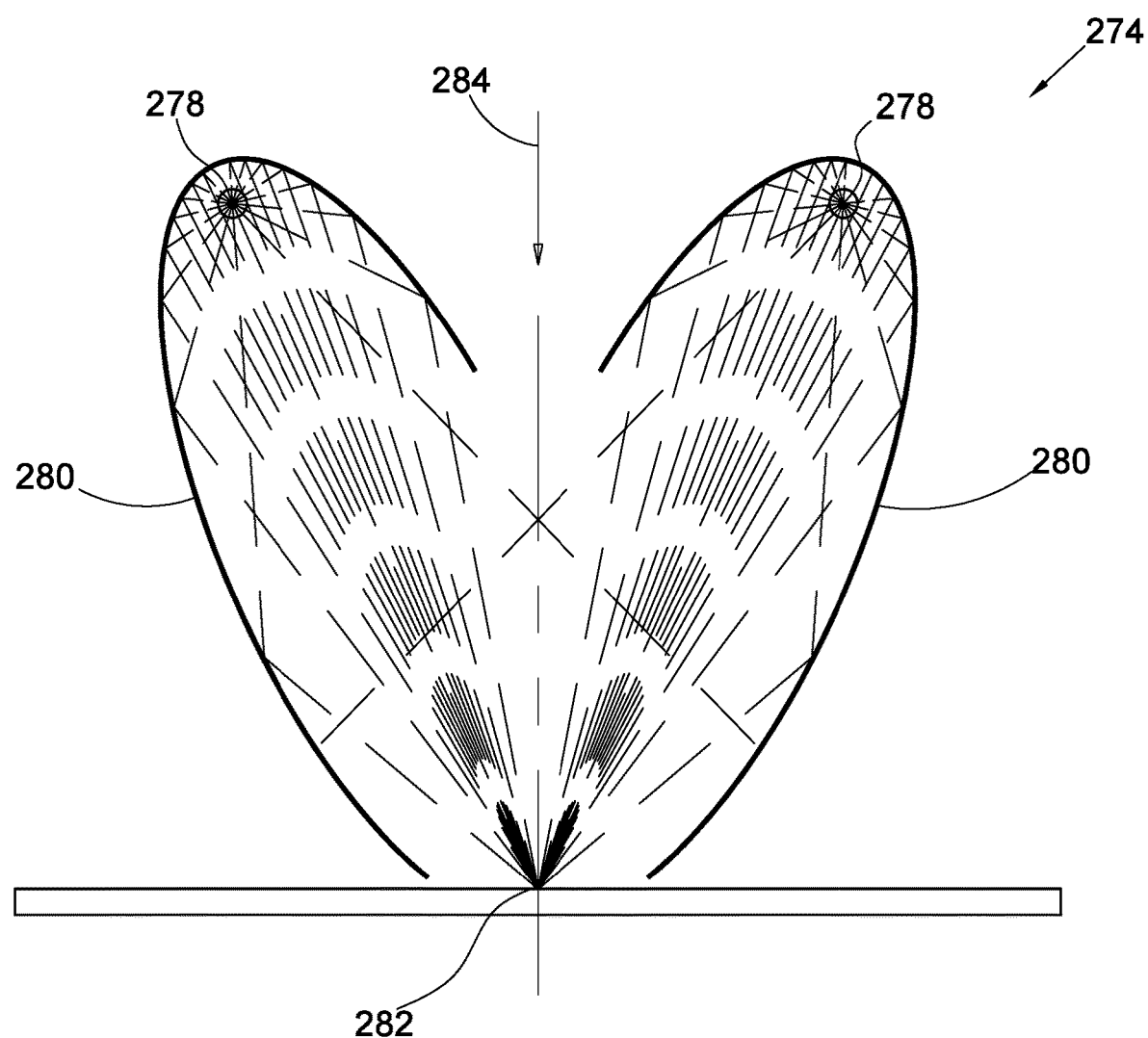
FIG. 31 is a conceptual illustration showing a front view of an example of a preheating arrangement of an additive manufacturing apparatus according to the invention.
Figure 32:
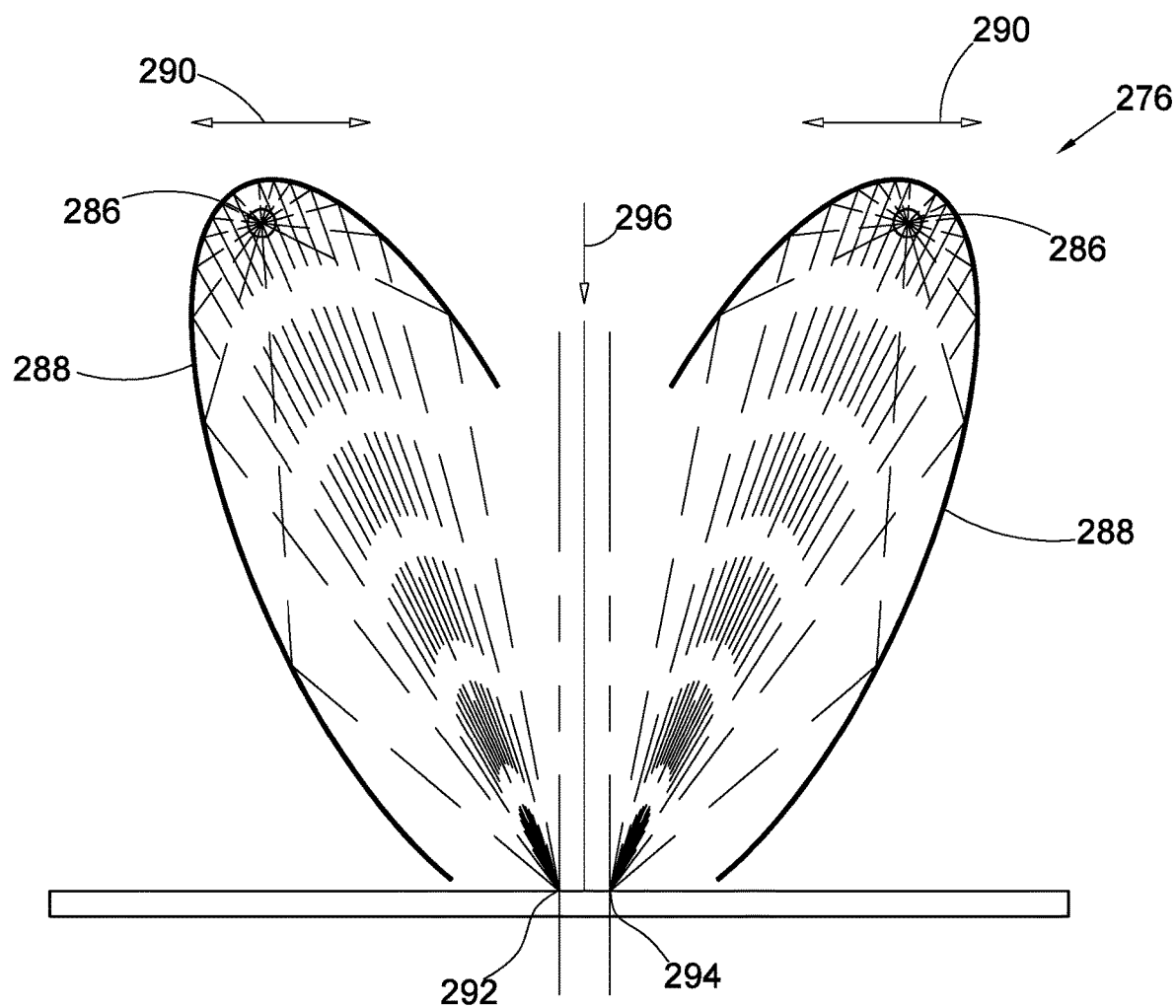
FIG. 32 is a conceptual illustration showing a front view of an example of another preheating arrangement of an additive manufacturing apparatus according to the invention.

FIGS. 31 and 32 illustrate the manner in which a preheating arrangement 274, 276 can be shaped and dimensioned to provide and focus radiation onto a focus zone or zones extending generally along the X-axis of an additive manufacturing apparatus.

In FIG. 31, the lamps 278 and reflectors 280 of the preheating arrangement 274 are configured such that the focus zone 282 is a narrow strip along the X-axis (thus shown as a point along the Y-axis) which extends along a centre of a width of the scan area. The scanning unit can then be configured to direct the energy beam 284 onto this focus zone 282, which is the area on the material bed with the highest preheating intensity.

In FIG. 32, respective lamps 286 and reflectors 288 of the preheating arrangement 276 are movable along the Y-axis, as indicated by the directional arrows 290, to permit the position of their respective focus zones 292, 294 to be adjusted along the Y-axis, while still permitting the energy beam 296 of the scanning unit to pass through the preheating arrangement 276. In the example shown in FIG. 32, the energy beam 296 is directed onto a zone between the spaced apart focus zones 292, 294, wider than the point referred to above (see FIG. 31).

Figure 33:
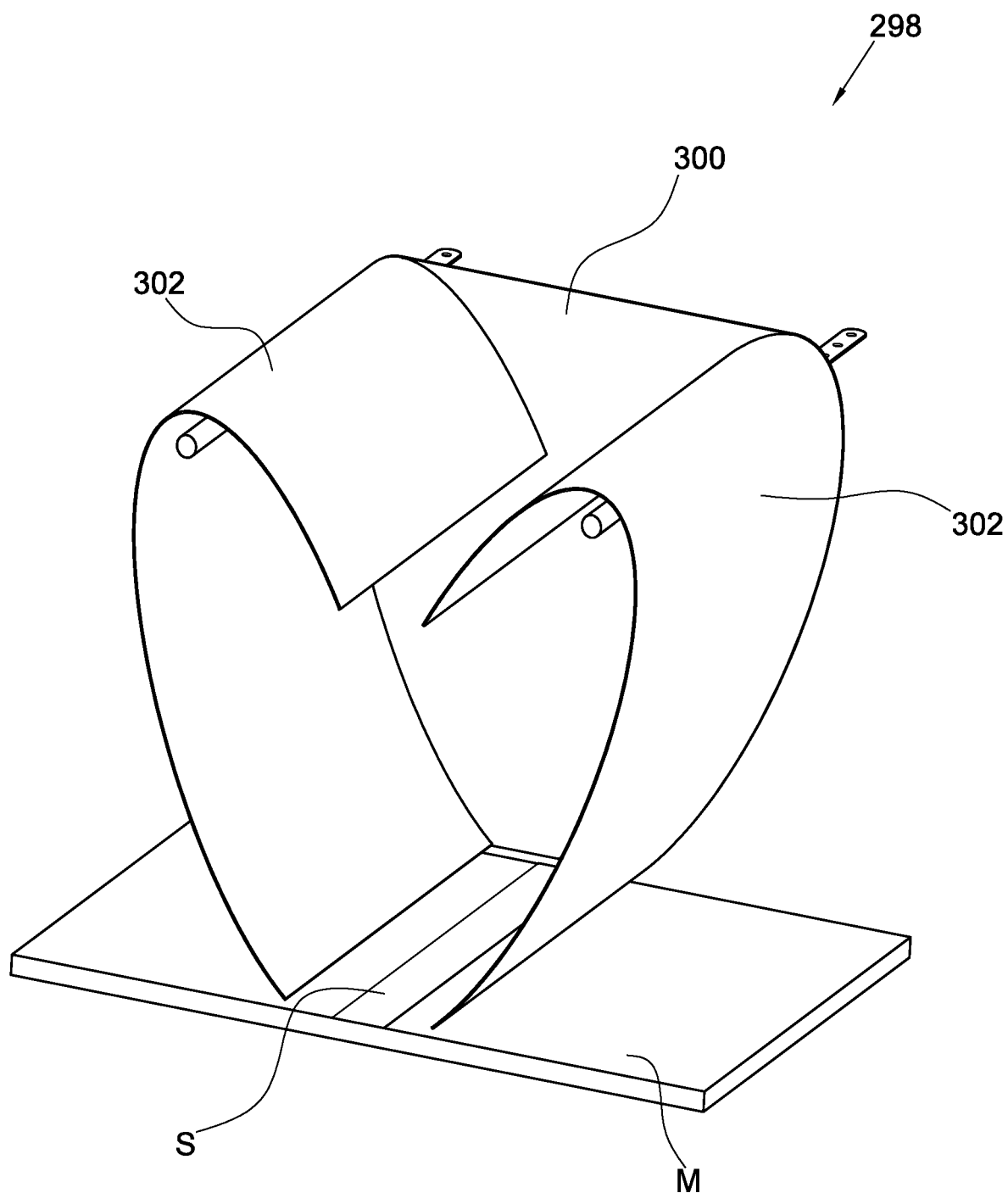
FIG. 33 is a three-dimensional conceptual illustration of an example of a further preheating arrangement of an additive manufacturing apparatus according to the invention.

The preheating arrangement 298 of FIG. 33 includes a flat, upright side reflector 300. Typically, the heating arrangement 298 will include such a side reflector one each side of the elliptical reflectors 302. It has been found that the use of one or more side reflectors ensures more uniform heating over the material surface and improves the efficiency of extraction methods.

Figure 34:
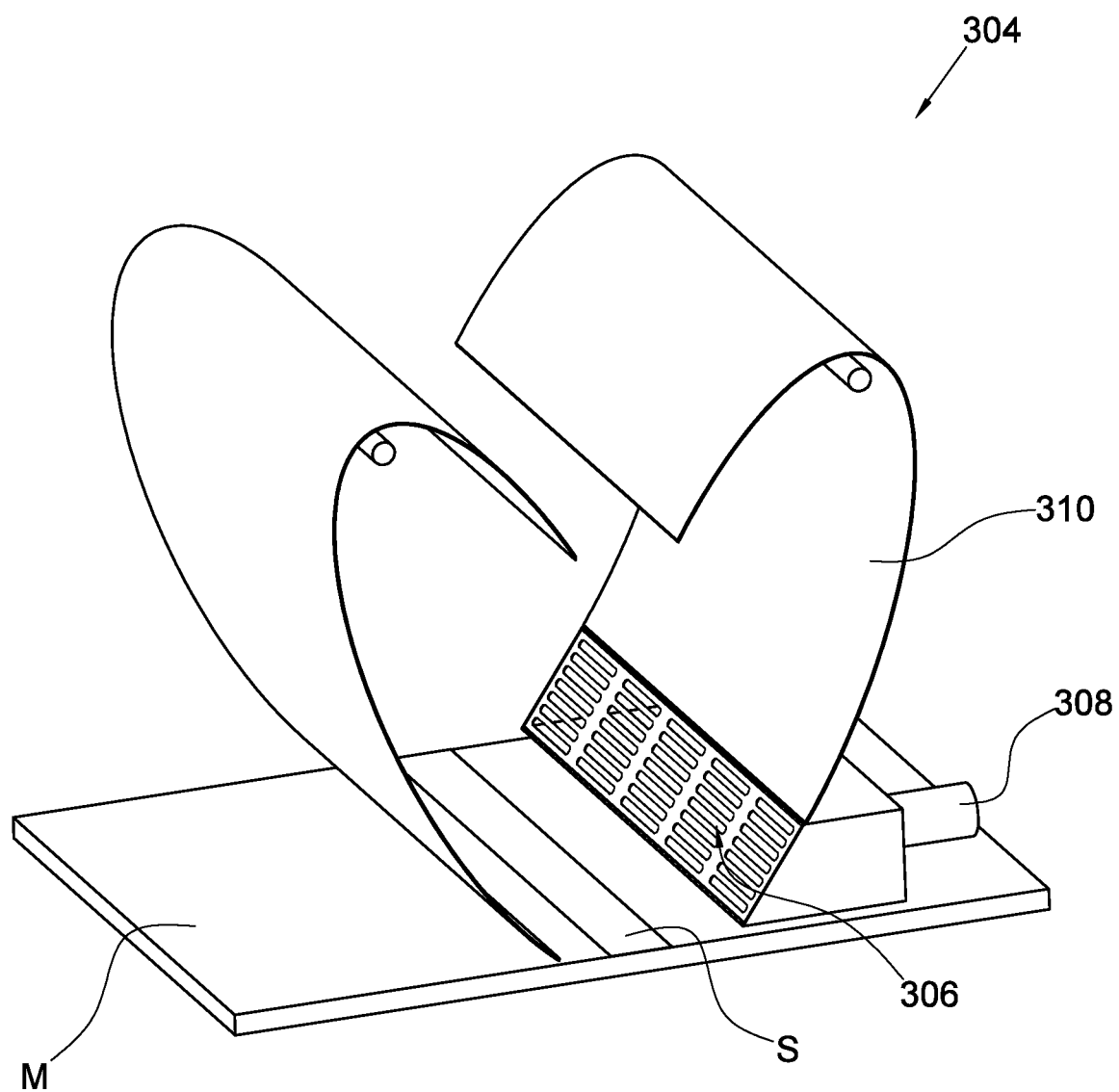
FIG. 34 is a three-dimensional conceptual illustration of an example of a further preheating arrangement of an additive manufacturing apparatus according to the invention.

The preheating arrangement 304 of FIG. 34 includes an integral extraction arrangement in the form of an extraction port 306 and a gas outlet 308 incorporated into a lower region of one of the elliptical reflectors 310. This allows for extraction of vapour and spatter produced during operation, possibly at the same time as heating.

Figure 35:
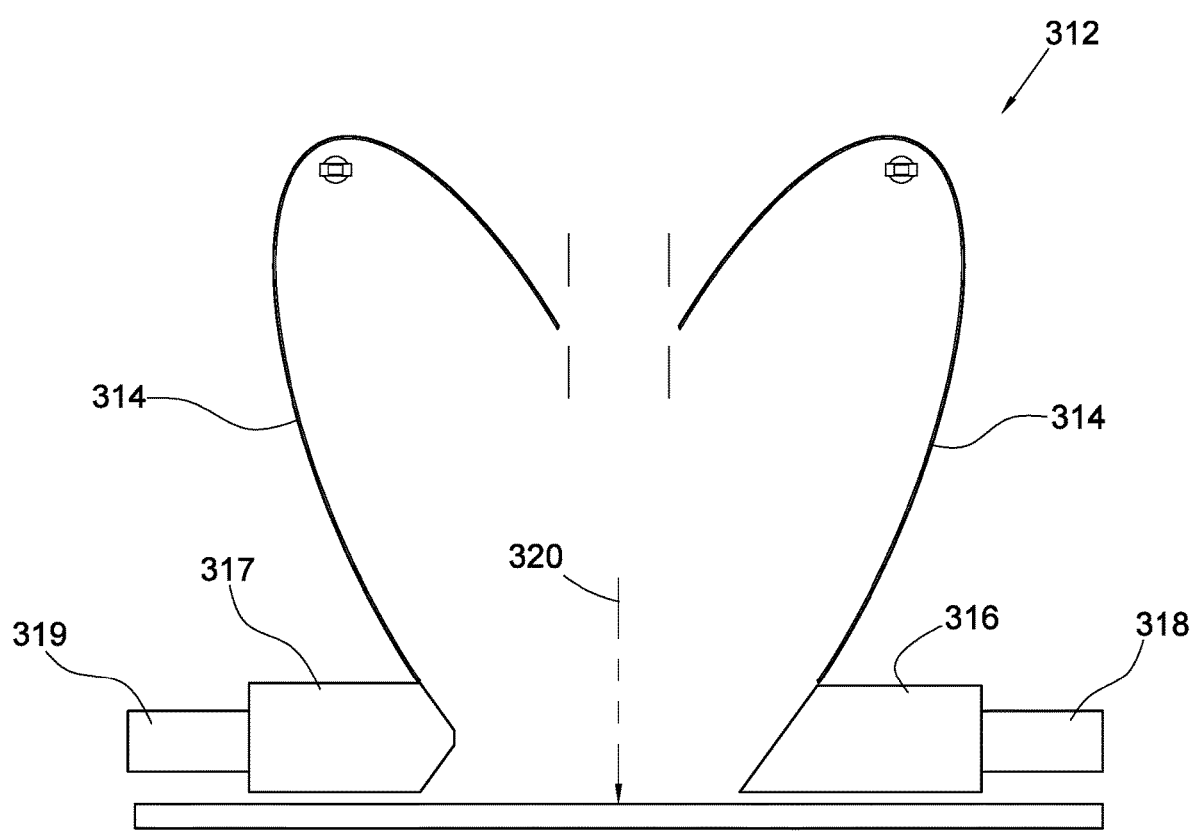
FIG. 35 is a conceptual illustration showing a front view of an example of a still further preheating arrangement of an additive manufacturing apparatus according to the invention.

The heating arrangement 312 of FIG. 35 has, incorporated into a lower region of one of the elliptical reflectors 314, an extraction arrangement including an extraction port 316 and a gas outlet 318 located on one side of the scan area. The heating arrangement 312 further has, incorporated into a lower region of the other elliptical reflector 314, a nozzle 317 with a gas inlet 319 on the other side of the scan area for feeding gas into the region of the scan area for egression through the extraction port 316 and away from the energy beam 320. The apparatus may include any suitable flow control means configured to regulate the direction of flow of gasses between extraction ports or between a nozzle and extraction port.

In an alternative embodiment, the heating arrangement may have, incorporated into a lower region of each of the elliptical reflectors, an extraction port and a gas outlet, as well as a nozzle with a gas inlet. In such a case, the additive manufacturing apparatus can be configured such that extraction can be switched between the ports, depending on the direction of travel of the heating arrangement and/or the direction in which scanning takes place during a particular period. For instance, when scanning occurs from left to right, extraction can be done from the left to ensure that vapour is extracted away from the energy beam, and vice versa.

Figure 36:
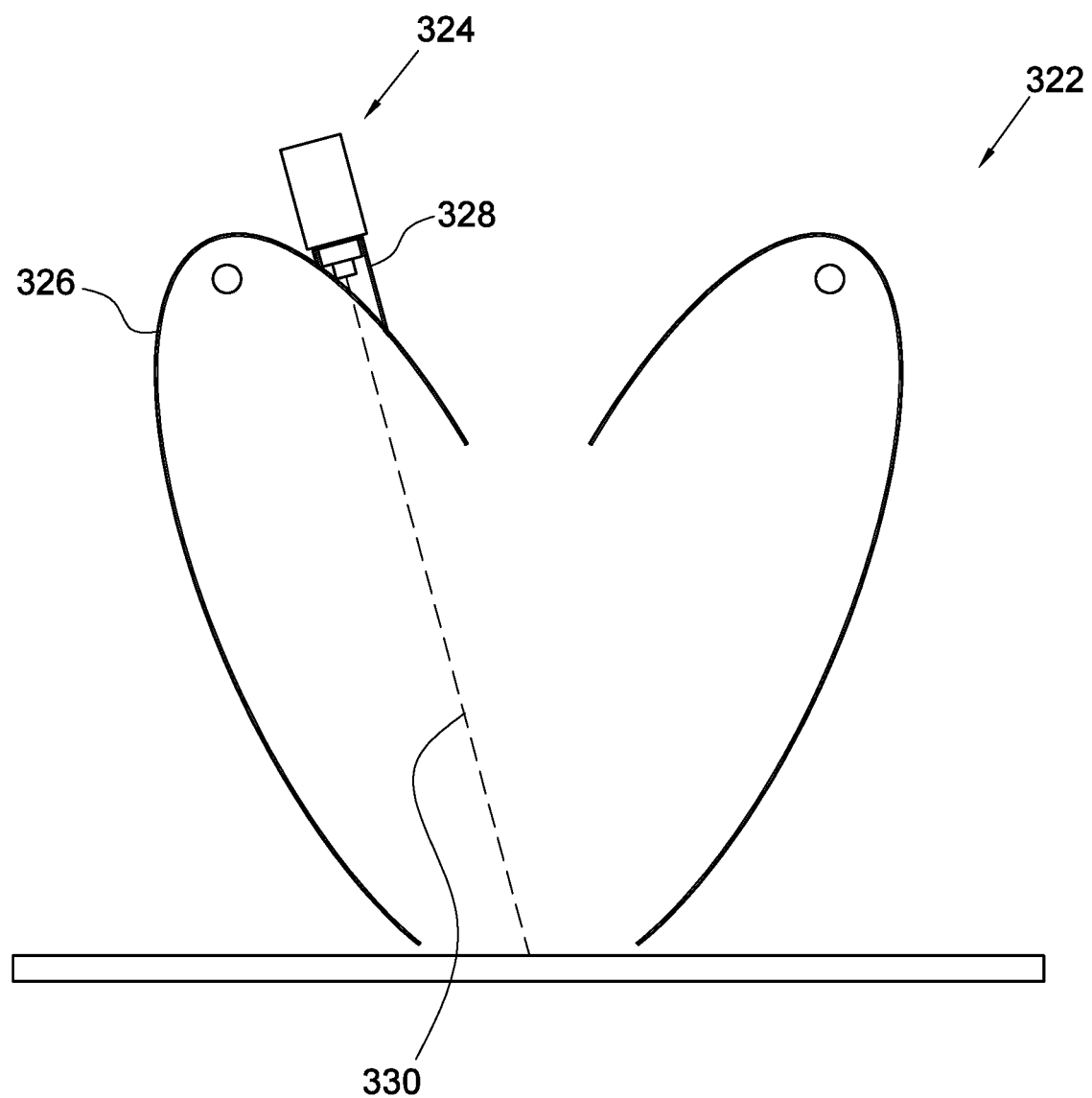
FIG. 36 is a conceptual illustration showing a front view of an example of a yet further preheating arrangement of an additive manufacturing apparatus according to the invention.

The preheating arrangement 322 of FIG. 36 includes at least one temperature sensor 324 mounted to one of the elliptical reflectors 326 by way of a generally cylindrical sleeve 328. The sensor 324 is configured to measure the temperature on the surface of the material bed. In this example, the temperature of the scan area is measured, as indicated by the broken line 330. A heating level of the preheating arrangement 322 may be continuously or periodically adjusted, in use, based on temperatures measured by the temperature sensor 324.

Figure 37:
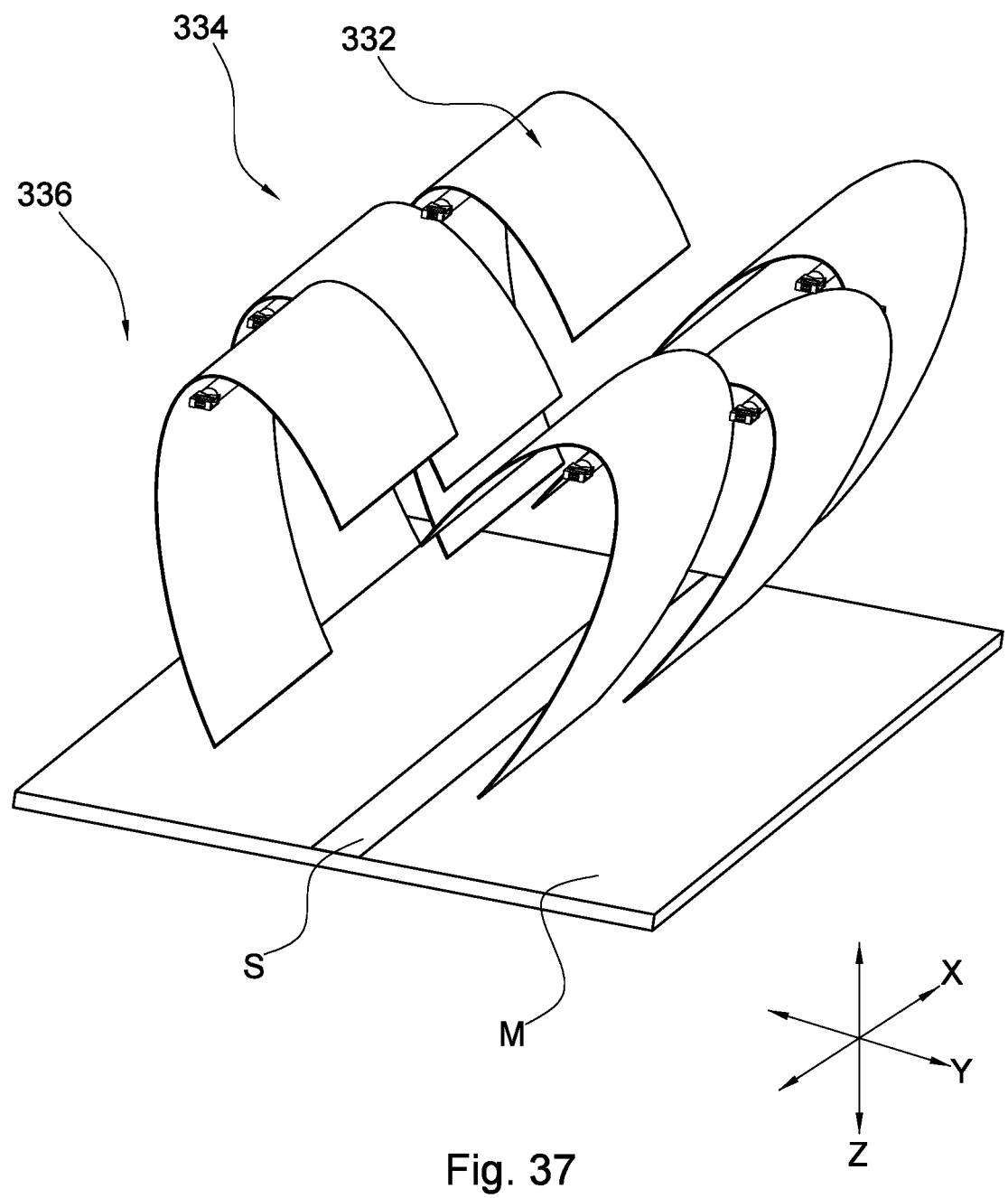
FIG. 37 is a three-dimensional conceptual illustration of an example of another preheating arrangement of an additive manufacturing apparatus according to the invention.
Figure 38:
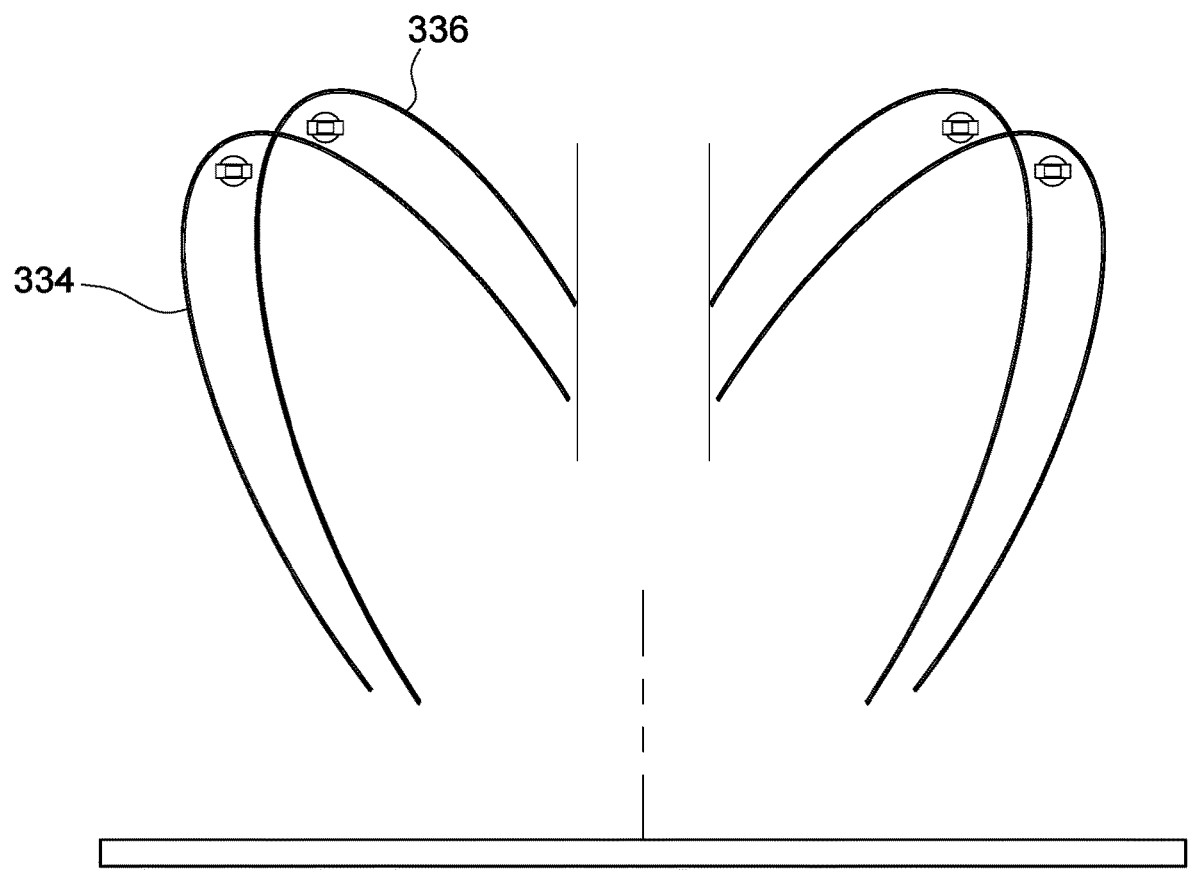
FIG. 38 is a front view of the preheating arrangement of FIG. 37.
Figure 40:
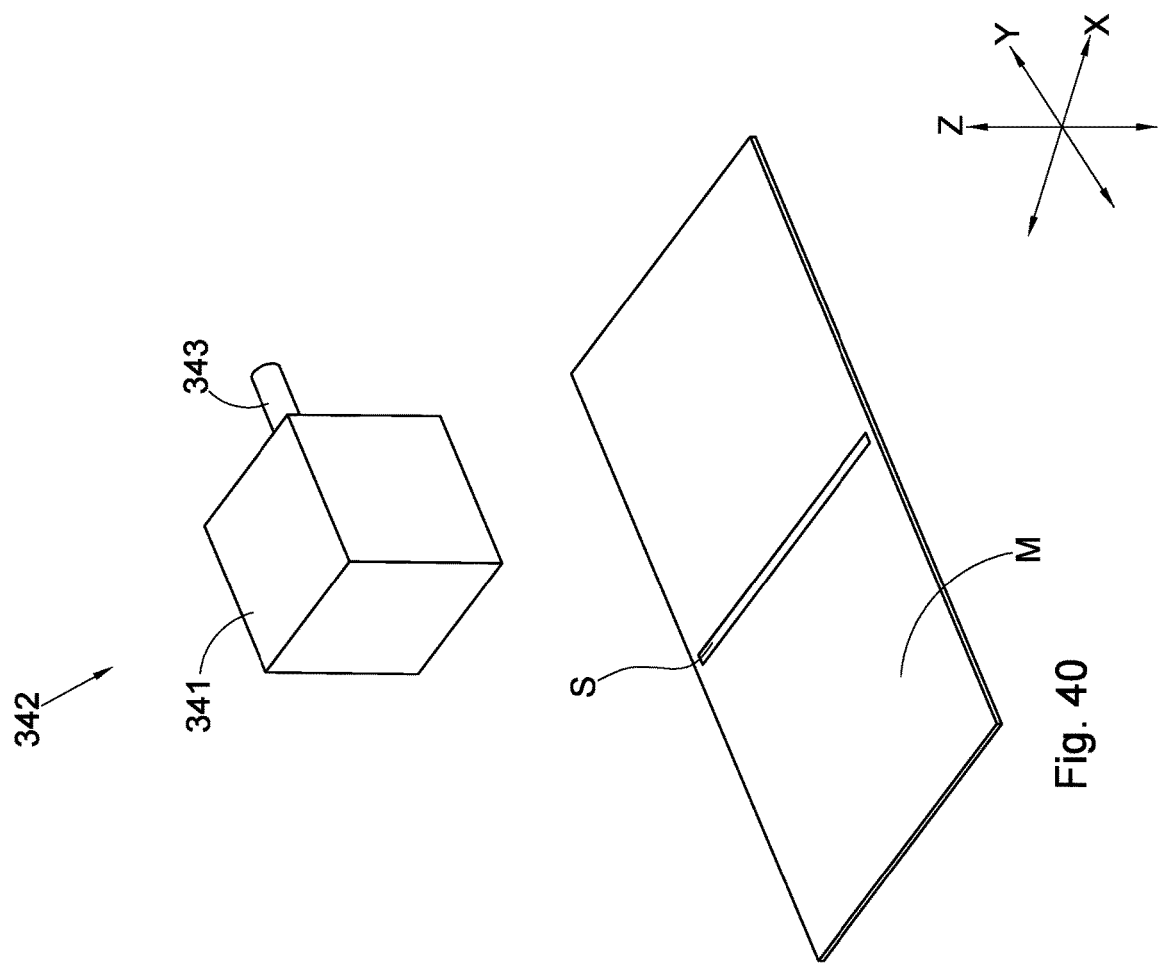
FIGS. 39-40 are conceptual illustrations of a scan area employed by a known additive manufacturing apparatus and an apparatus according to embodiments of the present invention, respectively.
Figure 39:
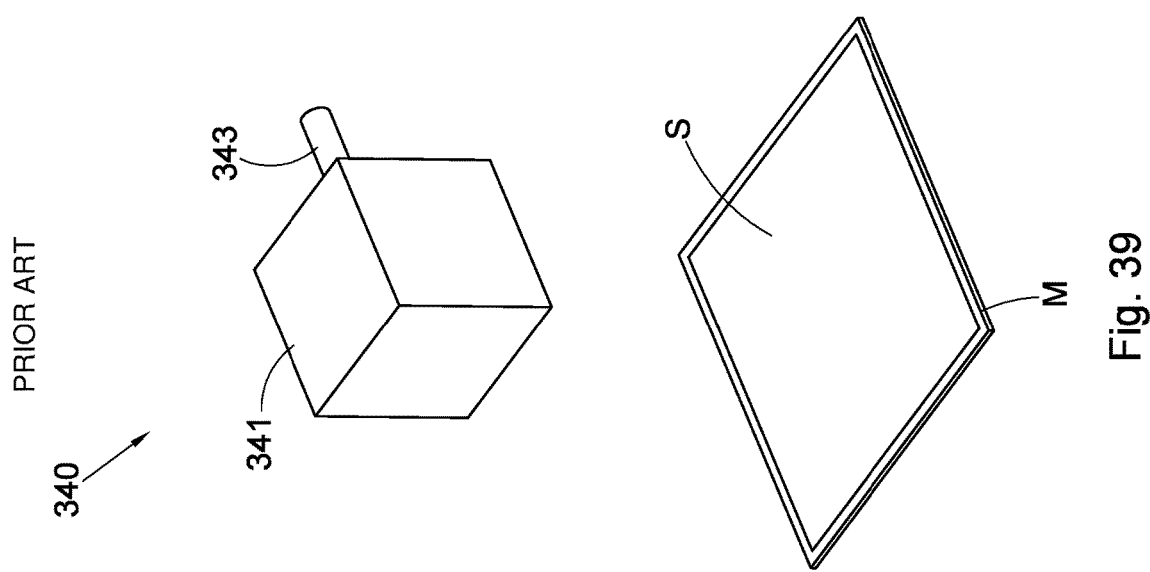
Figure 42:
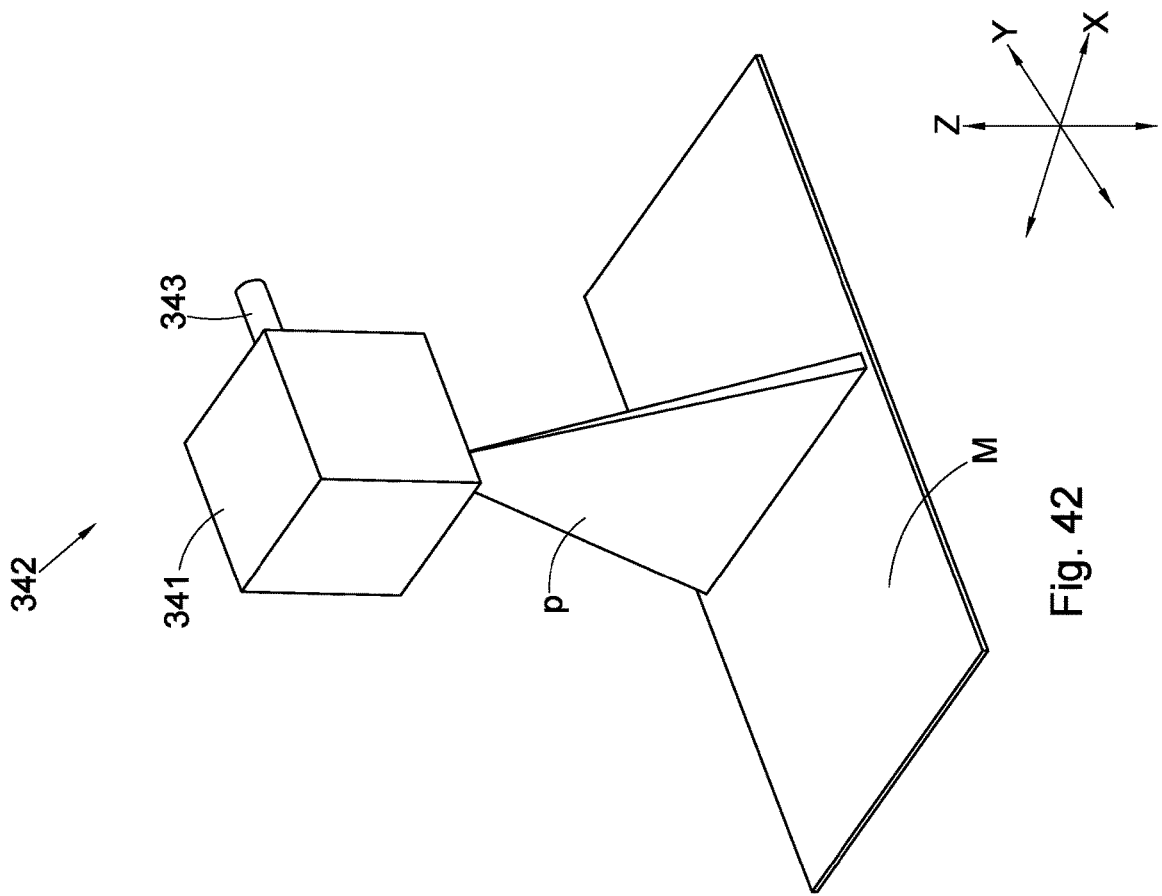
FIGS. 41-42 are conceptual illustrations of a beam path employed by a known additive manufacturing apparatus and an apparatus according to embodiments of the present invention, respectively.
Figure 41:
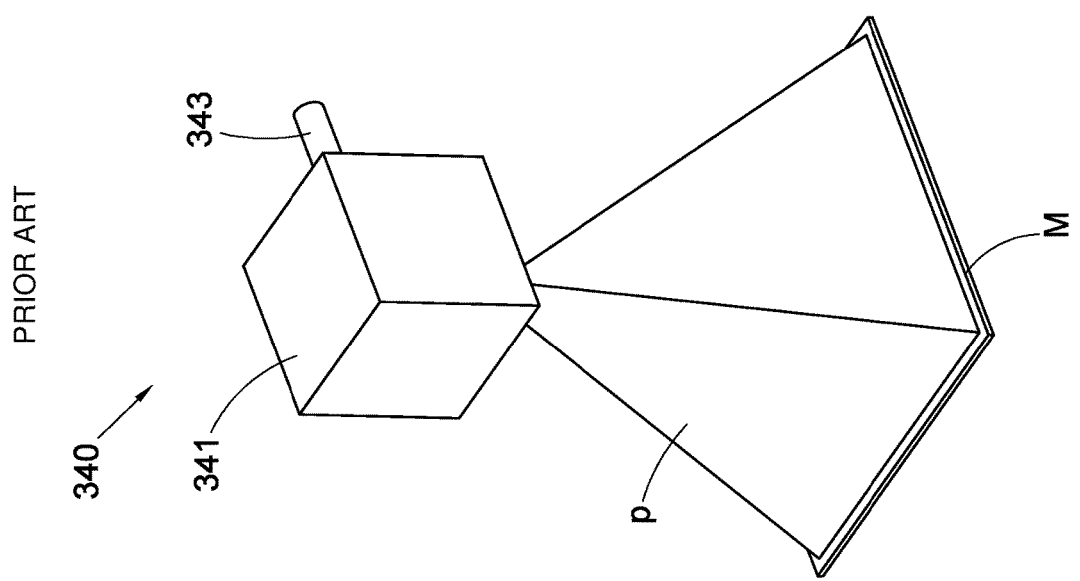

In the example of FIGS. 37 and 38, a plurality of preheating arrangements 332, 334, 336 is provided, the preheating arrangements 332, 334, 336 being spaced apart along the X-axis of an AM apparatus. Adjacent preheating arrangements are slightly offset relative to each other along the Y-axis, as is best shown in FIG. 38, to allow for the lamps to be installed. The preheating arrangements are also rotated accordingly to ensure that the focal position of all preheating arrangements align along the X axis. The preheating arrangements may be movable together or independently of one another relative to the build platform along the Y-axis. In addition, the lamps of the preheating arrangement may be energised together or independently of one another.

FIGS. 39 to 42 illustrate a scan area S and beam path P that may be employed by existing additive manufacturing apparatuses 340 (marked "PRIOR ART" in the figures) compared to the scan area S and beam path P employed according to embodiments of the present invention 342. A scanning unit 341 and energy source coupling 343 are also shown for reference.

For existing additive manufacturing apparatuses 340 in which the scanning unit 341 is fixed, the size of the scan area S defined by the beam path P usually substantially corresponds to the size of the material area M and is typically a round or square area. Dimensions of the scan area S may vary, depending on the optical layout of the apparatus, but may for instance be in the order of 300 mm×300 mm. The dimensions of the useful scan area are limited by the ability to maintain a sufficiently small energy beam spot size. In the case of a laser beam the useful area is thus determined by the laser beam quality and the limitations of the optical focusing system.

By changing the optical layout, it has been found that it is possible to increase the above dimensions to, for instance, 600 mm×600 mm. As described above, the scan area of the present invention is reduced to be in the form of a strip which does not cover the entire material area M defined by a surface of the material bed. In this example, the strip S formed by the beam path P extends for the entire width of the build platform along the X-axis of the apparatus. In this example, the size of the scan area is 600 mm×20 mm. The size of the material area can be much larger in the Y-direction, and in this example is 1200 mm. The size of the system in the Y-direction is thus not constrained by the optical system, but only by mechanical considerations. In use, preheating and consolidation of a layer is thus carried out strip by strip.

Figure 44:
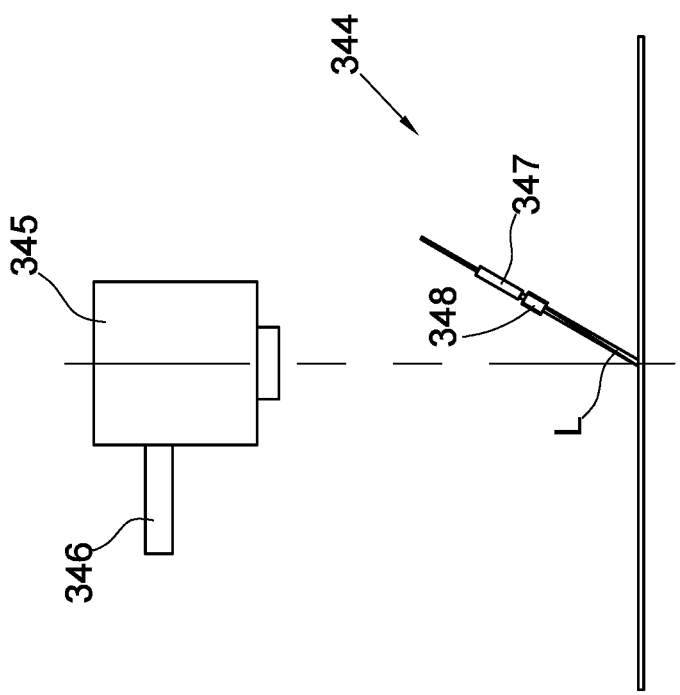
FIG. 44 is a front view of the preheating arrangement and scanning unit of FIG. 43.
Figure 43:
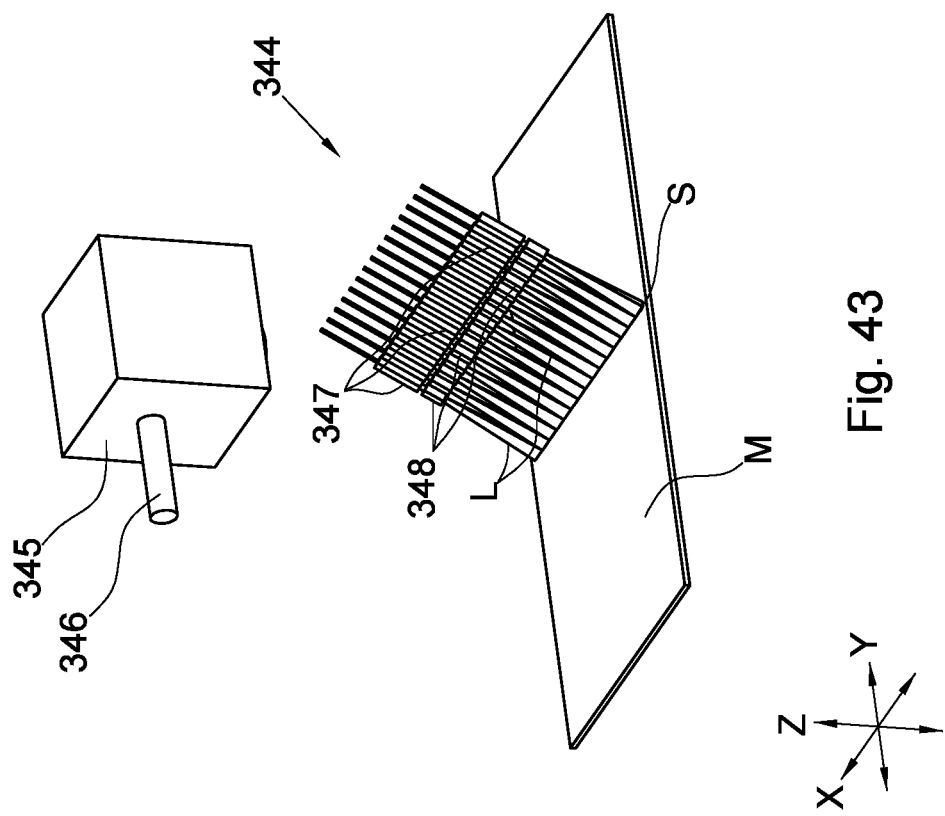
FIG. 43 is a three-dimensional conceptual illustration of a preheating arrangement and a scanning unit of an additive manufacturing apparatus according to the invention.

An alternative preheating arrangement 344 is conceptually illustrated in FIGS. 43 and 44. A scanning unit 345 and an energy source coupling 346 are also shown for reference. In this embodiment, the preheating arrangement 344 is provided by an array of diode lasers 347 configured to irradiate the scan area S (which forms a subset of the material area M). The lasers 347 are arranged along the X-axis, as shown in FIG. 43, and are employed in combination with beam shaping optics 348. A laser beam path L is shown to illustrate the manner in which it defines the scan area S.

The relatively fast switching and high power density of diode lasers may provide rapid heating and may assist in minimizing the difference in heat conduction between unsolidified powder and previously solidified powder, such that relatively uniform preheating takes place.

It is believed that embodiments of the present invention ameliorate at least some of the problems associated with existing powder bed fusion AM processes and/or components employed in AM.

A number of advantages can be obtained by mounting a two-dimensional scanner and/or extraction arrangement and/or heating arrangement and/or build platform in such a manner than they can be moved relative to each other in a direction generally parallel to a surface of the material bed, in use.

It is believed that the size of an AM system, and thus also the size of parts that can be produced with the system, can be dramatically increased when the present invention is implemented. The scanning unit and/or extraction arrangement and/or heating arrangement and/or build platform can be mechanically moved along the Y-axis, while additional components may be employed along the X-axis if required. The scanning unit and/or extraction arrangement and/or heating arrangement may be actuated along the X-axis as well to increase build volume along the X-axis, or to allow for unique shapes to be produced. In some cases, the scanning unit and/or extraction arrangement and/or heating arrangement and/or build platform can be mechanically moved along the Y-axis and the X-axis.

Since a single scanning unit and thus a single energy beam may be used, problems associated with areas of overlap between different scanning units in the same AM system are avoided. Further, it is believed that the use of a single scanning unit may reduce the mean time between failures and thus the risk of producing "scrap" parts.

In contrast with polygon-type scanner implementations, a two-dimensional scanner permits contours to be scanned in the limited scan area, and it is possible to implement various scan strategies, including, but not limited to, the strategies described with reference to FIGS. 20 to 25.

While not shown in the drawings, it will be appreciated that the AM apparatus may be scaled up by including a plurality of scanning units spaced apart along the X-axis and movable relative to the build platform along the Y-axis (or vice versa), either by movement of the scanning units themselves or by movement of the build platform.

Conventional scan strategies may require that a large area (especially in respect of contours) be scanned. It may be difficult to perform pre-heating, vapour extraction and/or spatter removal when employing such strategies. In embodiments of the present invention, the scan area is reduced so that each layer to be scanned is divided into multiple strips, which are scanned one-by-one. It is believed that this permits pre-heating, vapour extraction and spatter removal to be performed more effectively and over small distances if these systems are moving with the scanning unit and/or build platform, as the case may be.

Further, by reducing the scan area of the scanning unit, the problems associated with having a relatively large angle of incidence between the scanning unit and the material bed can be avoided for one direction of the build.

The reduced scan area employed in the present invention has a number of further advantages. It is believed that it is possible to introduce local extraction arrangements, e.g. vapour and spatter removal systems, and/or pre-heating systems in close proximity to the scan area. These systems can move relative to the build platform in the same manner as the scanning unit, while always functioning over the reduced scan area.

Extraction and heating systems may be mounted to their own rails or guides. This may be useful when changing direction of movement. The heating zone may be moved relative to the scan area, e.g. to ensure that heating is always carried out in front of the scan area. This may also ensure that the direction of extraction is away from the scan area such that vapour/spatter is not extracted through the beam path.

For instance, it is desirable that the scanning unit is mounted on a first linear guiding or moving arrangement and actuated with an individual actuation arrangement, while the extraction arrangement is mounted on a second linear guiding or moving arrangement and actuated with a different actuation arrangement. The result is that the position of the extraction arrangement relative to the scanning unit may be adjusted. This is advantageous when changing the direction of movement to compensate for different requirements when moving from left to right versus moving from right to left. One advantage is that the heating zone, caused by the heating arrangement, can be moved relative to the scan area to ensure, for example, that the heating zone is always located slightly in front of the scan area along a scanning path of the scanning unit, independent of the direction of movement. If the direction of movement of the scanning unit is thus from left to right, the extraction arrangement can be positioned slightly to the left of the scanning unit, and vice versa.

This may also allow for a change in scan angles, e.g. it may be advantageous to scan at a slight angle to the powder bed, such as about 3 degrees, to reduce the risk of back reflections damaging the options of the AM apparatus. By allowing for the scanning unit and extraction arrangement to be offset from each other, it is possible to ensure that the scanning unit is always scanning at an angle other than the perpendicular with relation to the powder bed surface.

Furthermore, since the scan area of the scanning unit is limited and continuous scanning is employed, it is possible to deposit a layer of raw material in the working area while the scanning unit is scanning a certain strip, thereby improving the overall efficiency of the AM system.

Embodiments of the present invention further provide a radiative energy source for selectively preheating a surface of a material bed which is about to be consolidated by means of a focused energy source. The scan area (and preheating area) is reduced to a two-dimensional area which is substantially smaller than the material area and the scan area can be translated over the material area during operation.

Because only a relatively small area has to be heated, less energy is required. Alternatively or additionally, higher temperatures and heating rates can be achieved with the same or possibly even less overall energy input.

It is believed that the present invention may reduce energy requirements of an additive manufacturing apparatus and increase the efficiency of preheating by only heating a relatively small area as opposed to an entire powder bed area. Radiation can be focused, by means of an appropriate optical or electromagnetic technique, to have a footprint on the surface of the material bed that matches the area that is to be preheated.

It is also believed that the present invention is advantageous over current surface heating methods in terms of the uniformity of the heating profile on the material. In traditional surface heating methods, the heating mechanisms cannot interfere with the beam path and the heating mechanisms are thus typically arranged along the periphery of the scanning unit. In the proposed technique, which utilises a reduced scan area, the preheating arrangement is distributed uniformly over the powder bed in the X-direction, creating a substantially uniform heating profile.

By utilising high temperature preheating in a relatively small area, the amount of energy that needs to be transferred from the scanning unit to the material bed to achieve consolidation is reduced. Reduced energy transfer requirements result in shorter interaction times and therefore higher scanning speeds. Higher temperatures may also reduce cooling rates, which can in turn reduce residual stresses in the object and produce more ductile micro-structures. High preheating temperatures can also affect stress-relieving of the material to further reduce residual stresses.

It is believed that there is a distinct advantage in selectively heating the area where consolidation is taking place, as this limits the time that unsolidified powder is at an elevated temperature. Accordingly, the techniques and arrangements described herein may reduce material degradation and defects, such as distortion, porosity and oxidation.

The method also has the advantage that material heating and material consolidation can happen in parallel, thereby increasing the efficiency of the process.

Further, less raw material is heated at a particular point in time. This can reduce or eliminate temperature induced degradation of raw material due to effects such as sintering and increased oxidation. As a result, more unsolidified powder may be available for recycling and the overall cost of production may be reduced.

Due to lower overall energy input into an additive manufacturing apparatus, the thermal load on its components, and therefore their cooling requirements, may be reduced.

It has been found that there are also advantages in combining traditional bulk heating methods with the proposed localised surface heating method. Bulk preheating can be used effectively to reach a certain temperature in the material while local surface heating can elevate the temperature where processing takes place. This is advantageous since the surface heating can compensate for the thermal gradient expected in the material (along the Z-axis) when heating from the bottom. Local heating to higher temperatures for a short period of time may also reduce some negative effects of preheating, such as oxidation.

It is desirable to provide laminar gas flow perpendicular to a scan direction to improve spatter and vapour removal. In conventional systems this may not be possible, since scanning is typically multidirectional and flow is maintained over the entire material bed. By restricting the scan area to an area with a high aspect ratio, this problem can be solved since aerodynamic extraction devices, such as those described herein, can be mounted in close proximity to the scan area, thereby improving the efficiency of these systems. By mounting the extraction device close to the area where the vapour and/or spatter is generated, it is also possible to reduce the required flow rate to achieve similar extraction results. This is advantageous, since high flow velocities may cause the powder material to be disturbed, reducing the quality of the resultant part and contaminating the atmosphere with powder. By employing these techniques, it is possible to increase the size of the material surface while maintaining effective vapour and spatter removal.

The invention claimed is:

1. An additive manufacturing apparatus which includes:
a build platform on which a material is operatively deposited to form a material bed, a surface of the material bed defining a material area;
a scanning unit configured to consolidate deposited material in a scan area on the surface of the material bed, wherein the scan area forms part of and is substantially smaller than the material area;
a preheating arrangement which is located between the scanning unit and the build platform and which includes two sets of infrared lamps and a reflector arrangement configured to focus radiation from the lamps onto the surface of the material bed substantially in the scan area and not in the remainder of the material area, wherein the reflector arrangement includes two mirrors, one on each side of the scan area, and wherein each mirror, when viewed in a Y-Z plane of the additive manufacturing apparatus, has an elliptical apex region below which one of the lamps is positioned;
a control system which is configured to control the operation of the preheating arrangement and the scanning unit in order to preheat the material in the scan area to a temperature below the melting point of the material by means of the preheating arrangement and subsequently to consolidate the preheated material in the scan area by means of the scanning unit; and
a platform displacement arrangement, whereby the build platform is operatively vertically displaceable.

2. The additive manufacturing apparatus according to claim 1, wherein the lamps and reflectors are mounted such that an energy beam from the scanning unit operatively passes through the preheating arrangement, between the mirrors, and onto the material bed.

3. The additive manufacturing apparatus according to claim 1, in which the preheating arrangement is configured to focus radiation onto the surface of the material bed in a preheating zone which substantially coincides with the scan area.

4. The additive manufacturing apparatus according to claim 1, in which the build platform, on the one hand, and the scanning unit and the preheating arrangement, on the other hand, are displaceable relative to each other in a direction which is parallel to the surface of the material bed and wherein the scanning unit and the preheating arrangement are displaceable relative to each other to permit a preheating zone of the preheating arrangement substantially to coincide with the scan area.

5. The additive manufacturing apparatus according to claim 1, which includes at least one extraction arrangement having an extraction port for the extraction of vapour and/or spatter produced in use, wherein the at least one extraction port is located on one or opposite sides of the preheating arrangement so as to extract vapour and/or spatter from the scan area.

6. The additive manufacturing apparatus according to claim 5, wherein the extraction arrangement is attached to or integral with the preheating arrangement, the extraction port being located in at least one of the mirrors.

7. The additive manufacturing apparatus according to claim 6, wherein the extraction arrangement includes an extraction port and a gas outlet and a nozzle and a gas inlet provided in each of the mirrors.

8. The additive manufacturing apparatus according to claim 1, wherein the scan area is substantially in the form of a two-dimensional strip and the scanning unit is a two-dimensional scanning unit configured to provide or direct an energy beam for consolidating the deposited material.

9. The additive manufacturing apparatus according to claim 1, which includes a moving arrangement whereby the build platform and the scanning unit are movable relative to one another.

10. The additive manufacturing apparatus according to claim 9, wherein the scanning unit and the preheating arrangement are fixed relative to one another and the scanning unit and the preheating arrangement, on the one hand, and the build platform, on the other hand, are relatively displaceable in a direction which is parallel to the surface of the material bed, thereby permitting the scan area to be moved along an X-axis and/or a Y-axis of the additive manufacturing apparatus.

11. The additive manufacturing apparatus according to claim 1, which includes at least one temperature sensor for measuring a surface temperature of a focus zone provided by the preheating arrangement at or near the surface of the material bed, wherein a heating level of the preheating arrangement is adjustable based on temperatures measured by the at least one temperature sensor.

12. The additive manufacturing apparatus according to claim 1, wherein the additive manufacturing apparatus includes a plurality of preheating arrangements, which are spaced apart along an X-axis of the additive manufacturing apparatus.

* * * * *